US009600980B2

(12) United States Patent
Clarebrough et al.

(10) Patent No.: US 9,600,980 B2
(45) Date of Patent: Mar. 21, 2017

(54) ELECTRONIC GAMING MACHINE AND GAMING METHOD

(71) Applicant: Ainsworth Game Technology Limited, Newington (AU)

(72) Inventors: Peter Scott Clarebrough, Sydney (AU); Sujay Prabhu, Sydney (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 226 days.

(21) Appl. No.: 14/614,402

(22) Filed: Feb. 4, 2015

(65) Prior Publication Data

US 2015/0379809 A1 Dec. 31, 2015

(30) Foreign Application Priority Data

Jun. 30, 2014 (AU) ................................ 2014902504
Dec. 18, 2014 (AU) ................................ 2014277782

(51) Int. Cl.

*A63F 13/10* (2006.01)
*G07F 17/34* (2006.01)
*G07F 17/32* (2006.01)

(52) U.S. Cl.

CPC ............ *G07F 17/34* (2013.01); *G07F 17/326* (2013.01); *G07F 17/3262* (2013.01); *G07F 17/3267* (2013.01); *G07F 17/3244* (2013.01); *G07F 17/3258* (2013.01); *G07F 17/3286* (2013.01)

(58) Field of Classification Search

CPC .. G07F 17/34; G07F 17/3244; G07F 17/3267; G07F 17/3258; G07F 17/3211; G07F 17/326; G07F 17/3286; G07F 17/3262

See application file for complete search history.

(56) References Cited

U.S. PATENT DOCUMENTS

| | | | | |
|---|---|---|---|---|
| 6,726,563 | B1 * | 4/2004 | Baerlocher | G07F 17/32 463/20 |
| 8,545,306 | B2 * | 10/2013 | Yoshikawa | G07F 17/3267 463/16 |
| 2005/0075158 | A1 * | 4/2005 | Walker | G07F 17/32 463/16 |
| 2006/0281527 | A1 | 12/2006 | Dunaevsky et al. | |
| 2009/0082088 | A1 * | 3/2009 | Anderson | G07F 17/32 463/20 |
| 2009/0247272 | A1 * | 10/2009 | Abe | 463/20 |
| 2013/0065662 | A1 | 3/2013 | Watkins et al. | |

* cited by examiner

*Primary Examiner* — Justin Myhr
(74) *Attorney, Agent, or Firm* — Cook Alex Ltd.

(57) ABSTRACT

An electronic gaming machine comprises a display for displaying game symbols for playing a first game of chance, and an electronic game controller for controlling the display of the game symbols on the display. In response to a trigger event in the first game, a second game of chance is displayed, where the appearance of one or more special symbols causes the award of one or more tokens associated with one or more token values. At the end of the second game, an accumulated token value is determined and if it is equal to a predetermined number, a plurality of third games of chance is displayed and is selectable by the player. The third games displayed depend on the accumulated token value. A gaming method is also provided.

22 Claims, 40 Drawing Sheets

ELECTRONIC GAMING MACHINE AND GAMING METHOD

BACKGROUND

The present invention relates to an electronic gaming machine and in a particular an electronic gaming machine having a game and a feature game. The invention has been developed primarily for use as an electronic gaming machine and will be described hereinafter by reference to this application.

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Conventional gaming machines typically involve awarding prizes to a player according to predetermined combinations of game symbols that appear on an array of game squares displayed on a screen, typically organised into three rows and five columns (a 5×3 array). Other arrays, such as a 3×3 or 4×3, may be used. Each gaming machine randomly selects the game symbols that appear on the array, each column of the array being a "reel".

In an electronic gaming machine, the mechanical reels are replaced with video images of the reels, which are displayed on a video display screen. The electronic gaming machine has an internal electronic game controller, typically a computer, computational processor or other central processing unit, that controls the display of images on the video display screen so that the reels are visibly spun on the screen to simulate a physical reel of a traditional gaming machine. Electronic gaming machines are also more versatile in presenting game information, varying the probabilities for a player to win a prize and varying the type of game that is played.

Bonus or "feature" games may also be provided by an electronic gaming machine in addition to a base or main game. Typically feature games use the same set of reels as the main game and are limited to a set of free games operated under a single set of rules. This means that the feature game is restricted by the same set of rules, and so there is no variation in the play of the feature game. Consequently, it is difficult to retain player interest because there is no apparent incentive for the player to continue playing the same electronic gaming machine once the player becomes familiar with the feature game and the main game. Also, it is difficult to retain player interest since there is little differentiation between gaming machines in terms of the main and feature games that are played.

It is an object of the present invention to overcome or substantially ameliorate one or more of the disadvantages of prior art, or at least to provide a useful alternative.

It is an object of the invention in at least one preferred form to provide an electronic gaming machine and a gaming method for an electronic gaming machine that encourages player interest.

SUMMARY

According to a first aspect of the invention, there is provided an electronic gaming machine comprising:

a display for displaying game symbols for playing a first game of chance, and an electronic game controller for controlling the display of said game symbols on said display, wherein, in response to a trigger event during play of said first game, said electronic game controller causes said display to display game symbols for playing a second game of chance, wherein the appearance of one or more special symbols causes the award of one or more tokens to said player, said tokens being associated with one or more token values, wherein, at the end of said second game, said electronic game controller determines an accumulated token value from the tokens awarded to said player, and where said accumulated token value is equal to a predetermined number, said electronic game controller causes the display of a plurality of third games of chance selectable by said player, and wherein said third games displayed depends on said accumulated token value, and in response to said player selecting a selected third game from said plurality of third games, said electronic game controller causes the display of game symbols for playing said selected third game.

Preferably, said tokens are associated with two or more token values. More preferably, one of said tokens results in the award of an initial token value and another of said tokens result in the award of a different token value.

Preferably, said tokens comprise two or more different types of tokens, each type of token being associated a different token value. More preferably, a first appearance of said special symbol results in the award of a first type of token and subsequent appearances of said special symbol result in the award of a second type of token, a first accumulated token value of said first type of tokens results in said electronic game controller causing the display of a first plurality of third games of chance selectable by said player, and a second accumulated token value of said second type of tokens results in said electronic game controller causing the display of a second plurality of third games of chance selectable by said player. In one embodiment, said second plurality of third games comprises enhanced or improved versions of said first plurality of third games.

Alternatively, a first appearance of said special symbol results in the award of a first type of token, a second appearance of said special symbol results in the award of a second type of token and subsequent appearances of said special symbol result in the award of a third type of token; a first accumulated token value of said first type of tokens results in said electronic game controller causing the display of a first plurality of third games of chance selectable by said player; a second accumulated token value of said second type of tokens results in said electronic game controller causing the display of a second plurality of third games of chance selectable by said player; and a third accumulated token value of said third type of tokens results in said electronic game controller causing the display of a third plurality of third games of chance selectable by said player.

In a further alternative, said electronic game controller permits said player to make more than one selection from said plurality of third games where more than one type of token has an accumulated token value greater than said predetermined number Preferably, there are different types of special symbols, each type of special symbol being associated with different types of tokens.

Preferably, said different types of tokens and accumulated token values are displayed on said display. More preferably, said different types of tokens and accumulated token values are displayed as meters in real time on said display.

Preferably, said predetermined number is at least 1.

Preferably, said tokens comprise at least one of a symbol or numerical value.

Preferably, said first game comprises the display of randomly selected game symbols, wherein predetermined winning combinations of said randomly selected game symbols results in the award of prizes to a player; wherein said second game comprises the display of randomly selected game symbols, wherein predetermined winning combinations of randomly selected game symbols in said second game results in the award of prizes to said player and/or one or more game enhancing elements that are applied in said second game; and wherein, said third game comprises the display of randomly selected game symbols, wherein predetermined winning combinations of randomly selected game symbols in said selected third game results in the award of prizes to said player and/or one or more game enhancing elements that are applied in said selected third game.

Preferably, said player must make a bet to play said second game and is awarded free plays of said third game.

Preferably, said player is awarded free plays of said second game and must make a bet to play said third game.

Preferably, a first trigger event in said second game causes said electronic game controller to award additional plays of said second game.

Preferably, a second trigger event in said selected third game causes said electronic game controller to award additional plays of said selected third game.

Preferably, said one or more game enhancing elements modify the result of a play of said game.

Preferably, the game enhancing elements comprise at least one or more of a predetermined number of free games, an enhanced game, bonus prizes, collector symbols, a win multiplier, wild multipliers, bonus wilds, symbols that cause the award of additional free games, trigger symbols to retrigger the selected game or enhanced game, directly retriggering the selected game or enhanced game, held columns, random wild symbols, progressives, bonus credits, jackpot symbols, and one or more symbol replacements.

Preferably, the award of free games also triggers replacement of said selected game with the enhanced game, said enhanced game offering more types of game enhancing elements than said selected game. In one preferred form, said enhanced game modifies the free games played. More preferably, said selected game randomly awards one or more game enhancing elements that modify the result of each said free game.

Preferably, one or more of said first game of chance, said second game of chance, said plurality of third games of chance and said enhanced versions of said games comprise randomly selected game symbols arranged in an array of predetermined symbol positions. More preferably, said array comprises a square or rectangular shape. In other embodiments, said array comprises any one of a circular, triangular, oval, semi-circular, hexagonal, pentagonal, octagonal, non-rectangular or polygonal shape.

Preferably, said electronic game controller causes the display of said first game of chance or said second game of chance with said selected third game during play of said game. In one preferred form, the selection of said selected third game is indicated on said display.

Preferably, the player selectively starts and/or stops play of one or more of said first game of chance, said second game of chance, said plurality of third games of chance and said enhanced versions of said games.

Preferably, said electronic gaming machine comprises a housing and an input device. It is preferred that said input device comprises one or more buttons on said housing, said buttons being in electronic communication with said electronic game controller to transmit player commands to said electronic game controller. More preferably, said buttons are arranged on a console of said housing. Alternatively or additionally, said input device comprises a touch sensitive surface on said display for receiving player commands, said touch sensitive surface being in electronic communication with said electronic game controller to transmit player commands to said electronic game controller.

Preferably, said housing comprises a value transfer mechanism for paying said prizes to said player using value in an amount equal to an awarded prize. More preferably, said value transfer mechanism also receives value from said player to initiate said bet. In one embodiment, said value transfer mechanism comprises one or more vending slots for paying and/or receiving value. In other embodiments, said value transfer mechanism comprises a value input/value output device. In further embodiments, said value transfer mechanism comprises a coin slot or acceptor, a paper currency acceptor, a ticket reader and/or printer or a card reader and/or writer.

Throughout the specification and unless explicitly stated otherwise, the term "value" means credits, gaming tokens, coins, paper, currency, tickets, vouchers, credit cards, debit cards, smart cards, memory devices capable of storing value and any other object representative of value.

Preferably, the electronic gaming machine comprises a mobile electronic gaming device. More preferably, said mobile electronic gaming device comprises a handheld electronic device. In one preferred form, said handheld electronic device comprises a handheld electronic gaming device or a smart phone. Alternatively, said electronic gaming machine comprises a computer. More preferably, said computer is connected to a communication network.

A second aspect of the present invention provides an electronic gaming machine comprising:

a housing having a display for displaying game symbols for playing a game and an electronic game controller in electronic communication with said display for controlling the appearance of game symbols in said game on the display;

wherein said game comprises randomly displaying said game symbols and awarding prizes to a player for predetermined winning combinations of game symbols to a player; and an input device for receiving commands from said player to operate said electronic gaming machine and initiate play of said game on said display, said input device being in electronic communication with said electronic game controller;

wherein said electronic game controller in response to a command from said player via said input device commences play of said game by randomly selecting game symbols and transmitting a signal to said display to display said randomly selected game symbols;

wherein, in response to a trigger event during play of said first game, said electronic game controller causes said display to display game symbols for playing a second game of chance, wherein the appearance of one or more special symbols causes the award of one or more tokens to said player, said tokens being associated with one or more token values, wherein, at the end of said second game, said electronic game controller determines an accumulated token value from the tokens awarded to said player, and where said accumulated token value is equal to a predetermined number, said electronic game controller causes the display of a plurality of third games of chance selectable by said player, and wherein said third games displayed depends on said accumulated token value, and in response to said player selecting a selected third game from said plurality of third games, said electronic game controller causes the display of game symbols for playing said selected third game.

This second aspect of the invention preferably has the preferred features of the first aspect of the invention stated above, where applicable.

According to a third aspect of the invention, there is provided a gaming method for an electronic gaming machine comprising a display and an electronic game controller, comprising:

controllably displaying a first game of chance;

displaying game symbols for playing a second game of chance in response to a trigger event during play of said first game of chance;

awarding one or more tokens to said player in response to the appearance of one or more special symbols in said second game of chance;

associating said tokens with one or more token values;

determining an accumulated token value from the tokens awarded to said player at the end of said second game of chance;

where said accumulated token value is equal to a predetermined number, displaying a plurality of third games of chance selectable by said player, wherein said third games of chance displayed depends on said accumulated token value; and in response to said player selecting a selected third game from said plurality of third games of chance, displaying game symbols for playing said selected third game.

Preferably, said associating step further comprises associating said tokens with two or more token values.

Preferably, said method further comprises awarding an initial token value for one of said tokens results and awarding a different token value for other of said tokens.

Preferably, said tokens comprise two or more different types of tokens, said method further comprising associating each type of token with a different token value. More preferably, said method further comprises awarding a first type of token upon a first appearance of said special symbol; awarding a second type of token for each subsequent appearance of said special symbol; displaying a first plurality of third games of chance selectable by said player in response to a first accumulated token value of said first type of tokens; and displaying a second plurality of third games of chance selectable by said player in response to a second accumulated token value of said second type of tokens. In one embodiment, said method comprises providing said second plurality of third games of chance as enhanced or improved versions of said first plurality of third games of chance.

Alternatively, said method further comprises awarding a first type of token upon a first appearance of said special symbol; awarding a second type of token for upon a second appearance of said special symbol; awarding a third type of token for each subsequent appearance of said special symbol; displaying a first plurality of third games of chance selectable by said player in response to a first accumulated token value of said first type of tokens; displaying a second plurality of third games of chance selectable by said player in response to a second accumulated token value of said second type of tokens; and displaying a third plurality of third games of chance selectable by said player in response to a third accumulated token value of said second type of tokens.

Preferably, said method further comprises enabling more than one selection from said plurality of third games of chance where more than one type of token has an accumulated token value greater than said predetermined number. More preferably, there are different types of special symbols, said method comprising associating each type of special symbol with a respective different type of tokens.

Preferably, said method further comprises displaying said different types of tokens and accumulated token values on said display. More preferably, said method further comprises displaying said different types of tokens and accumulated token values as meters in real time on said display.

Preferably, said first game of chance comprises the display of randomly selected game symbols, wherein predetermined winning combinations of said randomly selected game symbols results in the award of prizes to a player; wherein said second game of chance comprises the display of randomly selected game symbols, wherein predetermined winning combinations of randomly selected game symbols in said second game of chance results in the award of prizes to said player and/or one or more game enhancing elements that are applied in said second game of chance; and wherein said selected third game comprises the display of randomly selected game symbols, wherein predetermined winning combinations of randomly selected game symbols in said selected third game results in the award of prizes to said player and/or one or more game enhancing elements that are applied in said selected third game.

Preferably, said method further comprises requiring a bet to play said second game of chance and awarding free plays of said selected third game. Alternatively, said method further comprises awarding free plays of said second game of chance and requiring a bet to play said selected third game.

Preferably, said method further comprises awarding additional plays of said second game of chance in response to a first trigger event in said second game of chance.

Preferably, said method further comprises awarding additional plays of said selected third game in response to a second trigger event in said selected third game.

Preferably, said first game of chance comprises a base game and/or a feature game.

The method also preferably has the preferred features of the first aspect of the invention stated above, where applicable.

A fourth aspect of the present invention provides a gaming method for an electronic gaming machine comprising a housing having a display for displaying a game, wherein said game comprises game symbols and predetermined winning combinations of randomly selected game symbols in said game award prizes to a player; an electronic game controller inside said housing for controlling the display of said game symbols for playing said game on said display; and an input device for receiving commands from said player to operate said electronic gaming machine, said input device being in electronic communication with said electronic game controller, the method comprising:

said electronic game controller receiving a command from said player via said input device to initiate play of said game on said display;

said electronic game controller controllably displaying a first game of chance;

said electronic game controller causing said display to display game symbols for playing a second game of chance in response to a trigger event during play of said first game of chance;

said electronic game controller awarding one or more tokens to said player in response to the appearance of one or more special symbols in said second game of chance, said electronic game controller associating said tokens with one or more token values;

said electronic game controller determining an accumulated token value from the tokens awarded to said player at the end of said second game of chance;

where said accumulated token value is equal to a predetermined number, said electronic game controller causes said display to display a plurality of third games of chance selectable by said player, wherein said third games of chance displayed depends on said accumulated token value; and in response to said player selecting a selected third game from said plurality of third games of chance, said electronic game controller causes said display to display game symbols for playing said selected third game.

The method of the fourth aspect of the invention preferably has the preferred features of the third aspect of the invention stated above, where applicable.

According to a fifth aspect of the invention, there is provided a computer system comprising a central processing unit configured for communication with an electronic gaming machine, wherein said computer system is configured to perform the method of the third or fourth aspects of the invention.

According to a sixth aspect of the invention, there is provided a computer program configured to perform the method of the third or fourth aspects of the invention.

According to a seventh aspect of the invention, there is provided a non-transitory carrier medium carrying computer executable code that, when executed on a central processing unit configured for communication with an electronic gaming machine, causes the central processing unit to perform the method of the third or fourth aspects of the invention.

Unless the context clearly requires otherwise, throughout the description and the claims, the words “comprise”, “comprising”, and the like are to be construed in an inclusive sense as opposed to an exclusive or exhaustive sense; that is to say, in the sense of “including, but not limited to”.

Furthermore, as used herein and unless otherwise specified, the use of the ordinal adjectives “first”, “second”, “third”, etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

DETAILED DESCRIPTION OF THE VARIOUS EMBODIMENTS

Figure 1:
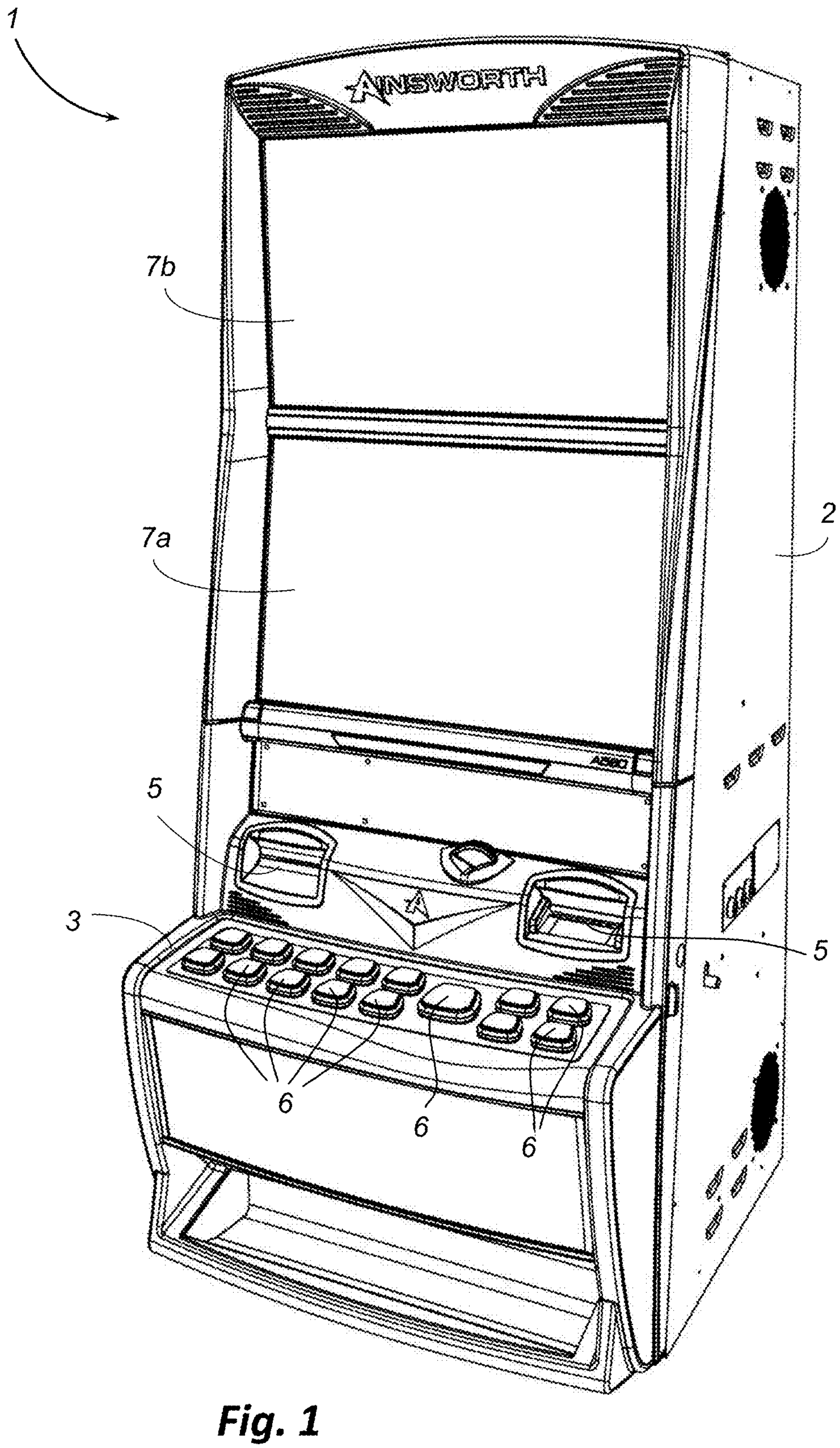
FIG. 1 is a perspective view of an electronic gaming machine according to a first embodiment of the invention.

The present invention will now be described with reference to the following examples which should be considered in all respects as illustrative and non-restrictive. In the Figures, corresponding features within the same embodiment or common to different embodiments have been given the same reference numerals.

Referring to FIG. 1, an electronic gaming machine 1 according to a first embodiment of the invention includes a cabinet 2, a console 3 and an internal electronic game controller 4. The console 3 has various input devices including vending slots 5 for receiving monetary bets and a plurality of buttons 6 for actuation by a player. It will be appreciated that in other embodiments the vending slots 5 may be replaced with other types of value input/value output devices, such as a coin acceptor, a paper currency acceptor, a ticket reader and/or printer or a card reader and/or writer.

The vending slots 5 can be configured to receive value, such as cash in the form of banknotes and coins, or credits representing a monetary amount from a memory device, such as but not limited to a memory card, smart card, a radio frequency identification (RFID) device, USB key, magnetic card or other electronic storage device. Typically, the memory device is a credit card, debit card or other card that enables the transfer of monetary credit to the electronic gaming machine 1. Other forms of value include gaming tokens, paper, tickets, vouchers, and any other object representative of value.

Figure 2:
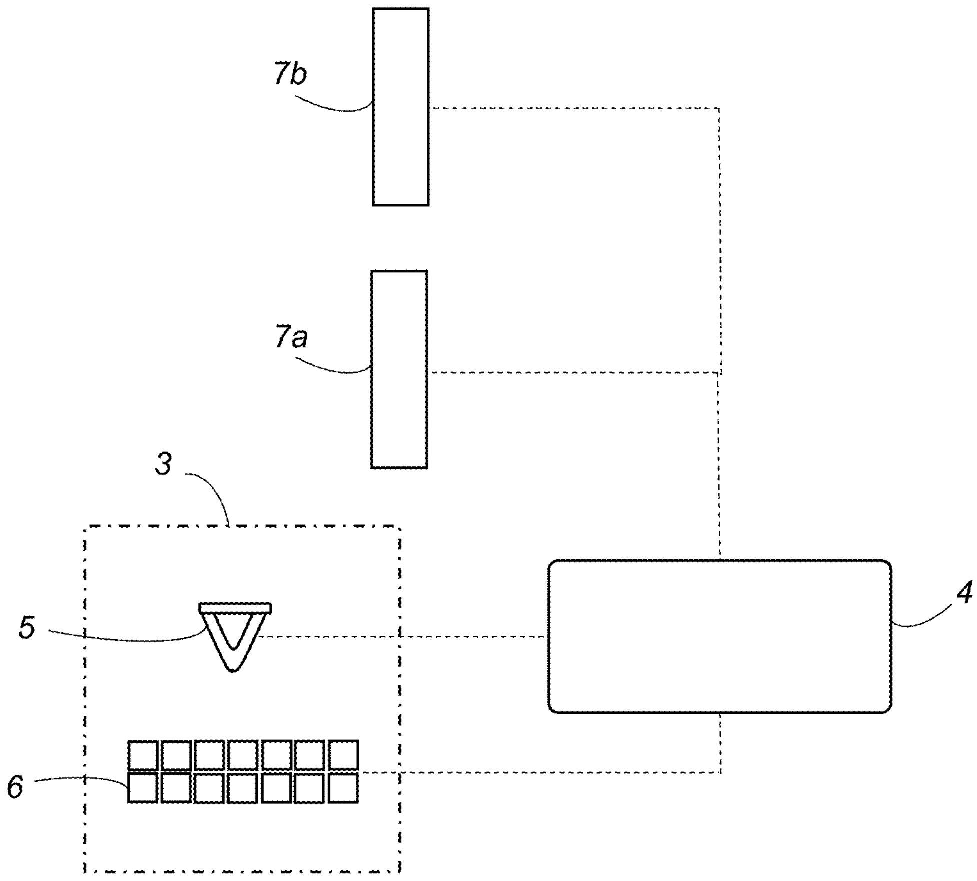
FIG. 2 is a schematic drawing of an electronic game controller for the electronic gaming machine of FIG. 1.

The electronic game controller 4 is generally in the form of a central processing unit, such as a computer, and is in electronic communication with a display 7 in the form of a video display screen, as well as various input devices on the console 3, as best shown in FIG. 2. Typically, the electronic game controller 4 also comprises a random access memory (RAM) associated with the central processing unit, the RAM being used to store program instructions and transient data related to the operation of the electronic game controller and hence the electronic gaming machine 1. The RAM contains a body of program instructions for implementing a game on the electronic gaming machine 1, as discussed in more detail below. The central processing unit or processor may also be operatively associated with a further storage device, such as a hard disk drive, which is used for long-term storage of program components and data relating to the electronic game controller 4 and/or the electronic gaming machine 1, including a database for game performance data, as well as information gathered from users. It is also appreciated that a person skilled in the art would readily understand the location and use of the electronic game controller 4 in the electronic gaming machine 1.

The electronic game controller 4 will transmit and receive signals to and from each of the input devices and the display 7, usually via wired connections but can include wireless modes of electronic communication, such as WLAN. In the case of the vending slots 5 (or with any other type of value transfer mechanism), there may be an intermediate credit verification device that examines and verifies the cash or credits received by the vending slots. Once the value (such as cash or credits) have been verified by the credit verification device, a signal is sent to the electronic game controller 4, which then determines whether the minimum bet level has been reached. If so, the electronic game controller 4 will permits play of the game on the electronic gaming machine 1. If not, the electronic game controller 4 will send a signal to the display 7 to show a message requesting further value to be added to the electronic gaming machine 1.

Figure 3:
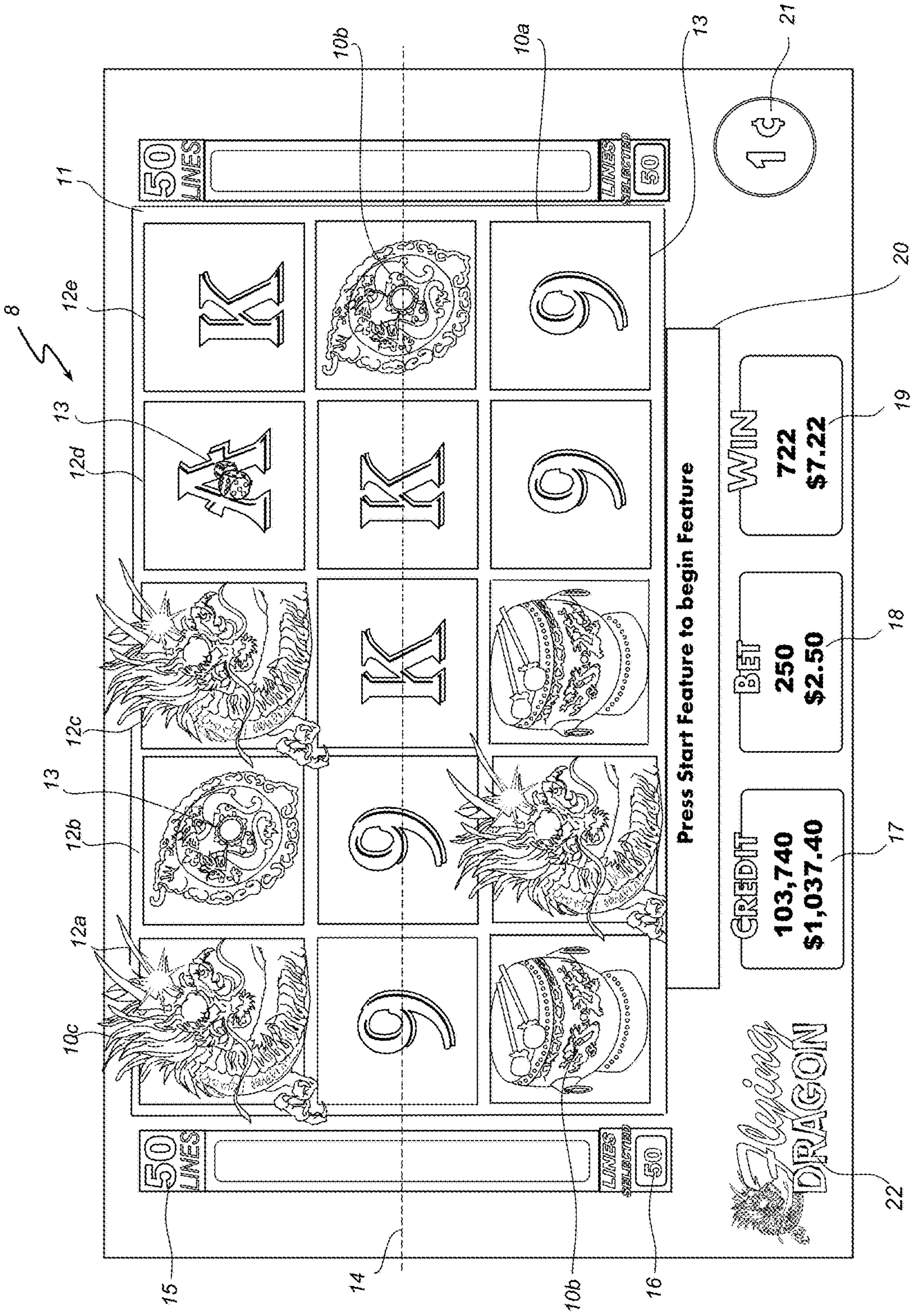
FIG. 3 is a front view of the display of the electronic gaming machine of FIG. 1 illustrating a base game.
Figure 4:
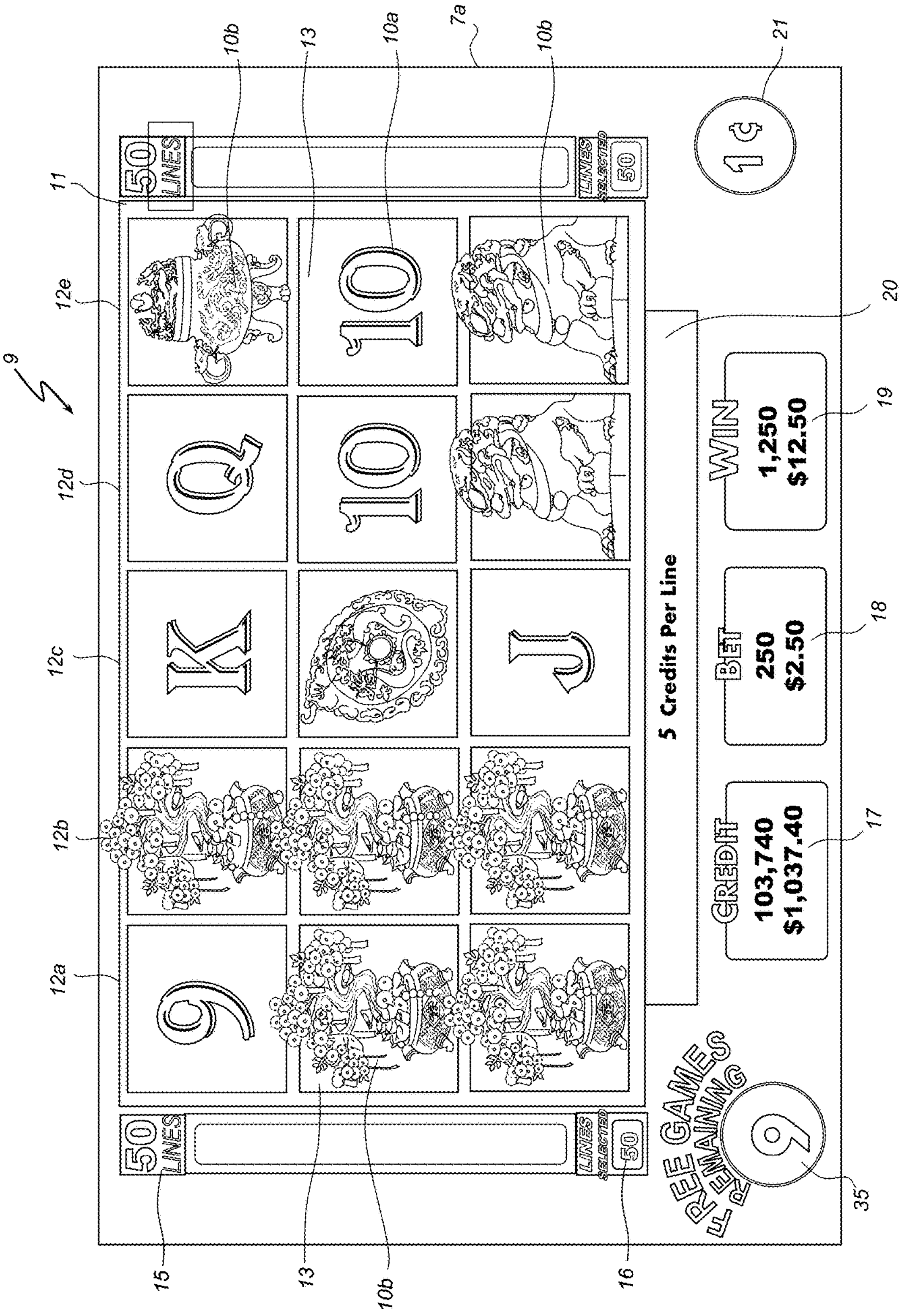
FIGS. 4 to 6 are front views of the display of the electronic gaming machine of FIG. 1 illustrating a feature game.

The electronic game controller 4 is programmed to provide a game in the form of a base game 8 (as best shown in FIG. 3) and a feature game 9 (as best shown in FIG. 4) on the electronic gaming machine 1 for play by a player. The base game 8 has game symbols 10 arranged into an array 11 in the form of five columns or "reels" 12 that are displayed in a lower area 7*a* of the display 7, as best shown in FIG. 3. The reels 12 give the visual appearance of rotating, typically by having the game symbols 10 move in a downward linear path along the length of each reel 12. While the array 11 is arranged with five reels 12 and three rows as per the industry standard, it will be appreciated by one skilled in the art that other types of arrays could be used, such as 3×3, 4×3, 5×5, 4×4, etc, including arrays having an irregular number of rows and/or columns. For example, the array 11 can have an unequal number of rows and/or columns, where some columns have less or more rows than other columns or where some rows have less or more columns than other rows. A more specific example would be an array having three columns with only two rows and two columns with three rows. The electronic game controller 4 will transmit signals to the display screen 7 to cause the base game 8 and feature game 9 to be played on the lower playing area 7*a*, including showing the game symbols 10, array 11 and other visible elements of the games.

The array 11 of the base game 8 defines predetermined symbol positions 13 in which the game symbols 10 appear. The symbol positions 13 are not visually marked by boundary lines and simply provide an area for the game symbols 10 to appear. However, it will be appreciated that in other embodiments, the symbol positions 13 are defined by visible boundary lines (to define "squares" or game positions) or other markings to define each respective area of the symbol positions.

Figure 5:
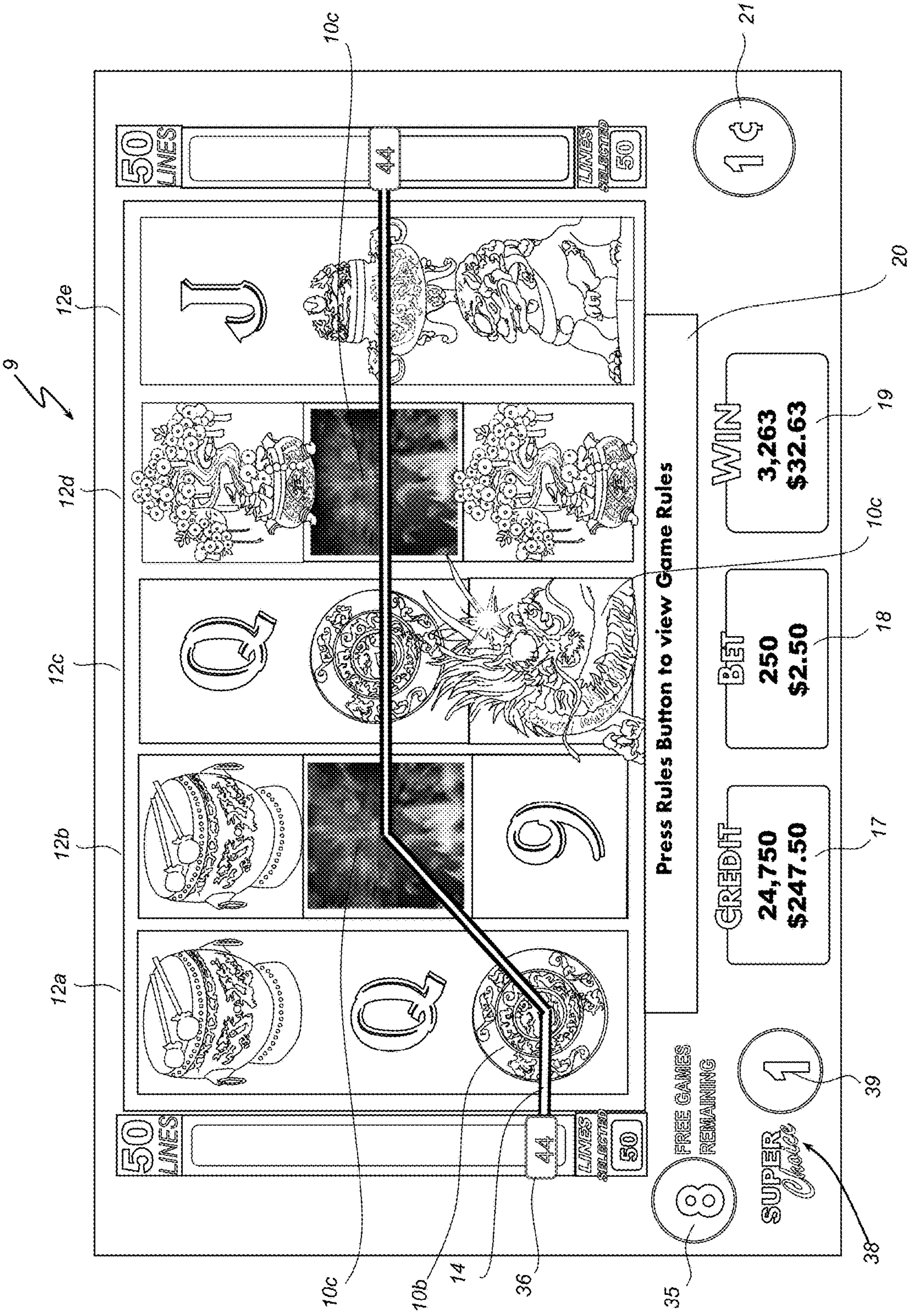

The array 11 is arranged so that a player can select one or more predetermined "pay lines" 14 defined around the array, which correspond to combinations of the symbol positions 13, as best shown in FIG. 5. The pay lines 14 correspond to the lines selected by the player and generally comprise at least one symbol position 13 from each reel 12. The number of pay lines 14 that can be selected by the player depends on the amount of the monetary bet for playing a game on the array 11. In the base game 8, predetermined winning combinations of randomly selected game symbols 10 result in the award of prizes to the player. In the feature game 9, predetermined winning combinations of randomly selected game symbols 10 also result in the award of prizes to the player, usually of an enhanced value compared to the prizes awarded in the base game 8.

The game symbols 10 can include a mixture of picture symbols (such as animal symbols or playing card symbols), word symbols, scatter symbols, substitute or wild card symbols and trigger symbols. Those skilled in the art will readily understand that a substitute symbol is able to act as any other game symbol, and hence is also known as a "wild card" symbol. Likewise, those skilled in the art will readily understand that a scatter symbol is a symbol that triggers a game event or confers an award without having to appear on a player-selected pay line 14. Similarly, a trigger symbol is a symbol that triggers a game event or confers an award, where the trigger symbol may or may not have to appear in combination and may or may not have to appear on the same player-selected pay line 14. In this embodiment, the game symbols 10 include playing card symbols 10*a*, Chinese-themed symbols 10*b* and a substitute or wild card symbol in the form of "Dragon" symbols 10*c*. In this embodiment, the Dragon symbol 10*c* also acts as a scatter symbol that triggers the feature game 9. The electronic game controller 4 randomly determines the appearance of the game symbols 10 on the array 11.

The lower video screen 7*a* also displays other standard game information including the number of pay lines available 15, the number of player-selected pay lines 16, the amount of player credits 17, the amount of the current bet wagered by the player 18, the amount of wins by the player 19, a message area 20, a current denomination button 21 indicating the currently selected base bet denomination and the name of the game 22 "Flying Dragon"™.

The upper video screen 7*b* displays an animated title or feature screen for the game and/or information relating to the rules for the base game 8 and feature games discussed below. This includes information outlining the key characteristics of the base game 8 and feature games. In other embodiments, the upper video screen 7*b* displays jackpot information relating to the based game 8 and feature games that are awarded by the electronic gaming machine 1. This jackpot information can comprise, in descending order of monetary value, a grand jackpot, major jackpot, minor jackpot and midi jackpot. The name 22 of the game and its theme "Ultimate Choice"™ are also displayed on the upper video screen 7*b*.

The player initially makes a bet using vending slots 5 initiate play of the electronic gaming machine 1 to build up credit to play the base game 8 on the electronic gaming machine. For example, the player can bet or wager monetary amounts equivalent to a particular amount of credits, depending on the bet denomination selected for the base game. Also, the player can make any additional side bets or ante-bets during play of the base game once the game has commenced to access additional features in the game, such as increasing the number of winning combinations in the game.

Typically, electronic gaming machines offer a number of preset bet options that the player can make, and these bet options can vary depending on the game or games offered on the electronic gaming machine. For example, a game on an electronic gaming machine may provide bet options of 1 credit, 2 credits, 5 credits and 10 credits per player-selected pay line 14. In another example, the player may bet 1 credit, 2 credits, 5 credits and 10 credits for a preset group or combination of pay lines 14, such as a group of 5 pay lines, 10 pay lines, 20 pay lines, etc.

Typically, the electronic gaming machine also has a default bet denomination, which is usually the bet denomination that was previously used in the preceding play of the base game 8. For example, if a person had played the base game 8 with a bet denomination of 5¢, then this would be the default bet denomination for the player when he or she commences play of the game. Where the electronic gaming machine has not yet been played or has been started up, the default bet denomination is initially selected by the electronic game controller 4. The default bet denomination can be randomly selected or chosen according to a predetermined order. Typically, the electronic game controller 4 will select the bet denomination with the lowest value that is available for the base game 8, which would be the 1¢ bet denomination for this embodiment. The player may change the bet denomination at any time in the base game 8 by touching the denomination button before or after the reels 12 have spun.

The electronic game controller 4 then causes the reels 12 to appear to visibly rotate or "spin" in a linear path, typically in a downward vertical direction, and randomly display the game symbols 10 in each symbol position 13 for each play of the array 11 for the base game 8. After the reels 12 stop spinning, the electronic game controller 4 determines whether there are any predetermined winning combinations of the game symbols 10 appearing in any player-selected pay lines 14, such as a two of a kind, three of a kind, four of a kind or five of a kind for all the game symbols 10 and other combinations of a "full house", "straight" or "flush" for the playing card game symbols 10*a*. It will be appreciated that other winning combinations of game symbols 10 can also be provided. If so, the gaming machine 1 enters a winning game state and awards a prize according to the displayed predetermined winning combination of game symbols.

In addition, the electronic game controller 4 randomly determines whether a predetermined trigger event has occurred which triggers the feature game 9 on the electronic gaming machine 1. In this embodiment, the trigger event is the appearance of three Dragon symbols 10*c* anywhere on the reels 12 without having to be on a player-selected pay line 14; i.e. the Dragon symbols 10*c* act as scatter symbols in this instance. In response to this trigger event, the electronic game controller 4 then causes the feature game 9 to be shown on the lower area 7*a* of the screen 7, as best shown in FIG. 4. However, it will be appreciated that in other embodiments, the feature game 9 is shown in the upper video screen 7*b*.

The feature game 9 uses the same array 11, reels 12*a* to 12*e*, game symbols 10, symbol positions 13 and pay lines 14 as in the base game 8. In the feature game 9, ten free plays or spins of the reels 12 are awarded to the player. It will be understood by those skilled in the art that a free spin involves a play of the game without requiring any bet to be made by the player, and that any number of free spins can be chosen for the feature game. In addition, it will be appreciated that in the art free spins are commonly referred to as "free games". The number of free spins left in the feature game 9 is indicated in a counter 35. In FIG. 4, the first free spin has concluded and the counter 35 shows that nine free spins remain in the feature game 9.

Referring to FIG. 5, where corresponding features have been given the same reference numerals, the next (second) free spin has concluded and the counter shows that eight free spins remain in the feature game 9. Also, a winning combination of game symbols has appeared on the reels 12, which is shown by visibly highlighting the winning pay line 14 and identifying the winning pay line by its allocated number 36. The winning combination comprises two of the same game symbol 10*b* and two of the substitute Dragon symbols 10*c* to form a four of a kind. The substitute Dragon symbols 10*c* are animated when used in a winning combination. In this embodiment, the animation takes the form of the Dragon symbols 10*c* flashing intermittently and FIG. 5 shows both Dragon symbols in between flashes. A third Dragon symbol 10*c* remains static on the reels 12 as it is not part of the winning combination.

The appearance of three Dragon symbols 10*c* in the array 11 acts as a trigger event for the feature game 9 to award a token to the player. In this embodiment, the token comprises a "Super Choice" token and a "Super Choice" token counter or meter 38 shows the number 39 of accumulated Super Choice tokens that the player has received during play of the feature game 9. The Super Choice token meter 38 in this embodiment is displayed once the player obtains a Super Choice token. However, in other embodiments, the Super Choice token meter 38 is always present on the lower display 7*a* and remains blank or shows a zero value until a Super Choice token is awarded. In this embodiment, the award of the Super Choice token is indicated by the appearance of the Super Choice token meter 38. In other embodiments an image of the Super Choice token is shown on the display 7*a* before the Super Choice token meter 38 appears on screen.

Figure 6:
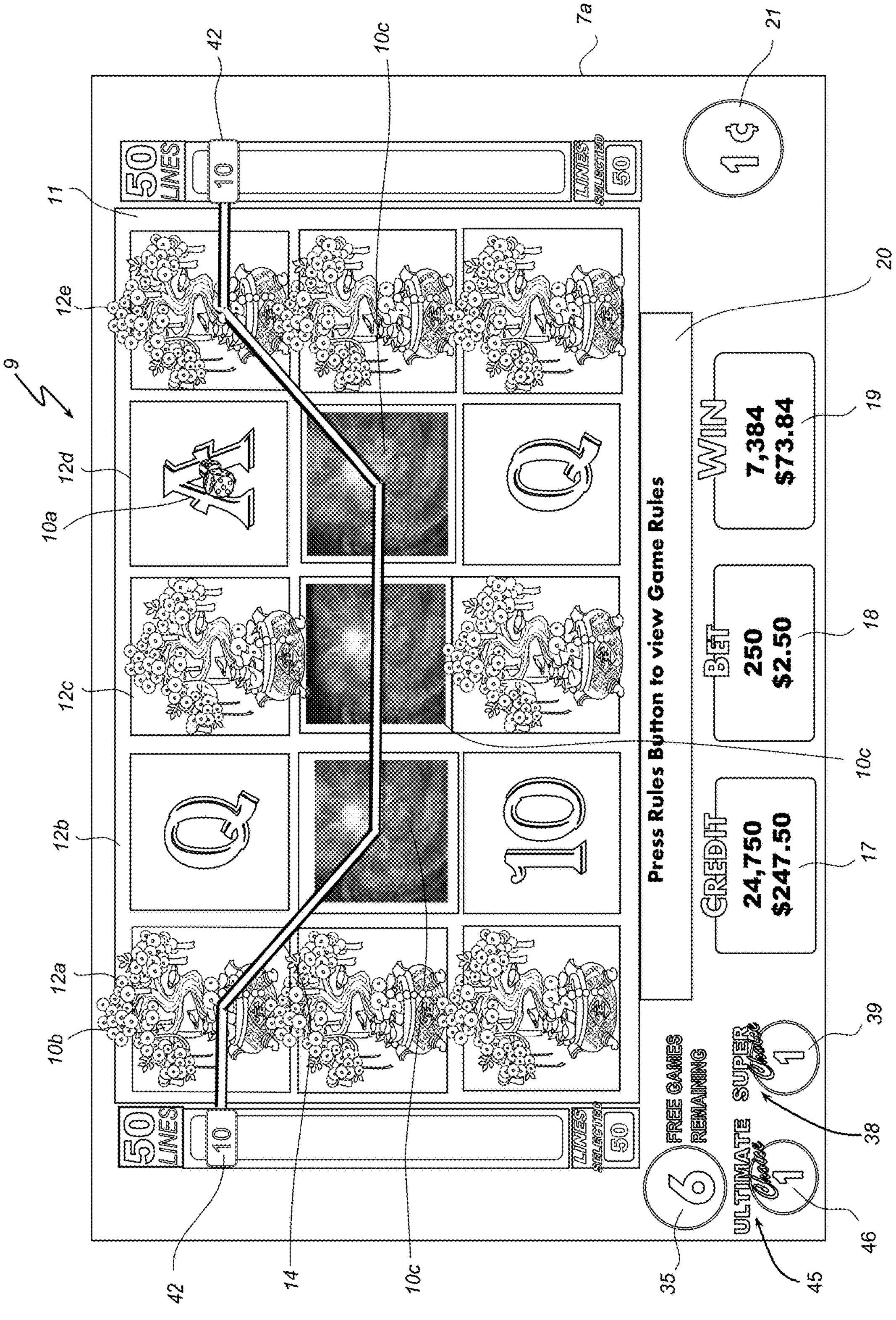

In FIG. 6, the conclusion of a fourth free spin of the feature game 9 is shown, where corresponding features have been given the same reference numerals. This time another winning combination of game symbols has appeared on the reels 12 and the winning pay line 14 is visually indicated by being highlighted and identified by its pay line number 42. The winning combination comprises two of the same game symbol 10*b* and three of the substitute Dragon symbols 10*c* to form a five of a kind. The three Dragon symbols 10*c* also results in the award of a token to the player. However, in this embodiment, a different type of token is awarded to the player, being an "Ultimate Choice" token with an associated "Ultimate Choice" token meter 45 showing the number 46 of accumulated Ultimate Choice tokens. The Ultimate Choice token meter 45 appears in the same way as described above in relation to the Super Choice meter 38, with the addition that subsequent appearances of Ultimate Choice tokens are indicated by incrementing of the value 46 shown in the Ultimate Choice token meter 45. The Super Choice meter 38 still shows that one Super Choice token has been awarded.

At the conclusion of the tenth and final free spin of the feature game 9, the electronic game controller 4 calculates the number of Super Choice tokens and Ultimate Choice tokens that have been accumulated by the player in the feature game, as indicated by their respective meters 38, 45. If either the number 39, 46 of accumulated Super Choice tokens or Ultimate Choice tokens meets a predetermined threshold number, then the player is awarded the choice or selection from a range of other feature games. If neither one of the number 39, 46 of accumulated Super Choice tokens or Ultimate Choice tokens meets the predetermined threshold number, then the electronic game controller 4 returns the electronic gaming machine 1 back to the base game 8, where the player must make a bet to play the base game.

Figure 7:
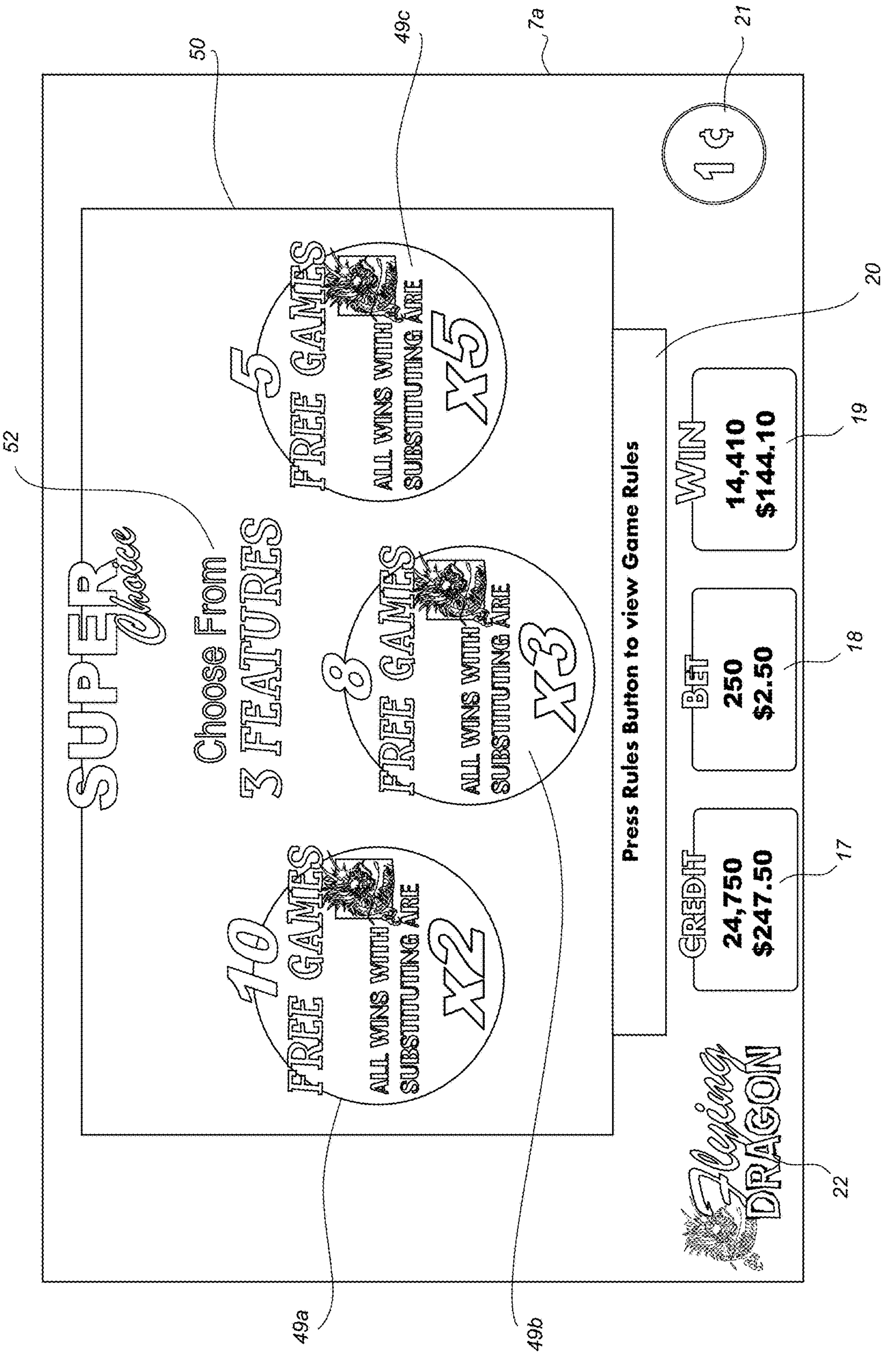
FIG. 7 is a front view of the display of the electronic gaming machine of FIG. 1 illustrating a selection screen.

In this embodiment, the predetermined threshold number for the Super Choice tokens is 1. As the Super Choice token meter 38 has a value of 1 equal to the threshold number, the player is awarded a selection from three feature game options 49*a*, 49*b* and 49*c*, as best shown in FIG. 7, where corresponding features have been given the same reference numerals. A selection screen 50 appears on the video screen 7*a* displaying each feature game option 49*a*, 49*b* and 49*c*. A message 52 is also displayed indicating that the player can choose or select one of the feature game options 49*a*, 49*b* and 49*c*. Feature game option 49*a* comprises ten free spins (called "games") where any winning combination using the substitute Dragon symbol 10*c* has the associated prize increased by the multiplier ×2. Feature game option 49*b* comprises eight free spins where any winning combination using the substitute Dragon symbol 10*c* has the associated prize increased by the multiplier ×3. Feature game option 49*ca* comprises five free spins where any winning combination using the substitute Dragon symbol 10*c* has the associated prize increased by the multiplier ×5. Hence, in the feature game options 49*a*, 49*b* and 49*c* the player must balance the number of free spins of the selected feature game against the multiplier value for winning combinations using the substitute Dragon symbol 10*c*. Thus, a higher number of free spins has a lower multiplier value, whereas a lower number of free spins has a higher multiplier value. Once the player makes a selection, the electronic game controller 4 then causes the lower video screen 7*a* to display the selected feature game 59 from the feature game options 49*a*, 49*b* and 49*c*.

Figure 8:
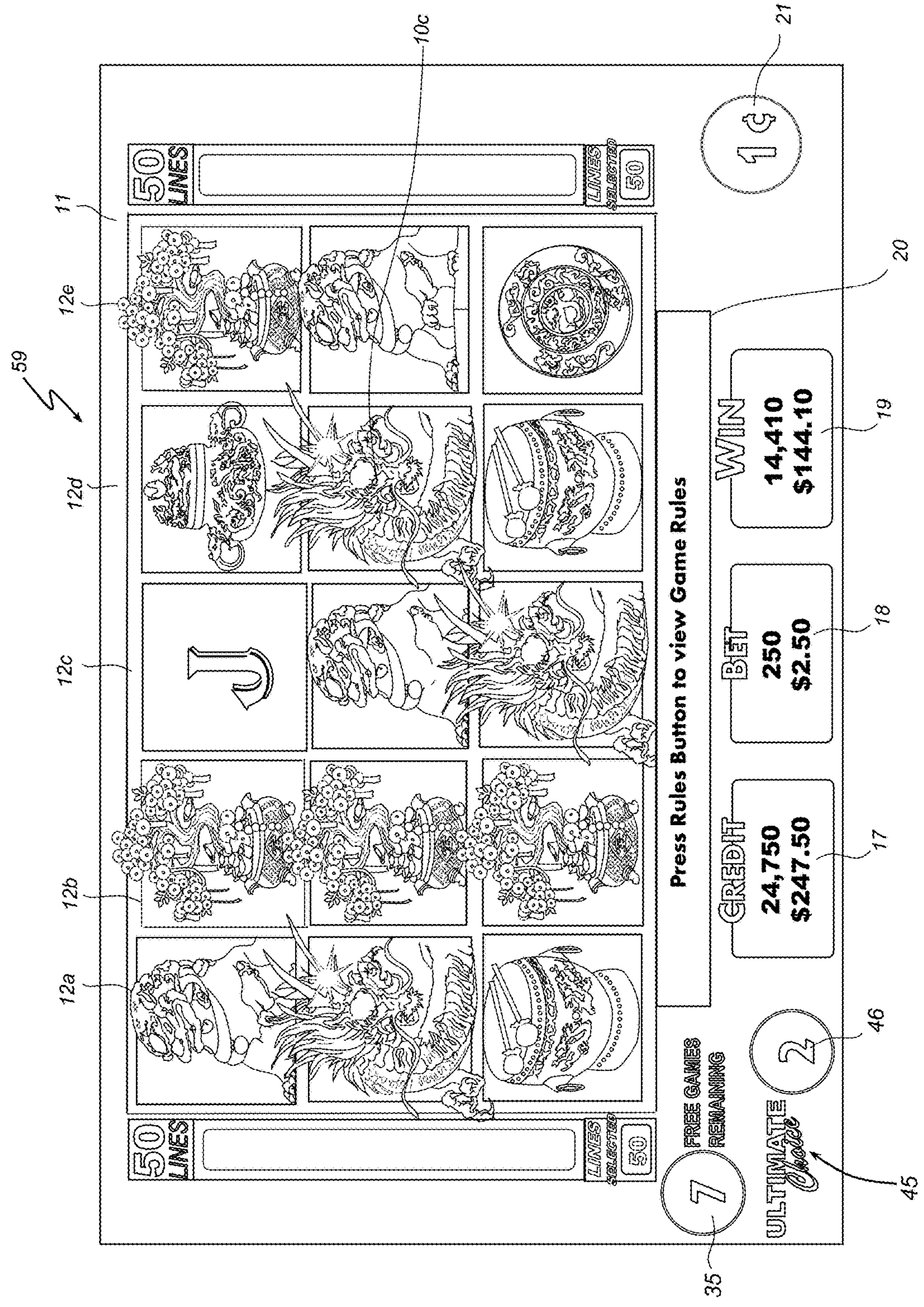
FIG. 8 is a front view of the display of the electronic gaming machine of FIG. 1 illustrating a selected feature game.

Referring to FIG. 8, where corresponding features have been given the same reference numerals, the player has selected feature game option 49*a* having ten free spins and a multiplier of ×2 for any winning combinations using the substitute Dragon symbol 10*c*. The selected feature game 59 uses the same array 11, reels 12*a* to 12*e*, game symbols 10, symbol positions 13 and pay lines 14 as in the base game 8 and feature game 9. However, the selected feature game 59 has game enhancements compared to the feature game 9, such as different reel strips that increase the probability of obtaining a winning combination of symbols in the selected feature game 59 compared to the probability of the same winning combination in the feature game 9. Other enhancements include increased payouts or prizes for the same winning combinations, and new symbols not available in the feature game 9 that confer game enhancing elements like win multipliers or symbol replacements.

As shown in FIG. 7, the third free spin has concluded (as indicated by the counter 35 showing that only seven free spins remain in the selected feature game). Also, the previously accumulated Ultimate Choice tokens from the feature game 9 have been retained and the appearance of three Dragon symbols 10*c* has resulted in the award of another Ultimate Choice token. Thus, the Ultimate Choice token meter 45 now shows a value of 2. No Super Choice tokens are awarded for the appearance of three Dragon symbols 10*c*, unlike the feature game 9. Aside from the differences noted above, the selected feature game 59 plays in substantially the same way as the feature game 9.

At the conclusion of the selected feature game 59, the electronic game controller 4 then calculates the number 46 of Ultimate Choice tokens that has been accumulated by the player in the selected feature game, as indicated by its meter 45. The number of Ultimate Choice tokens includes any Ultimate Choice tokens that were accumulated in the feature game 9. However, in other embodiments, the number of accumulated Ultimate Choice tokens 45 is limited to only those tokens that are awarded during play of the selected feature game 59.

If the number 46 of accumulated Ultimate Choice tokens meets the predetermined threshold number, then the player is awarded the choice or selection from a range of other feature games. If the number 46 of accumulated Ultimate Choice tokens does not meet the predetermined threshold number, then the electronic game controller 4 returns the electronic gaming machine 1 back to the base game 8, where the player must make a bet to play the base game.

Figure 9:
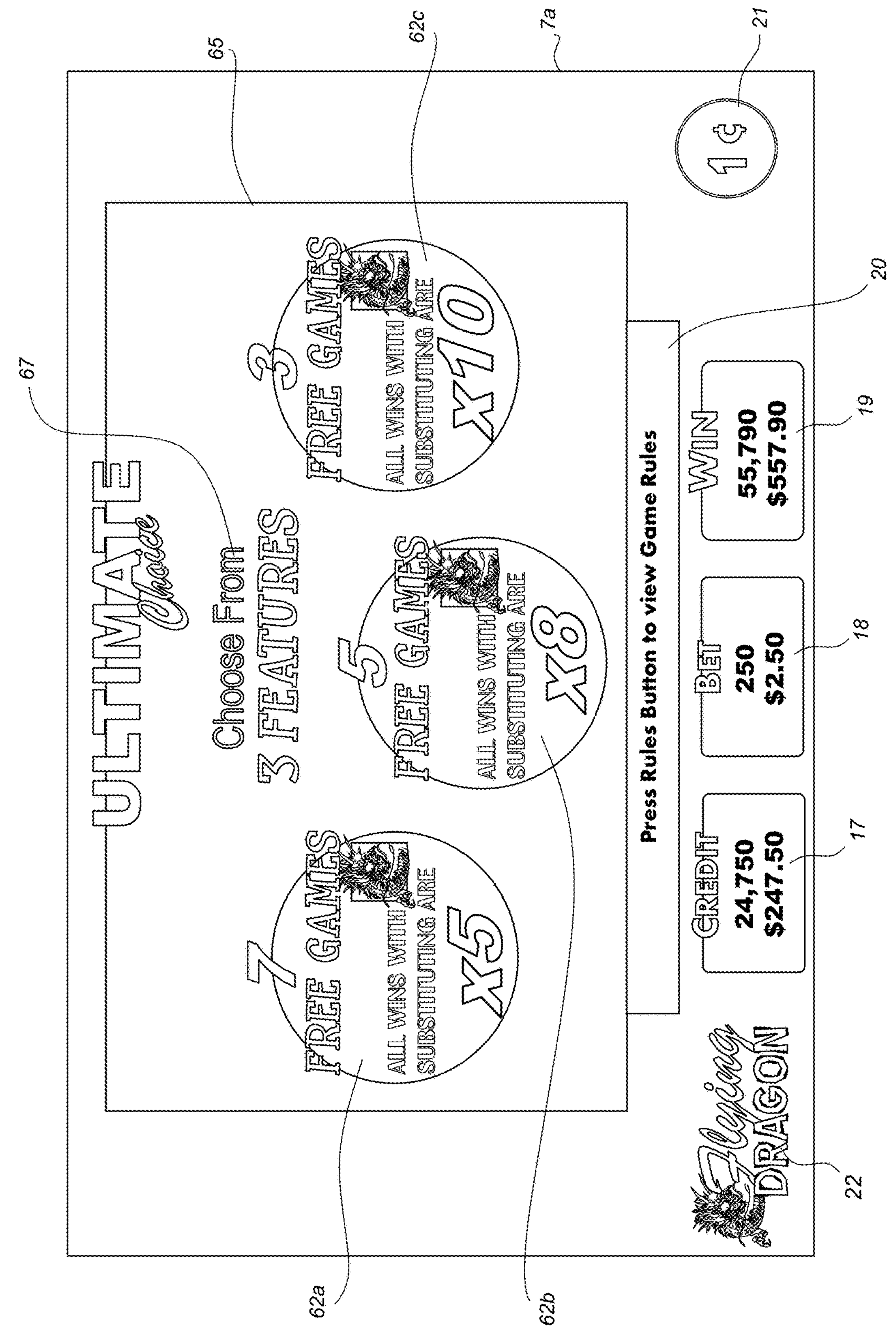
FIG. 9 is a front view of the display of the electronic gaming machine of FIG. 1 illustrating another selection screen.

In this embodiment, the predetermined threshold number for the Ultimate Choice tokens is 3. Assuming that the Ultimate Choice token meter 45 has a value of at least 3, the player is awarded a selection from three feature game options 62*a*, 62*b* and 62*c*, as best shown in FIG. 9. Where the Ultimate Choice token meter 45 has a value that is an integer multiple of the threshold number 3, such as six, nine or even twelve, then the player is entitled to make repeated selections of the feature game options 62*a*, 62*b* and 62*c* until the value of the Ultimate Choice token meter 45 falls below the threshold number of 3. These additional selections of the feature game options 62*a*, 62*b* and 62*c* are offered after conclusion of previously selected feature game.

Referring to FIG. 9, where corresponding features have been given the same reference numerals, a selection screen 65 appears on the video screen 7*a* displaying each feature game option 62*a*, 62*b* and 62*c*. A message 67 is also displayed indicating that the player can choose or select one of the feature game options 62*a*, 62*b* and 62*c*. Feature game option 62*a* comprises seven free spins where any winning combination using the substitute Dragon symbol 10*c* has the associated prize increased by the multiplier ×5. Feature game option 62*b* comprises five free spins where any winning combination using the substitute Dragon symbol 10*c* has the associated prize increased by the multiplier ×8. Feature game option 62*ca* comprises three free spins where any winning combination using the substitute Dragon symbol 10*c* has the associated prize increased by the multiplier ×10. Hence, in the feature game options 62*a*, 62*b* and 62*c* the player must again balance the number of free spins of the selected feature game against the multiplier value for winning combinations using the substitute Dragon symbol 10*c*. Thus, a higher number of free spins has a lower multiplier value, whereas a lower number of free spins has a higher multiplier value. Once the player makes a selection, the electronic game controller 4 then causes the lower video screen 7*a* to display the selected feature game from the feature game options 62*a*, 62*b* and 62*c*.

Figure 10:
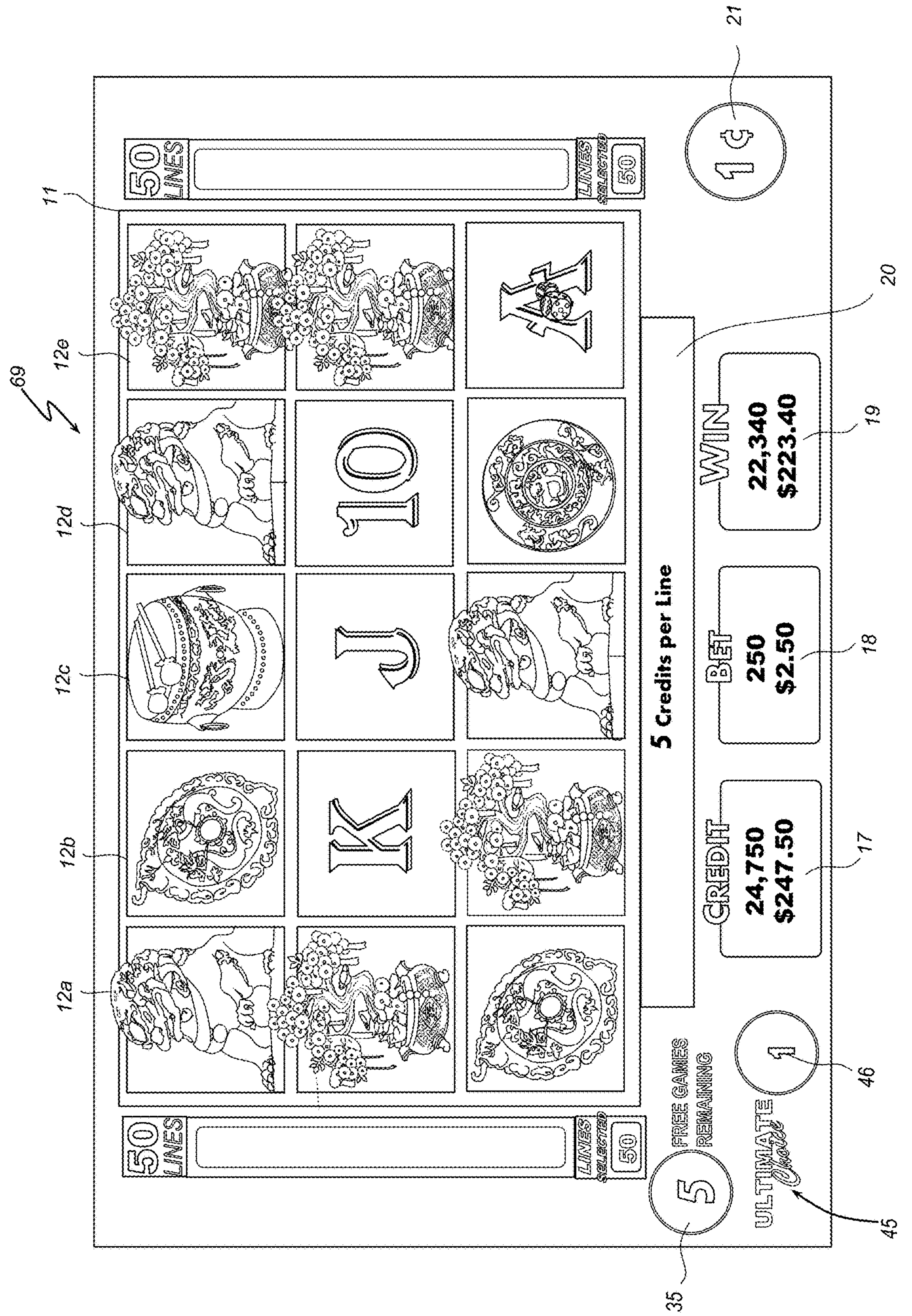
FIGS. 10 and 11 are front views of the display of the electronic gaming machine of FIG. 1 illustrating another feature game.

Referring to FIG. 10, where corresponding features have been given the same reference numerals, the player has selected feature game option 62*a* having seven free spins and a multiplier of ×5 for any winning combinations using the substitute Dragon symbol 10*c*. The selected feature game 69 uses the same array 11, reels 12*a* to 12*e*, game symbols 10, symbol positions 13 and pay lines 14 as in the base game 8, feature game 9 and selected feature game 59. The selected feature game 69 is an improved version of the selected feature game 59, and thus has enhancements compared to the feature game 9 and the selected feature game 59. Examples of these enhancements include different reel strips that increase the probability of obtaining a winning combination of symbols in the selected feature game 69 compared to the probability of the same winning combination in the feature game 59, as well as increased payouts or prizes for the same winning combinations and new symbols not available in the selected feature game 59 that confer game enhancing elements.

As shown in FIG. 10, the second free spin has concluded (as indicated by the counter 35 showing that only five free spins remain in the selected feature game 69). Also, the Ultimate Choice token meter 45 shows a number or value 46 of 1, indicating either that there was a previously accumulated Ultimate Choice token from the selected feature game 59 that has been retained or three Dragon symbols 10*c* had appeared in one of the previous free spins that resulted in the award of an Ultimate Choice token. Again, no Super Choice tokens are awarded for the appearance of three Dragon symbols 10*c*, unlike the feature game 9. The selected feature game 69 plays in substantially the same way as the feature game 9.

At the conclusion of the selected feature game 69 (i.e. after the end of the seventh free spin), the electronic game controller 4 then calculates the number 46 of Ultimate Choice tokens that has been accumulated by the player in the selected feature game, as indicated by its meter 45. As noted above, the number of Ultimate Choice tokens includes any Ultimate Choice tokens that were accumulated in the previously selected feature game 59. Again, in other embodiments, the number of accumulated Ultimate Choice tokens is limited to only those tokens that are awarded during play of the selected feature game 69.

If the number 46 of accumulated Ultimate Choice tokens meets the predetermined threshold number, then the player is awarded the choice or selection from a range of other feature games, and the selection screen 65 is displayed on the lower video screen 7*a* to enable the player to make a selection from the feature game options 62*a*, 62*b* and 62*c*. This process repeats until the number 46 of accumulated Ultimate Choice tokens falls below the predetermined threshold number of 3. Thus, in effect, continued accumulation of the Ultimate Choice tokens results in retriggering the feature game options 62*a*, 62*b* and 62*c*. If the number 46 of accumulated Ultimate Choice tokens does not meet the predetermined threshold number, then the electronic game controller 4 returns the electronic gaming machine 1 back to the base game 8, where the player must make a bet to play the base game.

Figure 11:
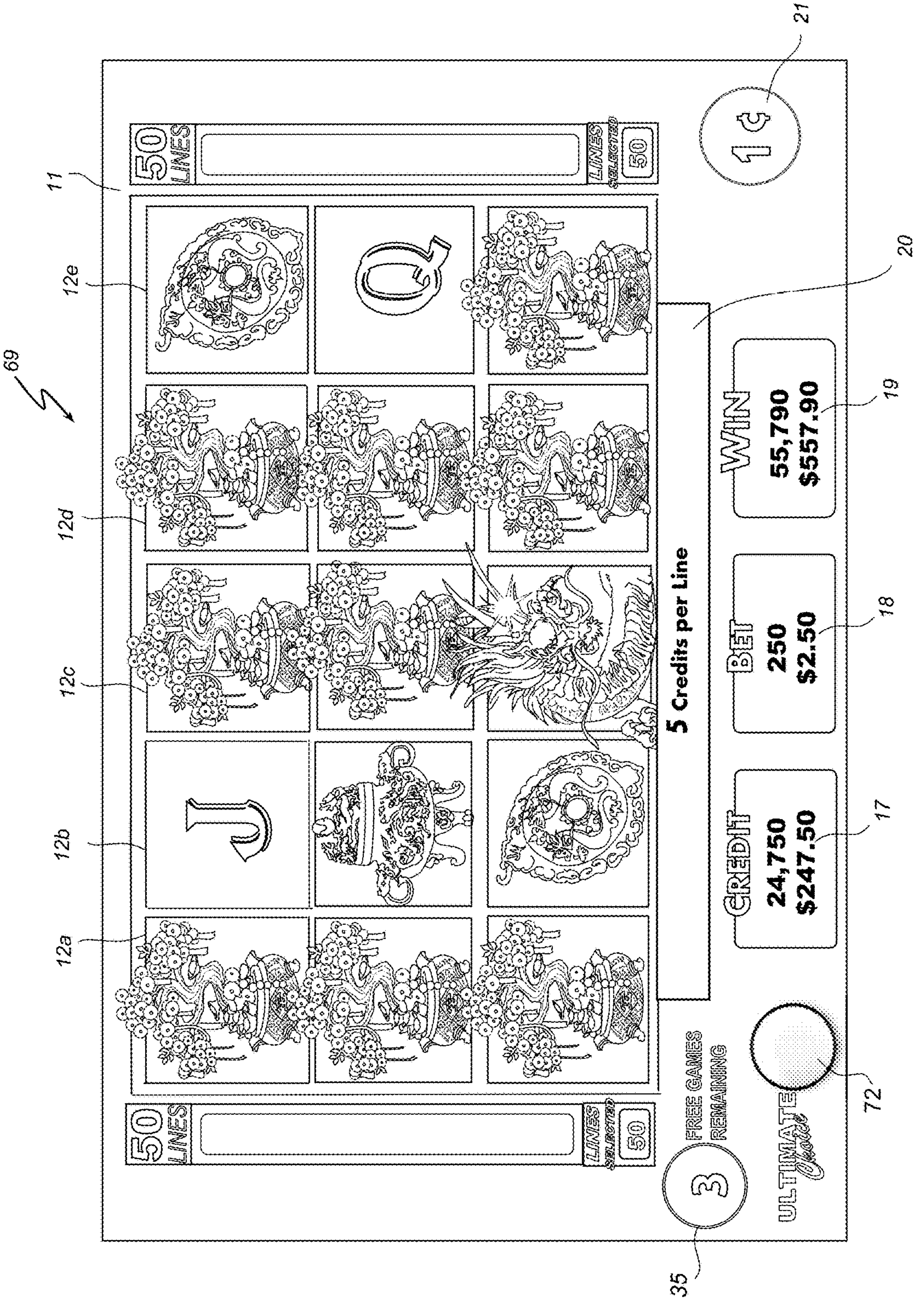

FIG. 11, where corresponding features have been given the same reference numerals, shows another selected feature game option 62*c* having three free spins and a multiplier of ×10 for any winning combinations using the substitute Dragon symbol 10*c*. In this Figure, the first free spin is yet to occur and the Ultimate Choice token meter 45 is blank as shown by reference numeral 72 to show that no Ultimate Choice tokens have been accumulated as yet. Alternatively, instead of being blank the Ultimate Choice token meter 45 may show a zero value.

In this embodiment of the invention, the Dragon symbol 10*c* acts as a special symbol for awarding both the Super Choice tokens and the Ultimate Choice tokens, the Super Choice tokens being awarded on the initial or first appearance of three Dragon symbols 10*c* in the feature game 9, while all subsequent appearances of three Dragon symbols 10*c* in the feature game 9 and selected feature games 59, 69 result in the award of Ultimate Choice tokens. It will be appreciated that in other embodiments, different symbols are used to award the different types of tokens. For example, a combination of jade horse symbols could be used to award the Super Choice tokens in the feature game 9 while three Dragon symbols 10*c* are still used to award Ultimate Choice tokens. This permits simultaneous collection or accumulation of Super Choice and Ultimate Choice tokens in the same play or spin of the feature game 9. Thus, the sets of selectable feature game options 49*a*, 49*b*, 49*c*, 62*a*, 62*b* and 62*c* can be separately triggered and individually playable. If both the sets of selectable feature game options 49*a*, 49*b*, 49*c*, 62*a*, 62*b* and 62*c* are triggered, one set of selectable feature game options becomes playable after the other set of selectable feature game options has been played.

In other embodiments, a third type of symbol is used to award Ultimate Choice tokens in the selected feature games 59, 69 to differentiate the Ultimate Choice tokens awarded in the feature game 9. This can result in Ultimate Choice tokens awarded in the feature game 9 not being carried over to the selected feature games 59, 69. In another embodiment, a separate token is used for the selected feature game 69 to accumulate in order to retrigger the selection of the feature game options 62*a*, 62*b* and 62*c*, or even another set of feature game options. In yet further embodiments, the functions of the Dragon symbol 10*c* are divided so that there is a separate trigger symbol (which could be a scatter symbol) for triggering the feature game 9, a separate substitute symbol used across all the games and one or more special symbols that result in the award of the Super Choice and Ultimate Choice tokens.

Figure 12:
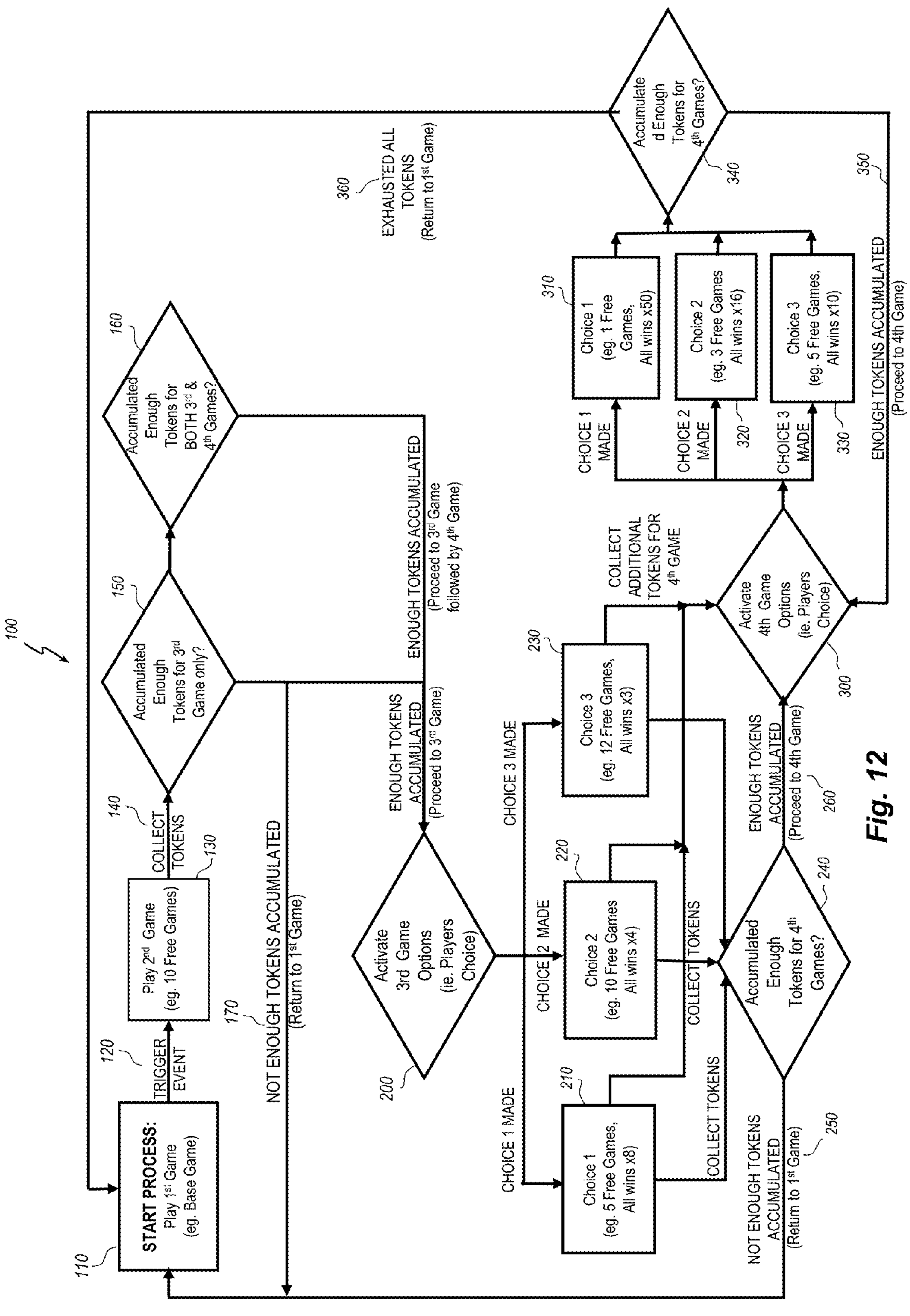
FIG. 12 is a schematic drawing of a gaming method according to one embodiment of the invention.

FIG. 12 shows a decision tree employed by the electronic game controller 4 in operating the electronic gaming machine 1 according to one embodiment the invention, where corresponding features have been given the same reference numerals. The method 100 is applicable to a set of games provided on the electronic gaming machine 1, but will be described in context of the embodiment described in relation to FIGS. 3 to 11. The method 100 starts with commencement of a first game, such as the base game 8, at 110 by the electronic game controller 4 in response to a bet being made by the player. When the trigger event occurs in the (first) base game 8 at 120, the electronic game controller 4 then causes a second game, such as the feature game 9, to be displayed on the lower video display screen 7*a* at 130. During play of the feature game 9, tokens are collected at 140 based on the appearances of the combination of three Dragon symbols 10*c*, the tokens being either Super Choice tokens or Ultimate Choice tokens. At conclusion of the feature game 9 at 150, the electronic game control 4 determines whether enough Super Choice tokens have been accumulated for the set of selectable feature game options 49*a*, 49*b* and 49*c* (designated as a third game) to be offered to the player. The electronic game controller 4 also determines at 160 whether enough Ultimate Choice tokens have been accumulated for the second set of selectable feature game option 62*a*, 62*b* and 62*c* (designated as a fourth game). In both cases, if there are an insufficient number of Super Choice tokens to meet the threshold number, then electronic controller 4 returns the electronic gaming machine 1 to the base game 8 at 170. However, where the Ultimate Choice tokens for the second set of selectable feature game option 62*a*, 62*b* and 62*c* is independent of the award of the set of selectable feature game options 49*a*, 49*b* and 49*c*, then electronic controller 4 returns the electronic gaming machine 1 to the base game 8 if there are an insufficient number of Ultimate Choice tokens to meet the threshold number as well.

Where enough Super Choice tokens and/or Ultimate Choice tokens have been accumulated by the player, then at 200 the electronic game controller 4 activates the set of selectable feature game options 49*a*, 49*b* and 49*c*. The player then makes a selection of one of the feature game options and plays the associated selected feature game 59 at

210, 220 or 230, during which Ultimate Choice tokens can be collected. At conclusion of the selected feature game 59, the electronic game controller 4 then calculates at 240 whether enough Ultimate Choice tokens have been accumulated to meet the threshold number to offer of the second set of feature game options 62*a*, 62*b* and 62*c*. If not enough Ultimate Choice tokens have been accumulated for the second set of feature game options 62*a*, 62*b* and 62*c*, then the electronic game controller 4 at 250 returns the electronic gaming machine 1 to the base game 8 at 110. Where enough Ultimate Choice tokens have been accumulated to meet the threshold number at 260, then the electronic game controller 4 proceeds to offer the second set of feature game options 62*a*, 62*b* and 62*c* at 300.

Alternatively, where the player had already accumulated enough Ultimate Choice tokens at the conclusion of the selected feature game 59 (as indicated at 160), the electronic game controller 4 bypasses the determination at 240 and proceeds automatically to providing the second set of feature game options 62*a*, 62*b* and 62*c* at 300. Any additional Ultimate Choice tokens collected during play of the selected feature game 59 are also automatically added to the Ultimate Choice meter 45 in the selected feature game 69.

At 310, 320 or 330, the player selects one of the feature game options 62*a*, 62*b* and 62*c* and the electronic game controller 4 causes display of the associated selected feature game 69. Ultimate Choice tokens are again collected during play of the selected feature game 69. At the end of the selected feature game 69, the electronic game controller 4 determines at 340 whether enough Ultimate Choice tokens have been accumulated to retrigger or reactivate the second set of feature game options 62*a*, 62*b* and 62*c*. If there are enough Ultimate Choice tokens accumulated to meet the threshold number at 350, then the electronic game controller 4 returns the electronic gaming machine 1 to 300 for player selection of the feature game options 62*a*, 62*b* and 62*c*. If not enough Ultimate Choice tokens have been accumulated, then the electronic game controller 4 returns the electronic gaming machine 1 to the base game 8 at 360.

While this particular method 10 employed by the electronic game controller 4 reflects operation of the embodiment illustrated in FIGS. 3 to 11, it will be appreciated that in other embodiments the method will vary according to the variations involved with those embodiments. For example, where a different type of token is collected in the selected feature game 69 to retrigger the offer of the selectable game options 62*a*, 62*b* and 62*c*, then the electronic game controller 4 will determine whether enough of those tokens have been accumulated at 340, instead of the Ultimate Choice tokens.

Other embodiments of the invention contemplated by the inventor include the examples described below, which have the same game structure of a base game 8, feature game 9 and two sets of selectable feature game options 49*a*, 49*b* and 49*c*, and 62*a*, 62*b* and 62*c*. In these contemplated embodiments, the selectable game options 49*a*, 49*b* and 49*c* become available upon accumulation of the threshold number of Super Choice tokens and selectable game options 62*a*, 62*b* and 62*c* become available upon accumulation of the threshold number of Ultimate Choice tokens.

Example 1

In this example, the electronic gaming machine 1 comprises a base game 8 with the following feature games:

| | |
|---|---|
| First Feature Game | 10 free spins or games with stacks of special symbol A and all wins with substitute symbol are increased by an x2 multiplier. Initial appearance of 3 scatter symbols awards 1 Super Choice token. Subsequent appearances of 3 scatter symbols award 1 Ultimate Choice token.<br>A maximum of 1 Super Choice and 9 Ultimate Choice tokens can be won. |
| Super Choice feature game options | (1) 8 free spins or games with all wins with substitute symbol increased by a x5 multiplier and stacks of special symbol<br>(2) 5 free spins or games with all wins with substitute symbol increased by a x5 multiplier and stacks of special symbol<br>(3) 3 free spins or games with all wins with substitute symbol increased by a x8 multiplier and stacks of special symbol<br>Each appearance of 3 scatter symbols awards 1 Ultimate Choice token |
| Ultimate Choice feature game options | (1) 3 free spins or games with all wins with substitute symbol increased by a x10 multiplier and stacks of special symbol<br>(2) 2 free spins or games with all wins with substitute symbol increased by a x15 multiplier and stacks of special symbol<br>(3) 1 free spin or game with all wins with substitute symbol increased by a x20 multiplier and stacks of special symbol<br>Each appearance of 3 scatter symbols awards 1 Ultimate Choice token |

Example 2

In this example, the electronic gaming machine 1 comprises a base game 8 with the following feature games:

| | |
|---|---|
| First Feature Game | 10 free spins or games with stacks of substitute symbols on reels 2, 3 and 4<br>Initial appearance of 3 scatter symbols awards 1 Super Choice token |

-continued

| | |
|---|---|
| | Subsequent appearances of 3 scatter symbols award 1 Ultimate Choice token<br>A maximum of 1 Super Choice and 9 Ultimate Choice tokens can be won |
| Super Choice feature game options | (1) 5 free spins or games with stacks of special symbol A (high pay outs for wins and low stacking of special symbol A)<br>(2) 5 free spins or games with stacks of special symbol B (medium pay outs for wins and medium stacking of special symbol B)<br>(3) 5 free spins or games with stacks of special symbol C (low pay outs for wins and high stacking of special symbol C)<br>Each appearance of 3 scatter symbols awards 1 Ultimate Choice token |
| Ultimate Choice feature game options | (1) 3 free spins or games with stacks of special symbol A and all wins with substitute symbol increased by a x2 multiplier<br>(2) 3 free spins or games with stacks of special symbol B and all wins with substitute symbol increased by a x2 multiplier<br>(3) 3 free spins or games with stacks of special symbol C and all wins with substitute symbol increased by a x2 multiplier<br>Each appearance of 3 scatter symbols awards 1 Ultimate Choice token |

Example 3

In this example, the electronic gaming machine 1 comprises a base game 8 with the following feature games:

| | |
|---|---|
| First Feature Game | 10 free spins or games with stacks of substitute symbols on reels 2, 3 and 4<br>Initial appearance of 3 scatter symbols awards 1 Super Choice token<br>Second appearance of 3 scatter symbols awards 1 Ultimate Choice token<br>Third appearance of 3 scatter symbols awards 1 Mega Ultimate Choice token |
| Super Choice feature game options | (4) 12 free spins or games with a x1 multiplier symbol (that also acts as a substitute symbol) held in a symbol position on reel 3 for each free spin<br>(5) 10 free spins or games with a x2 multiplier symbol (that also acts as a substitute symbol) held in a symbol position on reel 3 held for each free spin<br>(6) 8 free spins or games with a x3 multiplier symbol (that also acts as a substitute symbol) held in a symbol position on reel 3 for each free spin<br>No tokens are collected |
| Ultimate Choice feature game options | (1) 7 free spins or games with a x1 multiplier symbol (that also acts as a substitute symbol) held in each symbol position on reel 3 and a symbol position on reels 2 and 4 for each free spin<br>(2) 5 free spins or games with a x2 multiplier symbol (that also acts as a substitute symbol) held in each symbol position on reel 3 and a symbol position on reels 2 and 4 for each free spin<br>(3) 3 free spins or games with a x3 multiplier symbol (that also acts as a substitute symbol) held in each symbol position on reel 3 and a symbol position on reels 2 and 4 for each free spin<br>No tokens are collected |
| Mega Ultimate Choice feature game options | (1) 10 free spins or games with a x1 multiplier symbol (that also acts as a substitute symbol) held in each symbol position on reel 3 and a symbol position on reels 2 and 4 for each free spin<br>(2) 8 free spins or games with a x2 multiplier symbol (that also acts as a substitute symbol) held in each symbol position on reel 3 and a symbol position on reels 2 and 4 for each free spin<br>(3) 5 free spins or games with a x3 multiplier symbol (that also acts as a substitute symbol) held in each symbol position on reel 3 and a symbol position on reels 2 and 4 for each free spin<br>No tokens are collected |

Example 4

In this example, the electronic gaming machine 1 comprises a base game 8 with the following feature games:

| | |
|---|---|
| First Feature Game | 10 free spins or games with stacks of substitute symbols on reels 2, 3, 4 and 5, and increasing win multiplier for each free spin up to an x8 win multiplier for each reel<br>Initial appearance of 3 scatter symbols awards 1 Super Choice token<br>Subsequent appearances of 3 scatter symbols award 1 Ultimate Choice token<br>A maximum of 1 Super Choice and 9 Ultimate Choice tokens can be won |
| Super Choice feature game options | (1) 8 free spins or games with increasing win multiplier for each free spin up to an x10 win multiplier for each reel<br>(2) 7 free spins or games with increasing win multiplier for each free spin up to an x12 win multiplier for each reel<br>(3) 5 free spins or games with increasing win multiplier for each free spin up to an x15 win multiplier for each reel<br>Each appearance of 3 scatter symbols awards 1 Ultimate Choice token |
| Ultimate Choice feature game options | (1) 5 free spins or games with increasing win multiplier for each free spin up to an x15 win multiplier for each reel<br>(2) 3 free spins or games with increasing win multiplier for each free spin up to an x20 win multiplier for each reel<br>(3) 2 free spins or games with increasing win multiplier for each free spin up to an x25 win multiplier for each reel<br>Each appearance of 3 scatter symbols awards 1 Ultimate Choice token |

Example 5

In this example, the electronic gaming machine 1 comprises a base game 8 with the following feature games:

| | |
|---|---|
| First Feature Game | 10 free spins or games with stacks of substitute symbols on reels 2, 3 and 4<br>Initial appearance of 3 scatter symbols awards 1 Super Choice token<br>Subsequent appearances of 3 scatter symbols award 1 Ultimate Choice token<br>A maximum of 1 Super Choice and 9 Ultimate Choice tokens can be won |
| Super Choice feature game options | (4) 10 free spins or games with special symbol A, B and C on reels 2, 3 and 4 being replaced with the scatter trigger symbol<br>(5) 8 free spins or games with special symbol A, B, C and D on reels 2, 3 and 4 being replaced with the scatter trigger symbol<br>(6) 5 free spins or games with special symbol A, B, C, D and E on reels 2, 3 and 4 being replaced with the scatter trigger symbol<br>Each appearance of 3 scatter symbols awards 1 Ultimate Choice token. All wins with scatter symbol substituting are increased by an x2 multiplier. |
| Ultimate Choice feature game options | (1) 8 free spins or games with special symbol A, B and C on reels 2, 3 and 4 being replaced with the scatter trigger symbol. All wins with scatter symbol substituting are increased by an x3 multiplier.<br>(2) 6 free spins or games with special symbol A, B, C and D on reels 2, 3 and 4 being replaced with the scatter trigger symbol. All wins with scatter symbol substituting are increased by an x4 multiplier.<br>(3) 4 free spins or games with special symbol A, B, C, D and E on reels 2, 3 and 4 being replaced with the scatter trigger symbol. All wins with scatter symbol substituting are increased by an x5 multiplier.<br>Each appearance of 3 scatter symbols awards 1 Ultimate Choice token |

Example 6

In this example, the electronic gaming machine 1 comprises a base game 8 with the following feature games:

| | |
|---|---|
| First Feature Game | 10 free spins or games with stacks of substitute symbols on reels 2, 3 and 4<br>Initial appearance of 3 scatter symbols awards 1 Super Choice token<br>Subsequent appearances of 3 scatter symbols award 1 Ultimate Choice token<br>A maximum of 1 Super Choice and 9 Ultimate Choice tokens can be won |
| Super Choice feature game options | (1) 15 spins with the possibility of a respin feature being triggered when the special symbol A appears on any 2 or more of the reels 2, 3 or 4. During the respin feature the reels with special symbol A are spun again with the substitute symbol.<br>(2) 10 spins with the possibility of a respin feature being triggered when the special symbol A appears on any 2 or more of the reels 2, 3 or 4. During the respin feature the reels with special symbol A are spun again with the substitute symbol and an x2 multiplier symbol.<br>(3) 8 spins with the possibility of a respin feature being triggered when the special symbol A appears on any 2 or more of the reels 2, 3 or 4. During the respin feature the reels with special symbol A are spun again with the substitute symbol and an x3 multiplier symbol.<br>Each appearance of 3 scatter symbols awards 1 Ultimate Choice token. |
| Ultimate Choice feature game options | (4) 8 spins with the possibility of a respin feature being triggered when the special symbol A appears on any 2 or more of the reels 2, 3 or 4. During the respin feature the reels with special symbol A are spun again with the substitute symbol and an x3 multiplier symbol.<br>(5) 6 spins with the possibility of a respin feature being triggered when the special symbol A appears on any 2 or more of the reels 2, 3 or 4. During the respin feature the reels with special symbol A are spun again with the substitute symbol and an x4 multiplier symbol.<br>(6) 4 spins with the possibility of a respin feature being triggered when the special symbol A appears on any 2 or more of the reels 2, 3 or 4. During the respin feature the reels with special symbol A are spun again with the substitute symbol and an x5 multiplier symbol.<br>Each appearance of 3 scatter symbols awards 1 Ultimate Choice token. |

Example 7

In this example, the electronic gaming machine 1 comprises a base game 8 with the following feature games:

| | |
|---|---|
| First Feature Game | 10 free spins or games with stacks of substitute symbols on reels 2, 3 and 4<br>Initial appearance of 3 scatter symbols awards 1 Super Choice token<br>Subsequent appearances of 3 scatter symbols award 1 Ultimate Choice token<br>A maximum of 1 Super Choice and 9 Ultimate Choice tokens can be won |
| Super Choice feature game options | (1) 15 free spins or games with block expansion feature.<br>(2) 10 free spins or games with block expansion feature and all wins with the scatter trigger symbol substituting are increased by an x2 multiplier.<br>(3) 8 free spins or games with block expansion feature and all wins with the scatter trigger symbol substituting are increased by an x3 multiplier.<br>Each appearance of 3 scatter symbols awards 1 Ultimate Choice token. During the block expansion feature all symbols within the block defined between the two special A symbols and appearing on reels 2 and 4 are changed to substitute or wild symbols. |

-continued

| | |
|---|---|
| Ultimate Choice feature game options | (1) 7 free spins or games with block expansion feature.<br>(2) 5 free spins or games with block expansion feature and all wins with scatter trigger symbol substituting are increased by an x2 multiplier.<br>(3) 3 free spins or games with block expansion feature and all wins with scatter trigger symbol substituting are increased by an x3 multiplier.<br>Each appearance of 3 scatter symbols awards 1 Ultimate Choice token. During the block expansion feature all symbols within the block defined between the two special A symbols and appearing on reels 1 and 5 are changed to substitute or wild symbols. |

Example 8

In this example, the electronic gaming machine 1 comprises a base game 8 with the following feature games:

| | |
|---|---|
| First Feature Game | 10 free spins or games with stacks of special symbol A and all wins with substitute symbol are increased by an x2 multiplier. Initial appearance of 3 scatter symbols awards 1 Super Choice token. Subsequent appearances of 3 scatter symbols award 1 Ultimate Choice token.<br>A maximum of 1 Super Choice and 9 Ultimate Choice tokens can be won. |
| Super Choice feature game options | (4) 10 free spins or games with all wins with substitute symbol increased by an x2 multiplier and stacks of the special symbol<br>(5) 8 free spins or games with all wins with substitute symbol increased by an x3 multiplier and stacks of the special symbol<br>(6) 5 free spins or games with all wins with substitute symbol increased by an x5 multiplier and stacks of the special symbol<br>Each appearance of 3 scatter symbols awards 1 Ultimate Choice token |
| Ultimate Choice feature game options | (1) 7 free spins or games with all wins with substitute symbol increased by a x5 multiplier and stacks of the special symbol<br>(2) 5 free spins or games with all wins with substitute symbol increased by a x8 multiplier and stacks of the special symbol<br>(3) 3 free spin or game with all wins with substitute symbol increased by a x10 multiplier and stacks of the special symbol<br>Each appearance of 3 scatter symbols awards 1 Ultimate Choice token |

It should be noted that EXAMPLE 3 is unlike the other examples in that there is a another set of selectable feature game options, being the Mega Ultimate Choice, which increase the number of free spins offered compared to the Ultimate Choice set of selectable feature game options, but provide same game enhancements. In addition, tokens are only collected in the feature game 9 and not in the selectable feature games provided by the Super Choice, Ultimate Choice and Mega Ultimate Choice selectable feature game options.

Figure 13:
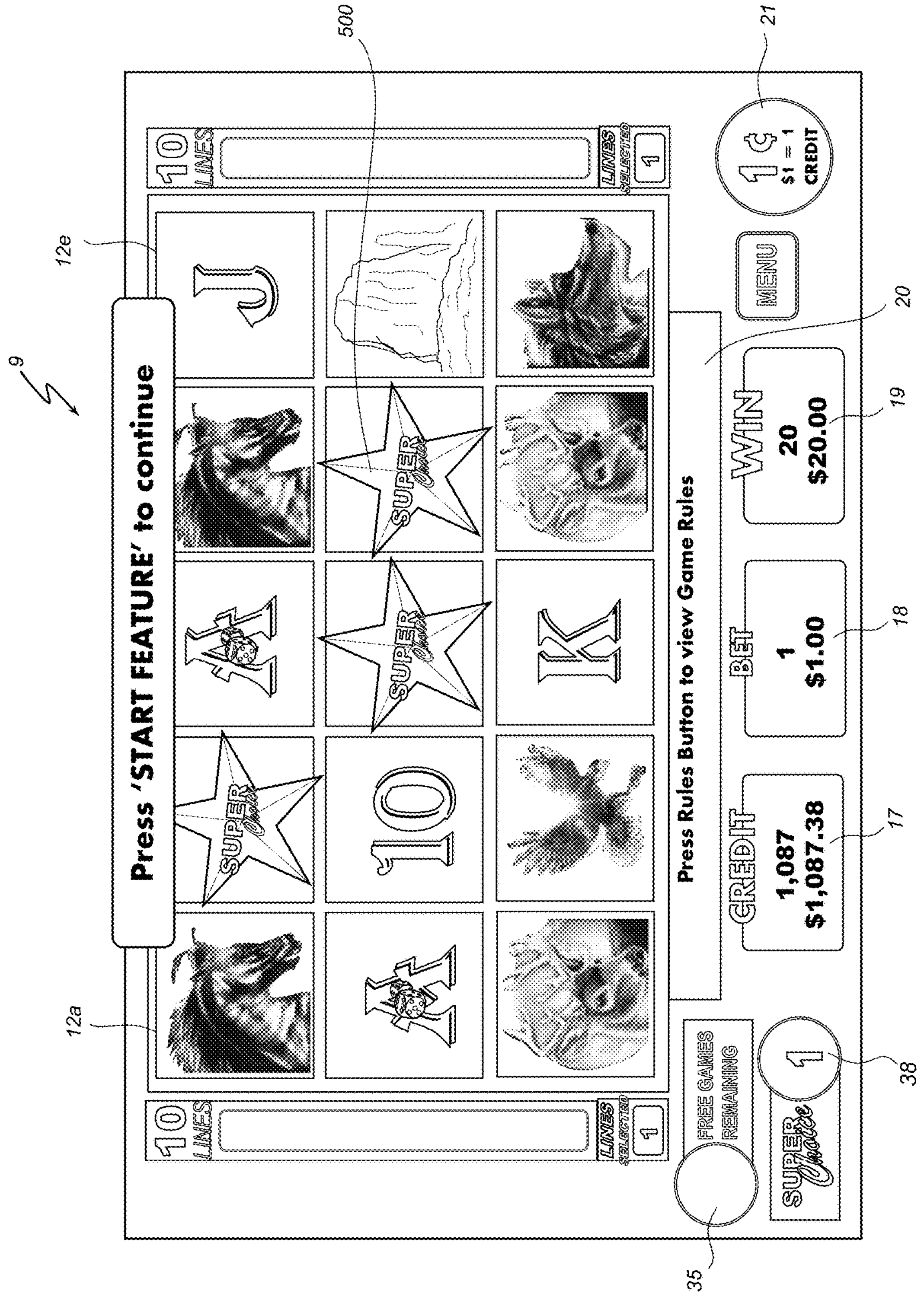
FIGS. 13 to 23 are front views of the display of the electronic gaming machine of FIG. 1 illustrating a feature game, selection screens and a selected feature game.
Figure 14:
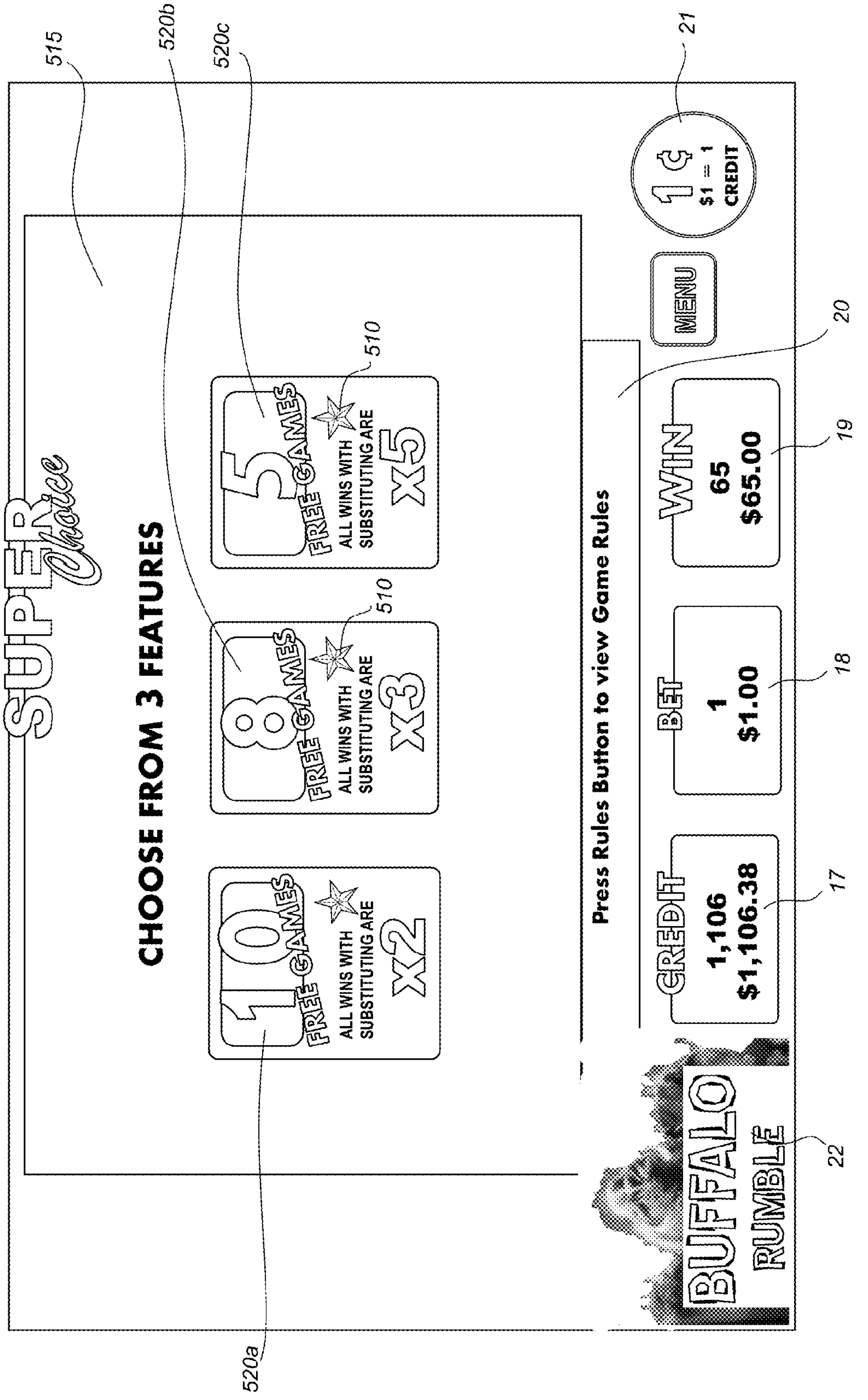

A further embodiment of the invention is illustrated in FIGS. 13 to 17, where corresponding features have been given the same reference numerals. In this embodiment, the appearance of three silver star symbols 500 on the reels 12 results in the award of a Super Choice token, as best shown in FIG. 13, where the silver star symbols optionally have the word "Super Choice" superimposed. The appearance of three gold star symbols 510 results in the award of an Ultimate Choice token. Both the silver star and gold star symbols 500, 510 also act as substitute or wild card symbols in the game of this embodiment, which is called "Buffalo Rumble". As shown in FIG. 14, a selection screen 515 appears on the video screen 7*a* displaying each feature game option 520*a*, 520*b* and 520*c* that is selectable upon reaching the threshold number of one Super Choice token. The selectable feature game options for the Super Choice are best shown in FIG. 14 and are set out in the table below.

| | |
|---|---|
| Super Choice feature game options | (1) 10 free spins or games with an x 2 win multiplier for any winning combinations having a gold star symbol 510.<br>(2) 8 free spins or games with an x 3 win multiplier for any winning combinations having a gold star symbol 510.<br>(3) 5 free spins or games with an x 5 win multiplier for any winning combinations having a gold star symbol 510. |

Figure 15:
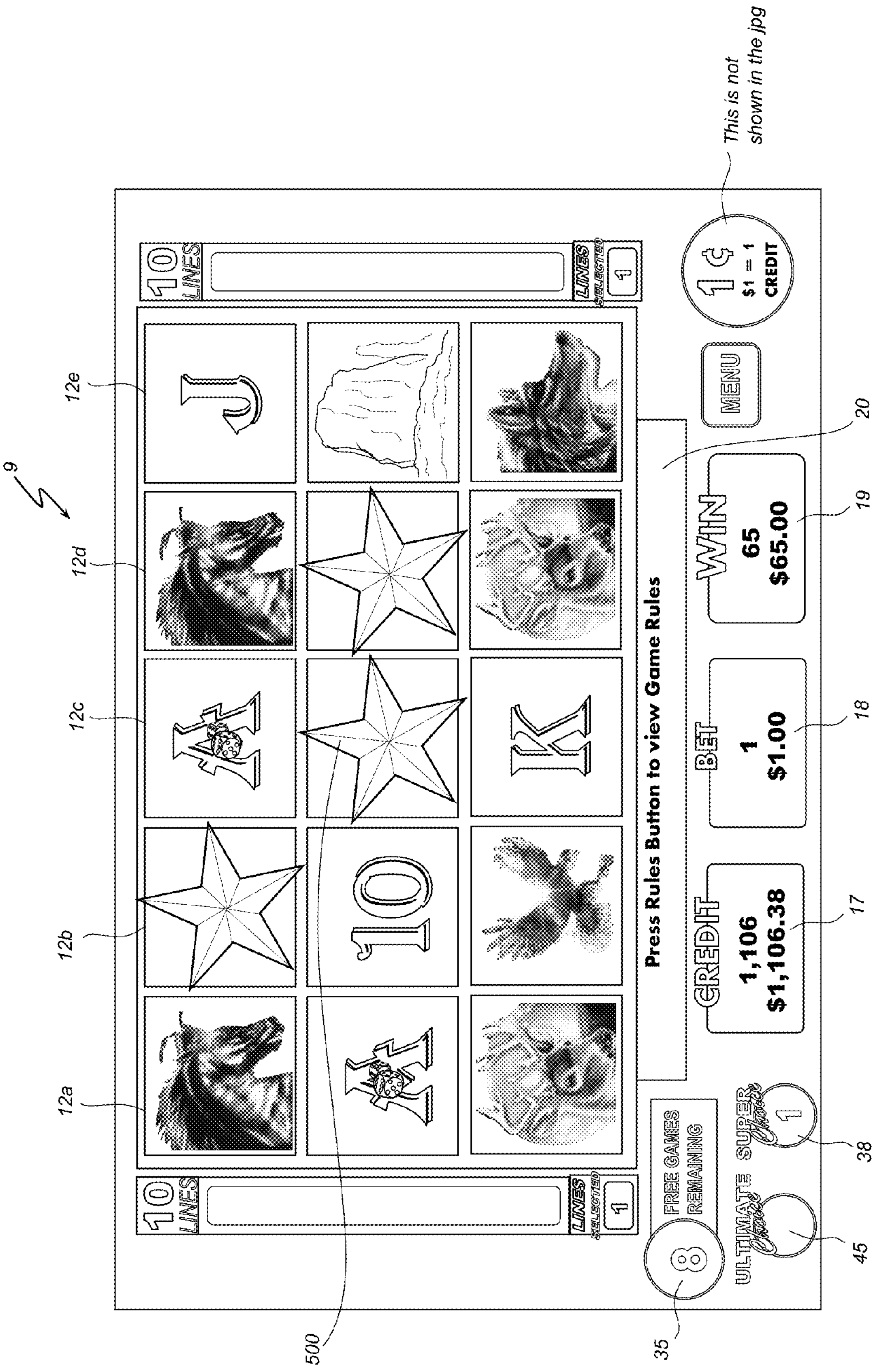
Figure 16:
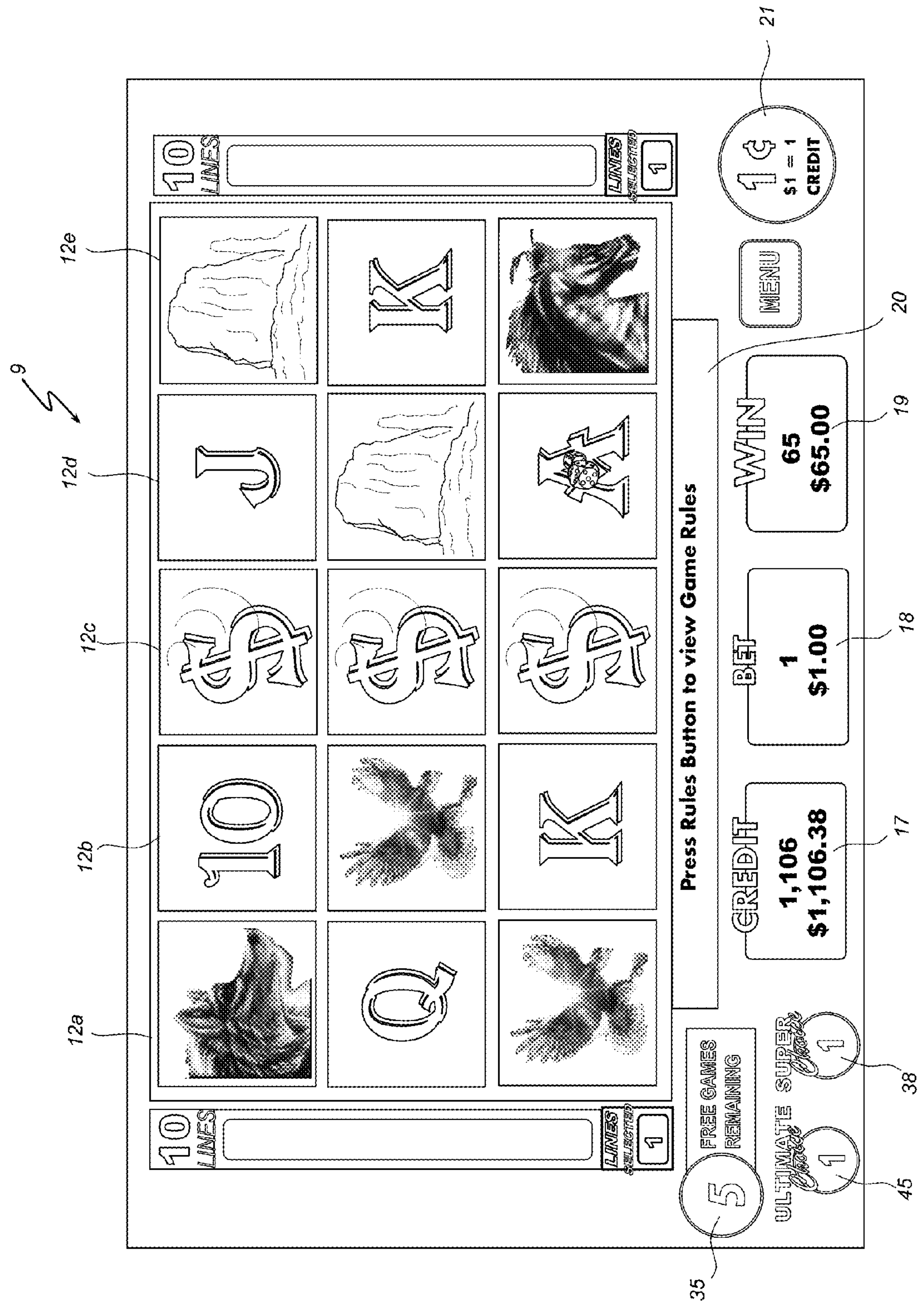

Once the feature game option is selected, then the selected feature game commences, as shown in FIGS. 15 and 16. Common to all of the selectable feature game options, each appearance of 3 silver star symbols awards 1 Super Choice token and each appearance of 3 gold star symbols awards Ultimate Choice token. Thus, a player may retrigger the Super Choice feature game option during play of the selected feature game. For example, as shown in FIG. 15, the player has already accumulated a Super Choice token as indicated in the Super Choice token meter 38 with eight free spins remaining showing on the counter 35. FIG. 16 shows a later spin in the same feature game, where, the Super Choice and Ultimate Choice token meters 38, 45 each indicate that the player has accumulated one of each type of token during play with only five free spins remaining indicated on the counter 35.

Figure 17:
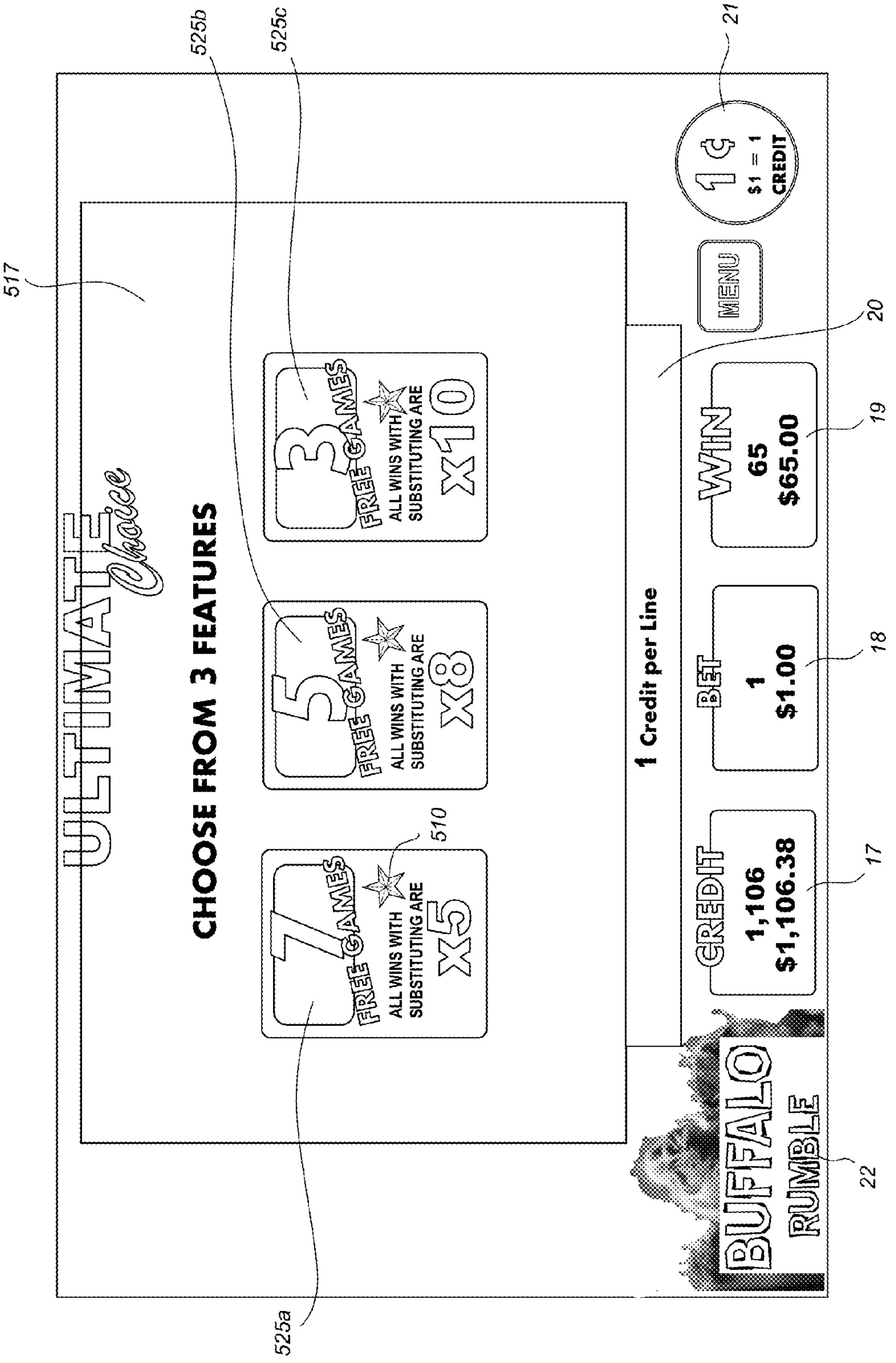

At the end of play of the selected feature game, the electronic game controller 4 determines whether sufficient Super Choice and/or Ultimate Choice tokens have been accumulated to offer the player a range of selectable feature game options 525*a*, 525*b* and 525*c*. Once all the Super Choice tokens have been exhausted, then the player is offered a range of selectable feature game options under the Ultimate Choice selection screen 517, as best shown in FIG. 17 and set out in the table below.

| | | |
|---|---|---|
| Ultimate Choice feature game options | (1) | 7 free spins or games with a x 5 win multiplier for any winning combinations having a gold star symbol 510 |
| | (2) | 5 free spins or games with a x 8 win multiplier for any winning combinations having a gold star symbol 510 |
| | (3) | 3 free spins or games with a x 10 win multiplier for any winning combinations having a gold star symbol 510 |

It will be appreciated that the Ultimate Choice feature game options could be offered prior to a second offer of the Super Choice feature game options, instead of exhausting the Super Choice feature game options. In all other respects, this embodiment operates in the same way as described above in relation to the previous embodiments.

Figure 18:
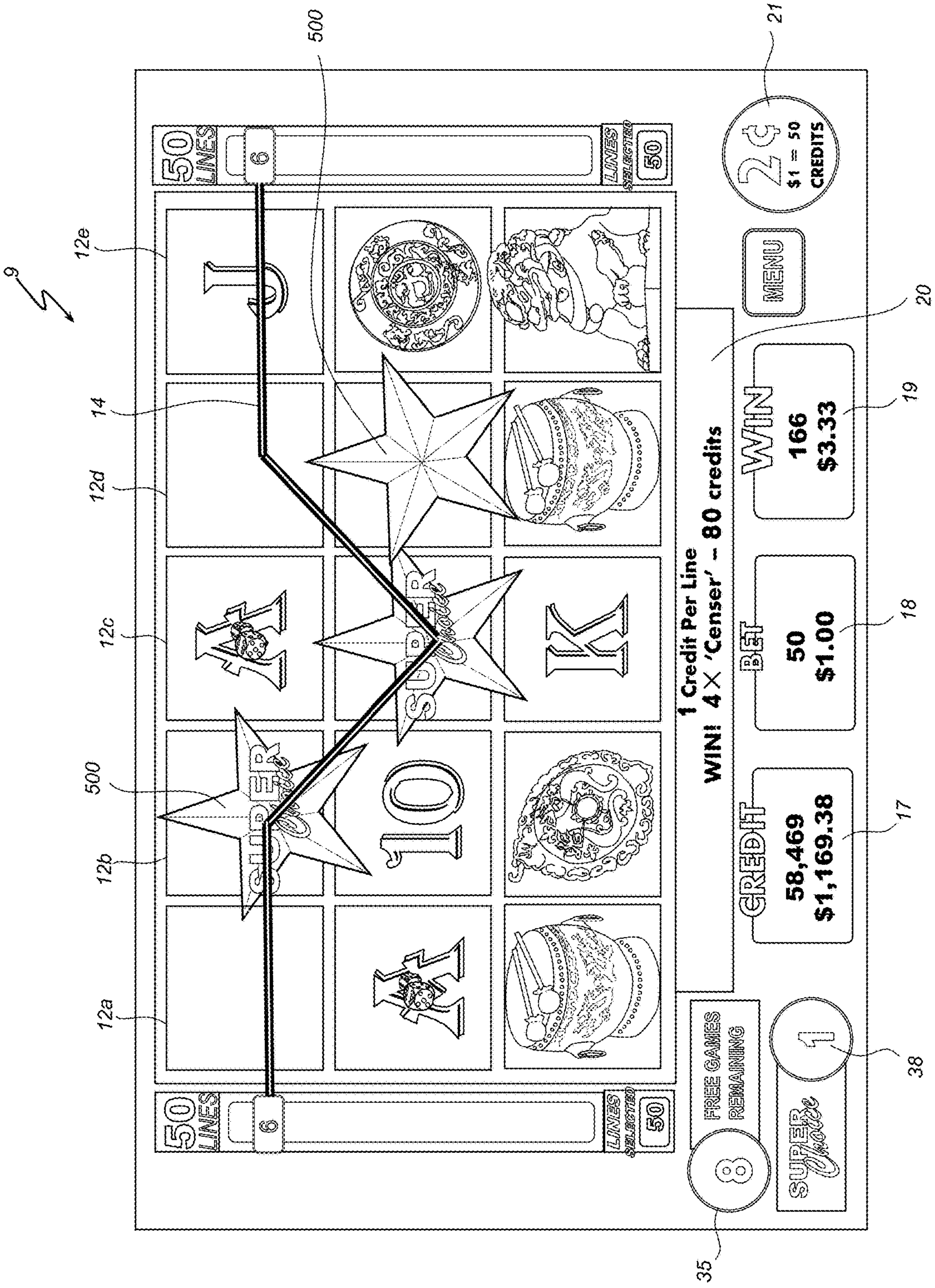
Figure 19:
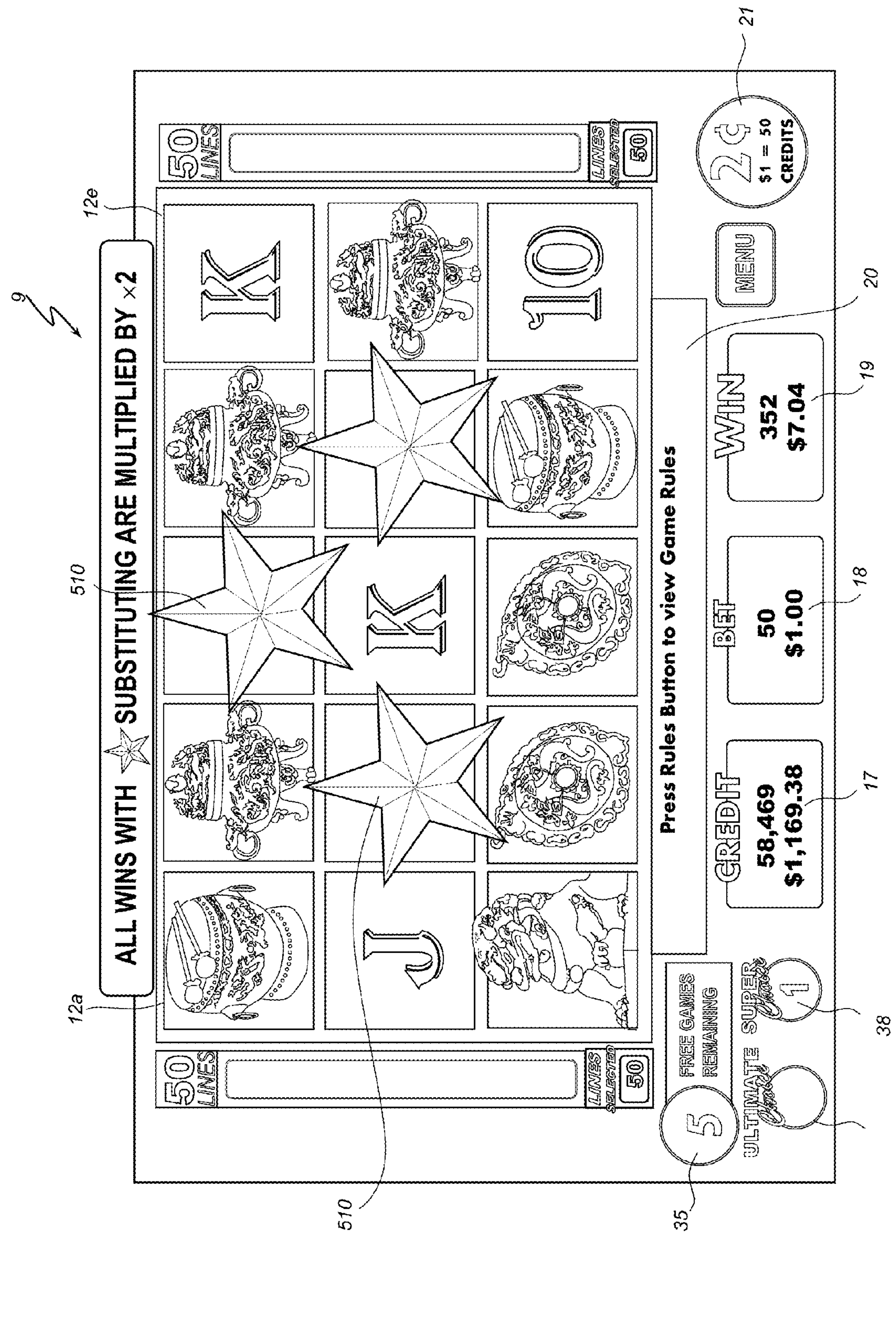
Figure 20:
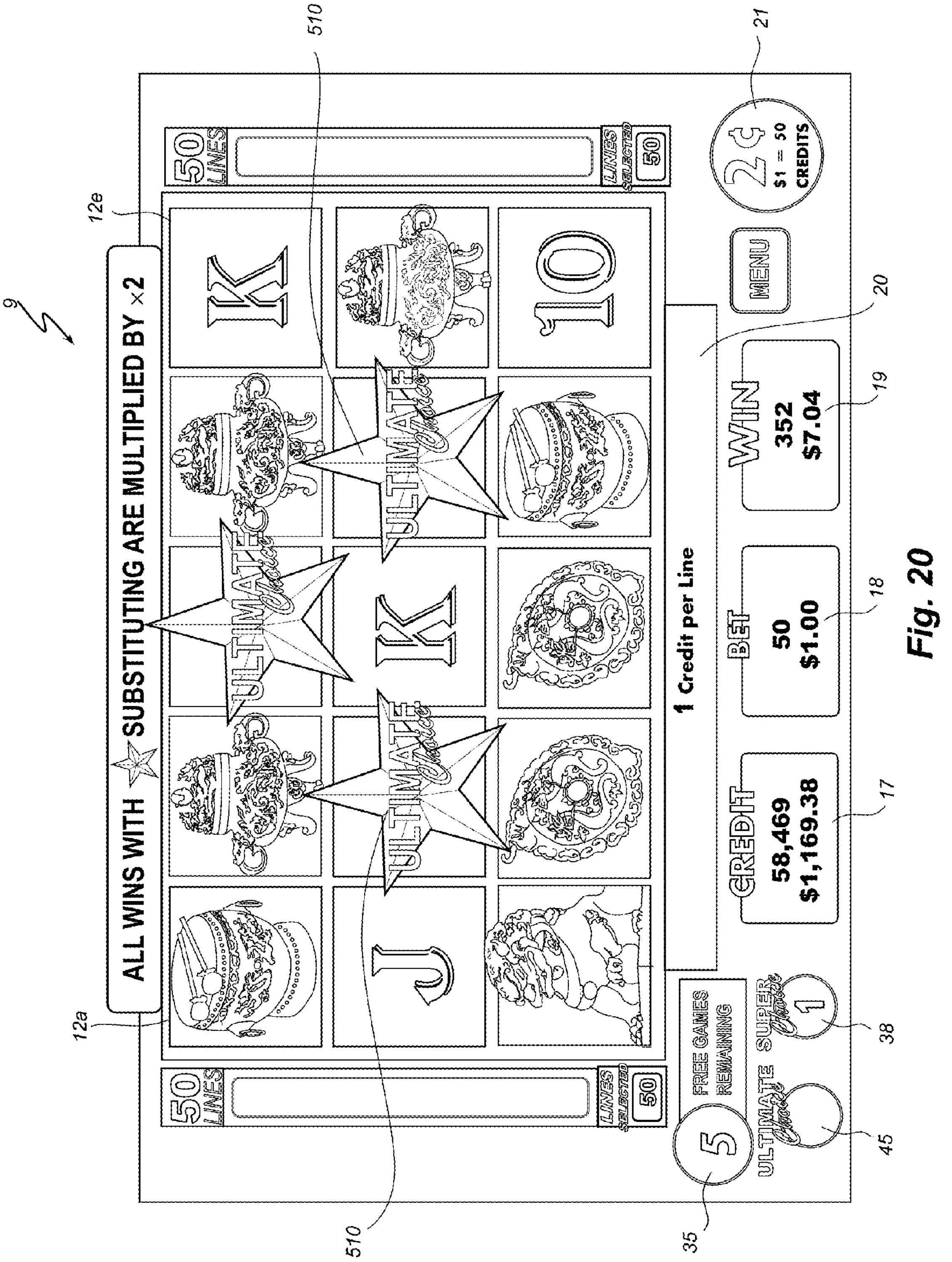
Figure 21:
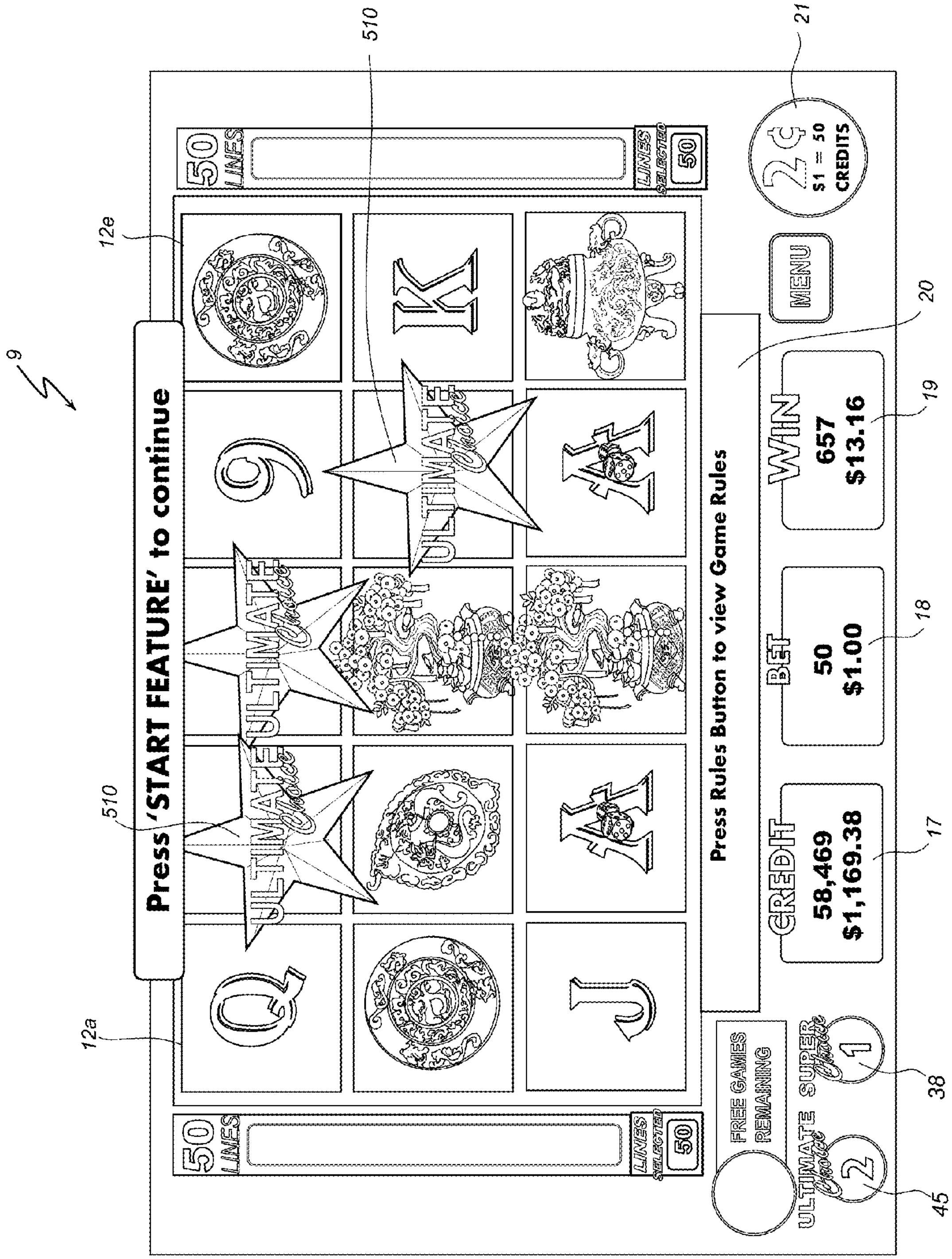
Figure 22:
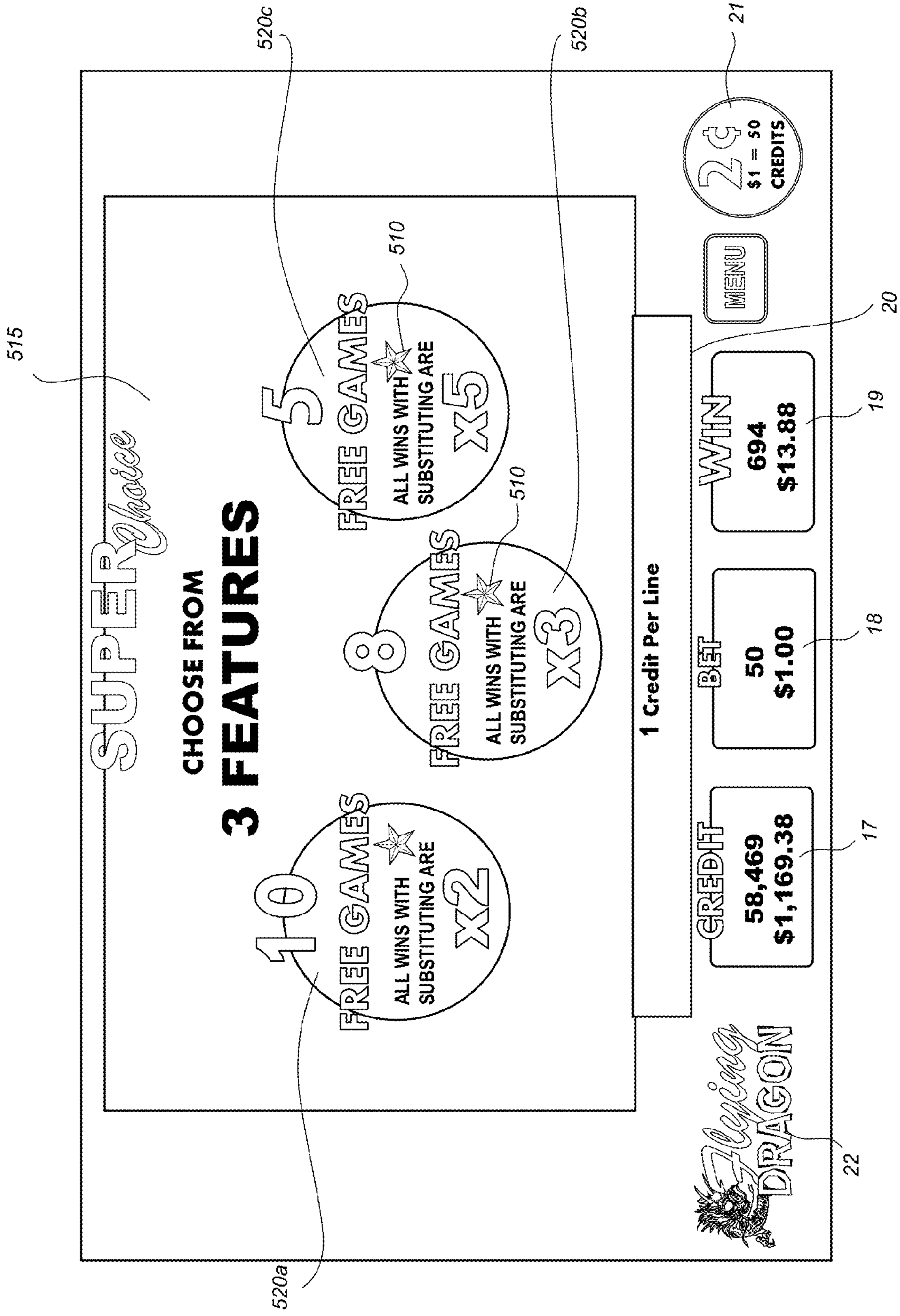
Figure 23:
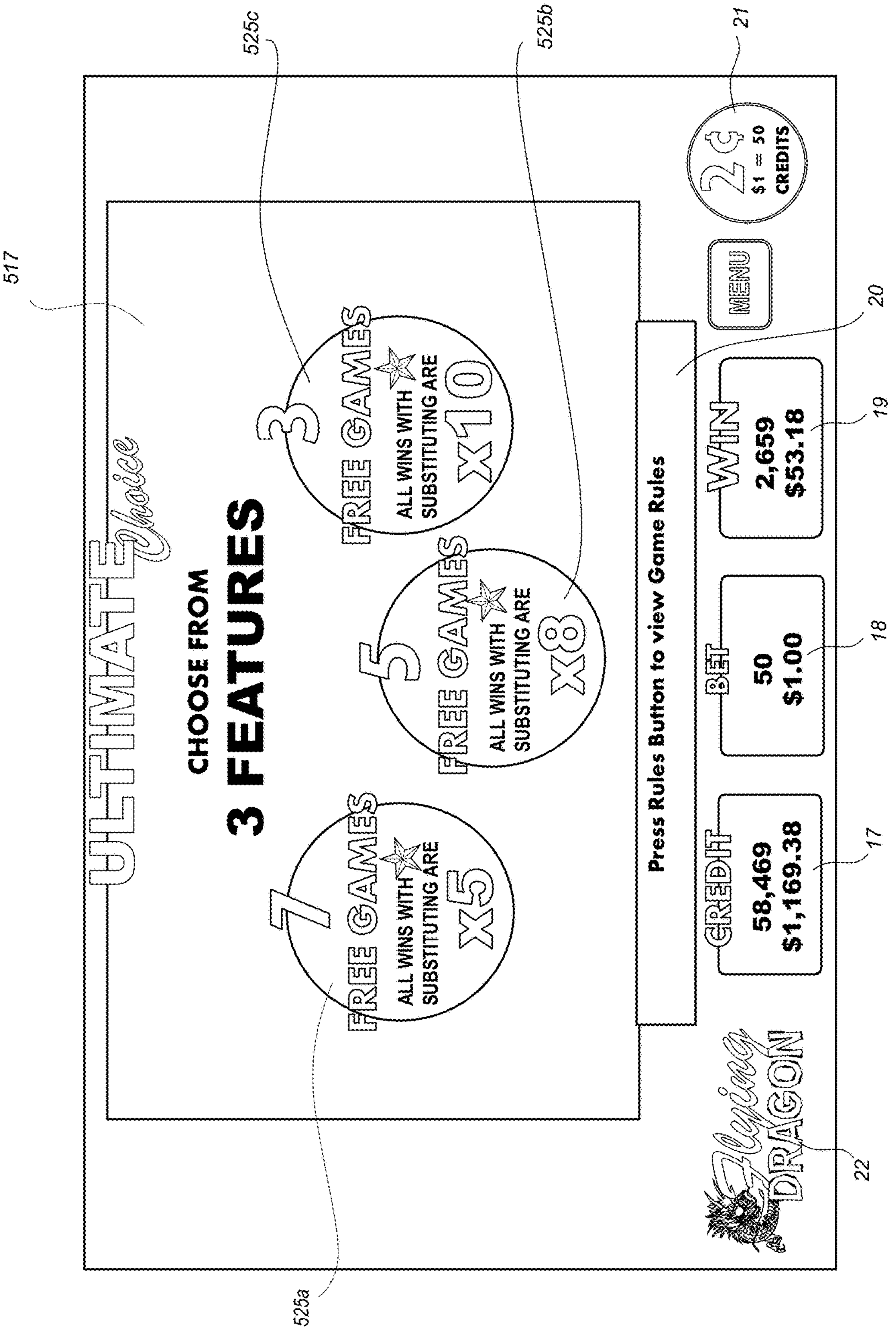

Another embodiment of the invention is illustrated in FIGS. 18 to 23, where corresponding features have been given the same reference numerals. This embodiment is a variation of the embodiment of FIGS. 3 to 11, where the silver star symbols 500 and the gold star symbols 510 replace the dragon symbol 10*c* in awarding Super Choice and Ultimate Choice tokens, as well as acting as the substitute symbol. Again, the appearance of three silver star symbols 500 on the reels 12 results in the award of a Super Choice token while the appearance of three gold star symbols 510 results in the award of an Ultimate Choice token. Both the silver star and gold star symbols 500, 510 also act as substitute or wild card symbols in the game, which is called "Flying Dragon". The embodiment plays in the same way as described in relation to FIGS. 13 to 17. FIG. 18 shows three silver star symbols 500 appearing in the feature game 9 to award a Super Choice token, FIG. 19 shows three gold star symbols 510 appearing on the reels 12, FIG. 20 shows the words "Ultimate Choice" appearing over the gold star symbols 510 to indicated the award of an Ultimate Choice token, that is incremented on the Ultimate Choice token meter 45. FIG. 21 shows the accumulation of one Super Choice token in the token meter 38 and two Ultimate Choice tokens in the token meter 45. The selectable feature game options 520*a* to 520*c* and 525*a* to 525*c* for the Super Choice and Ultimate Choice tokens are shown in FIGS. 22 and 23, respectively, and set out in the table below.

| | | |
|---|---|---|
| Super Choice feature game options | (1) | 10 free spins or games with a x 2 win multiplier for any winning combinations having a gold star symbol 510 |
| | (2) | 8 free spins or games with a x 3 win multiplier for any winning combinations having a gold star symbol 510 |
| | (3) | 5 free spins or games with a x 5 win multiplier for any winning combinations having a gold star symbol 510 |
| Ultimate Choice feature game options | (1) | 7 free spins or games with a x 5 win multiplier for any winning combinations having a gold star symbol 510 |
| | (2) | 5 free spins or games with a x 8 win multiplier for any winning combinations having a gold star symbol 510 |
| | (3) | 3 free spins or games with a x 10 win multiplier for any winning combinations having a gold star symbol 510 |

Figure 24:
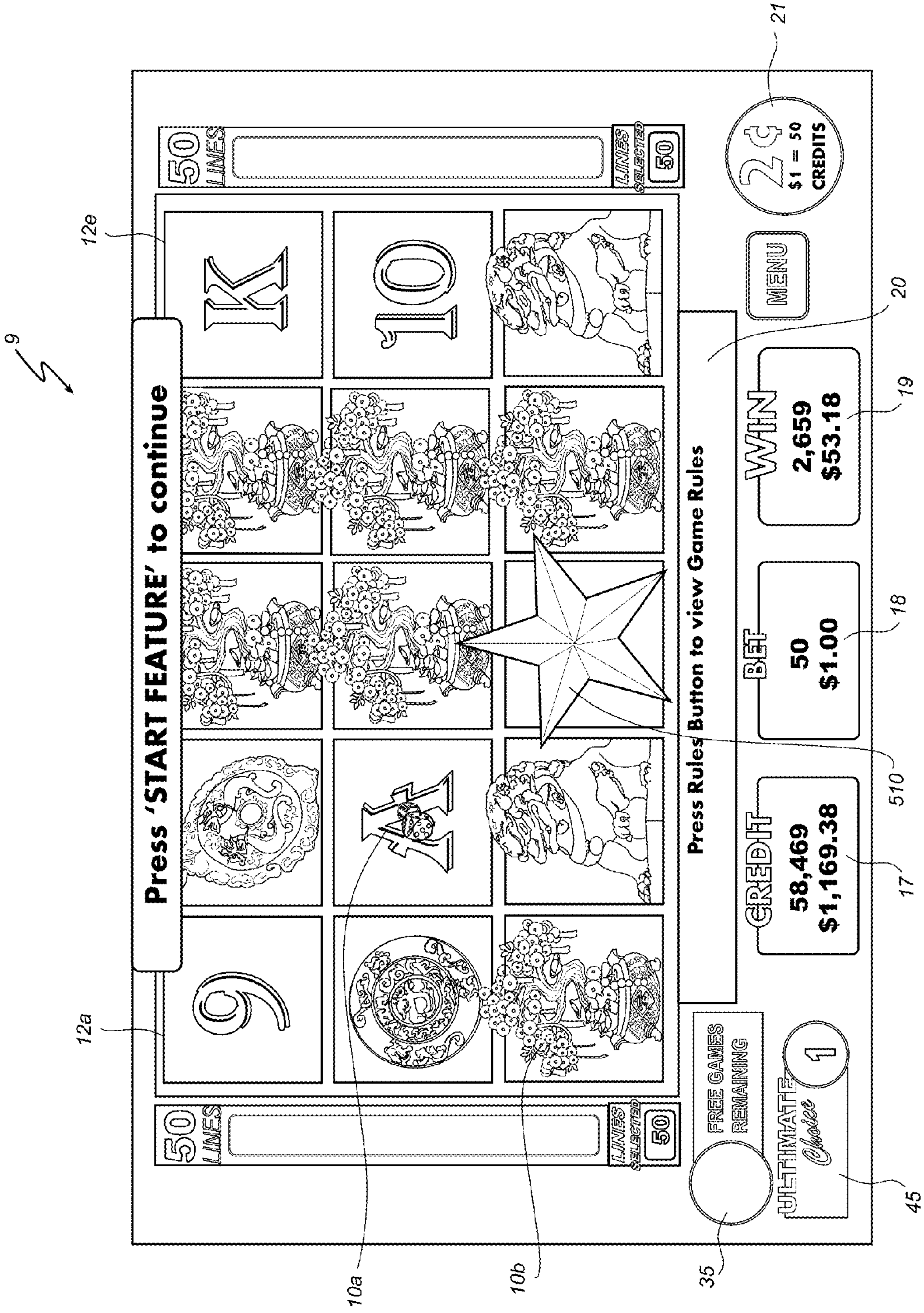
FIGS. 24 to 30 are front views of the display of the electronic gaming machine of FIG. 1 illustrating a feature game, selection screens and a selected feature game.
Figure 25:
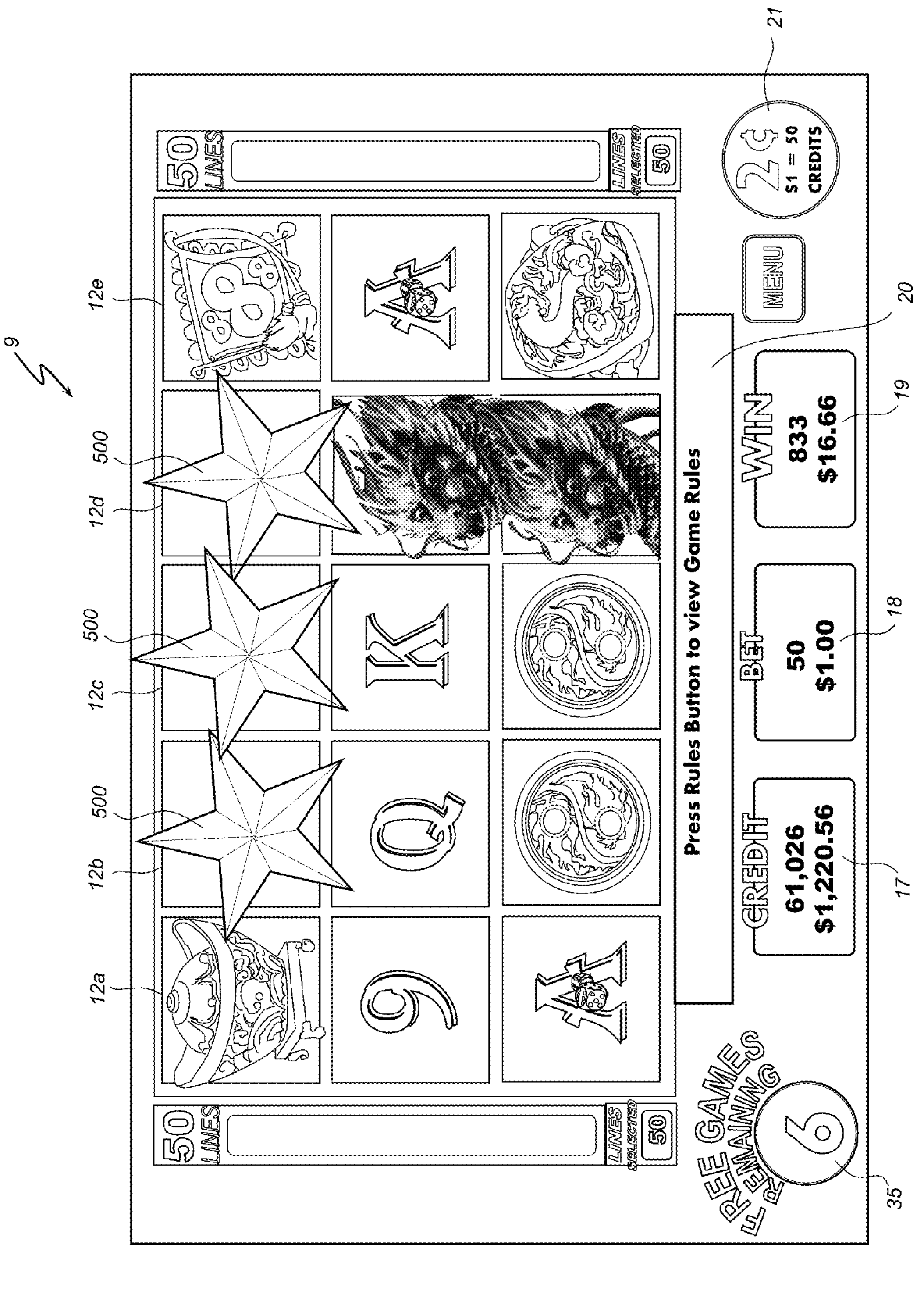
Figure 26:
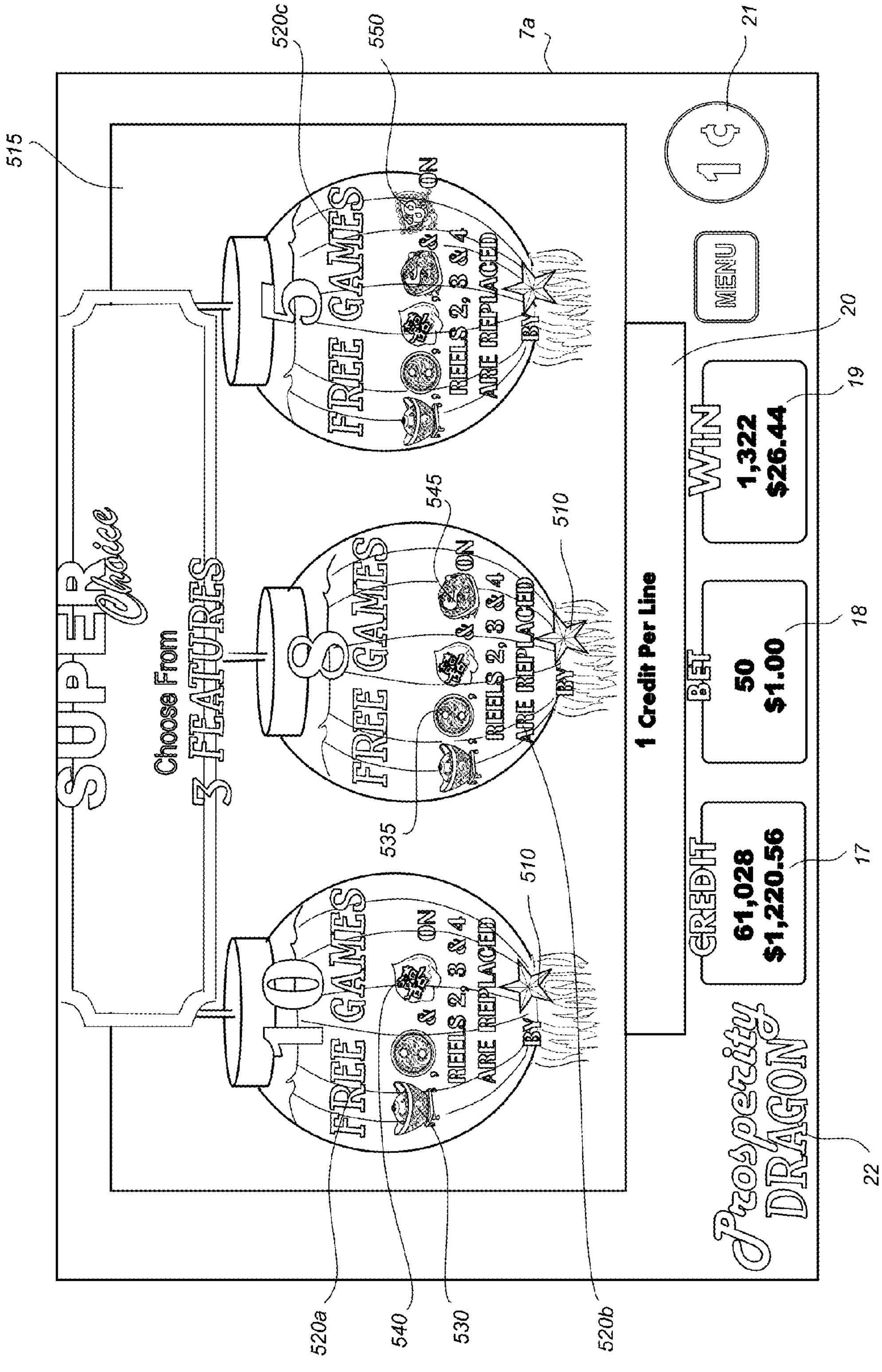
Figure 27:
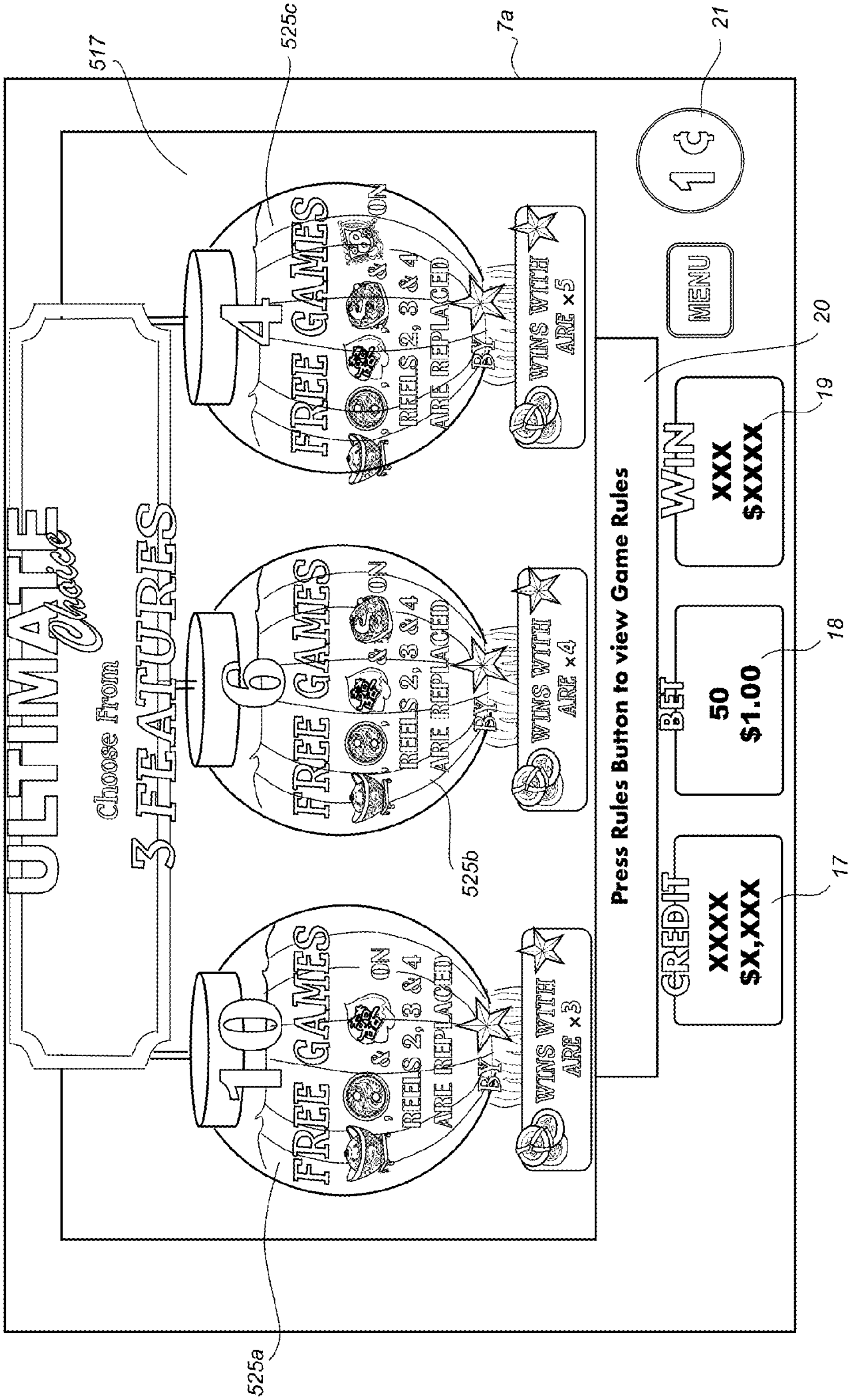

Yet another embodiment of the invention is illustrated in FIGS. 24 to 30, where corresponding features have been given the same reference numerals. This embodiment is the same as the embodiments of FIGS. 13 to 23, in that the appearance of three silver star symbols 500 on the reels 12 results in the award of a Super Choice token, the appearance of three gold star symbols 510 results in the award of an Ultimate Choice token and both the silver star and gold star symbols 500, 510 also act as substitute or wild card symbols in the game, which is called "Prosperity Dragon". FIG. 24 shows a gold star symbol 510 appearing on the reels 12, where an Ultimate Choice token has been awarded and FIG. 25 shows the appearance of three silver star symbols 500 on the reels that awards a Super Choice token. The selectable feature game options 520*a* to 520*c* and 525*a* to 525*c* for the Super Choice and Ultimate Choice tokens are shown in FIGS. 26 and 27, respectively, and set out in the table below.

| | | |
|---|---|---|
| Super Choice feature game options | (1) | 10 free spins or games with any gold ingot symbol 530, ying yang symbol 535 or gold leaf symbol 540 appearing on reels 2, 3 and 4 being replaced by a gold star symbol 510. |
| | (2) | 8 free spins or games with any gold ingot symbol 530, ying yang symbol 535, gold leaf symbol 540 or green dragon symbol 545 appearing on reels 2, 3 and 4 being replaced by a gold star symbol 510. |
| | (3) | 5 free spins or games with any gold ingot symbol 530, ying yang symbol 535, gold leaf symbol 540, green dragon symbol 545 or "8" symbol 550 appearing on reels 2, 3 and 4 being replaced by a gold star symbol 510. |
| Ultimate Choice feature game options | (1) | 8 free spins or games with:<br>(a) any gold ingot symbol 530, ying yang symbol 535 or gold leaf symbol 540 appearing on reels 2, 3 and 4 being replaced by a gold star symbol 510; and<br>(b) an x3 win multiplier for any winning combinations having a triple gold coin symbol 555 and a gold star symbol 510 |

-continued

| | |
|---|---|
| (2) | 6 free spins or games with:<br>(a) any gold ingot symbol 530, ying yang symbol 535, gold leaf symbol 540 or green dragon symbol 545 appearing on reels 2, 3 and 4 being replaced by a gold star symbol 510; and<br>(b) an x4 win multiplier for any winning combinations having a triple gold coin symbol 555 and a gold star symbol 510 |
| (3) | 4 free spins or games with:<br>(a) any gold ingot symbol 530, ying yang symbol 535, gold leaf symbol 540, green dragon symbol 545 or "8" symbol 550 appearing on reels 2, 3 and 4 being replaced by a gold star symbol 510; and<br>(b) an x5 win multiplier for any winning combinations having a triple gold coin symbol 555 and a gold star symbol 510 |

Figure 28:
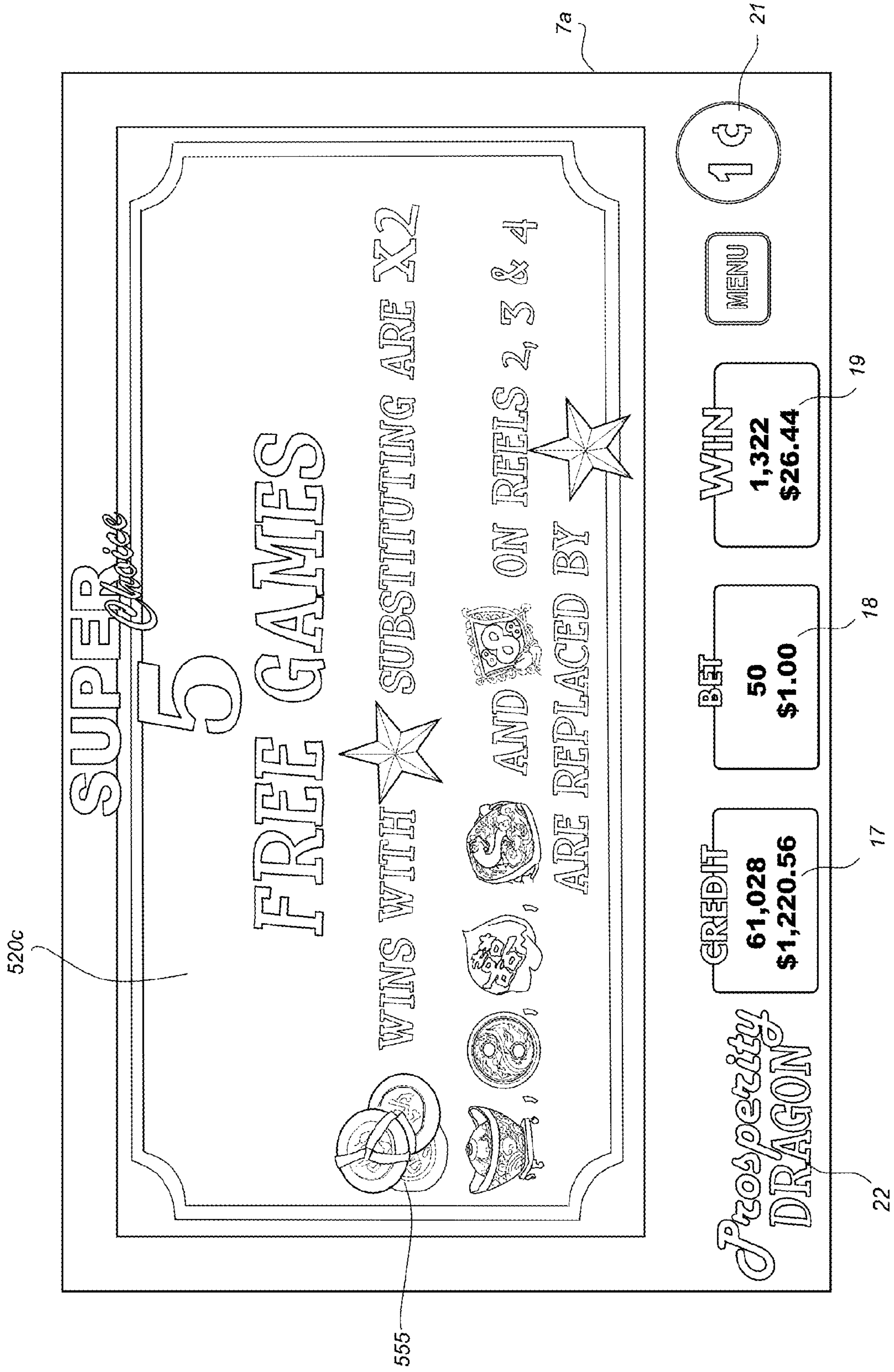

Once the player makes a selection from the Super Choice selection screen 515, the player's choice is shown on screen, as best shown in FIG. 28. In this Figure, the player has selected feature game option 520*c* and so in this feature game there are 5 free spins or games with any gold ingot symbol 530, ying yang symbol 535, gold leaf symbol 540, green dragon symbol 545 or "8" symbol 550 appearing on reels 2, 3 and 4 being replaced by a gold star symbol 510. In addition, the selected feature game provides an ×2 win multiplier for any winning combinations having a triple gold coin symbol 555 and a gold star symbol 510. This ×2 win multiplier is also provided for the other selectable feature game options 520*a* and 520*b*.

Figure 29:
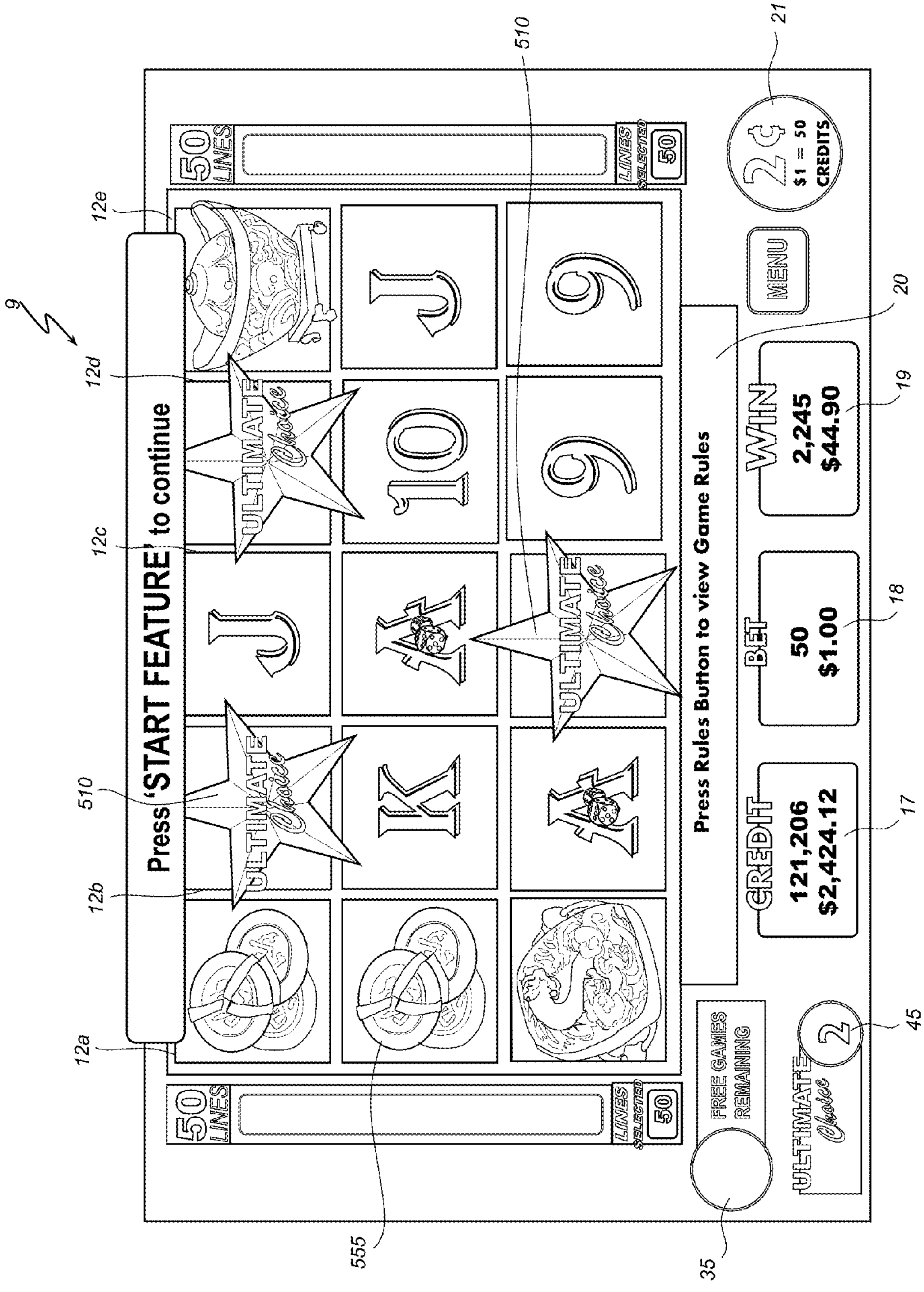
Figure 30:
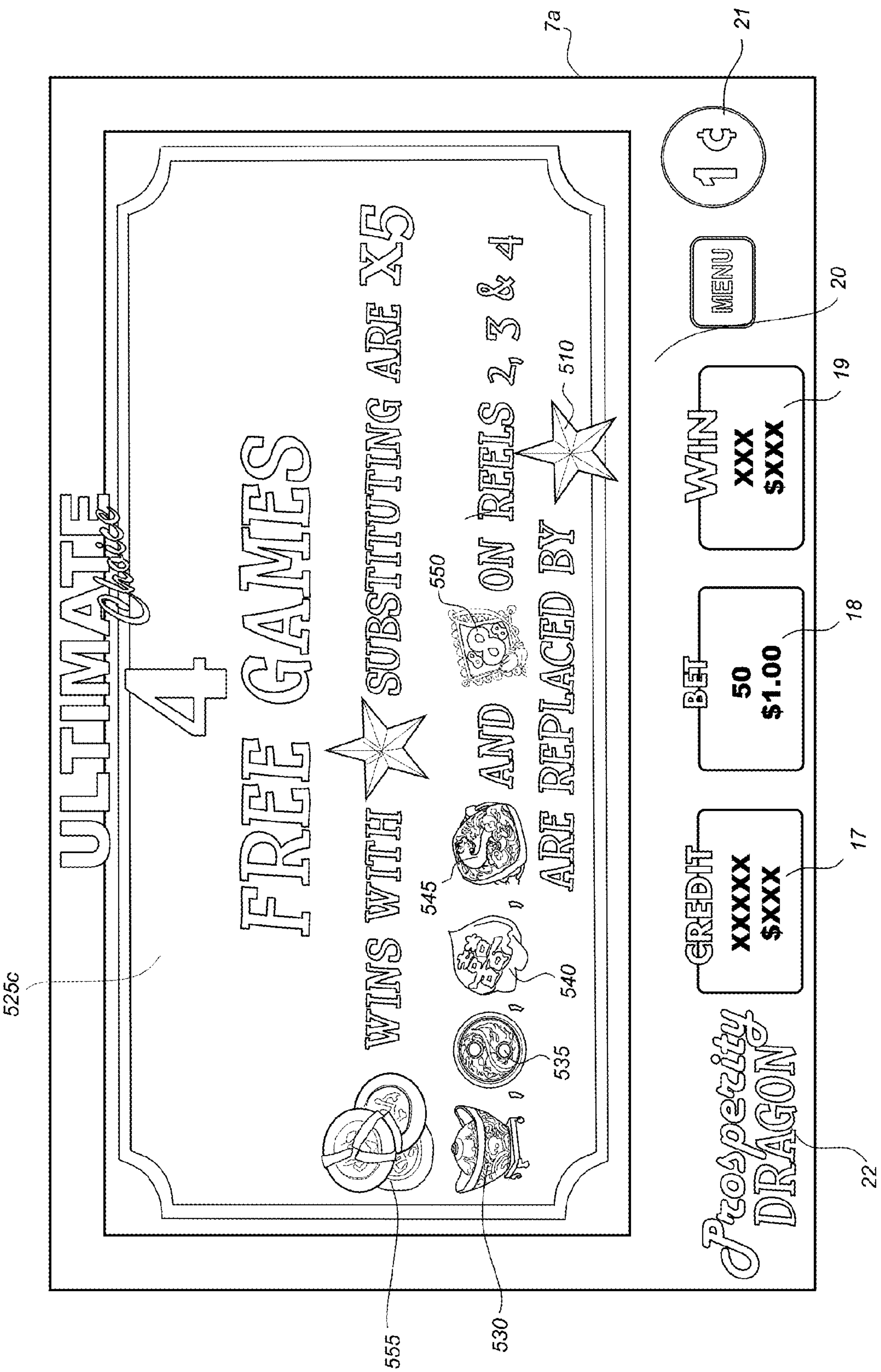

FIG. 29 shows a free spin in the selected feature game, where three gold star symbols 510 have appeared, resulting in the award of an Ultimate Choice token as indicated by meter 45. The word "Ultimate" also appears over the gold star symbols 510. In FIG. 30, the player has selected feature game option 525*c* from the feature game options for the Ultimate Choice feature game options. In the selected feature game 525*c* there are 4 free spins or games with any gold ingot symbol 530, ying yang symbol 535, gold leaf symbol 540, green dragon symbol 545 or "8" symbol 550 appearing on reels 2, 3 and 4 being replaced by a gold star symbol 510. In addition, the selected feature game provides an ×5 win multiplier for any winning combinations having a triple gold coin symbol 555 and a gold star symbol 510. In all other respects, this embodiment works in the same way as the previously described embodiments.

Figure 31:
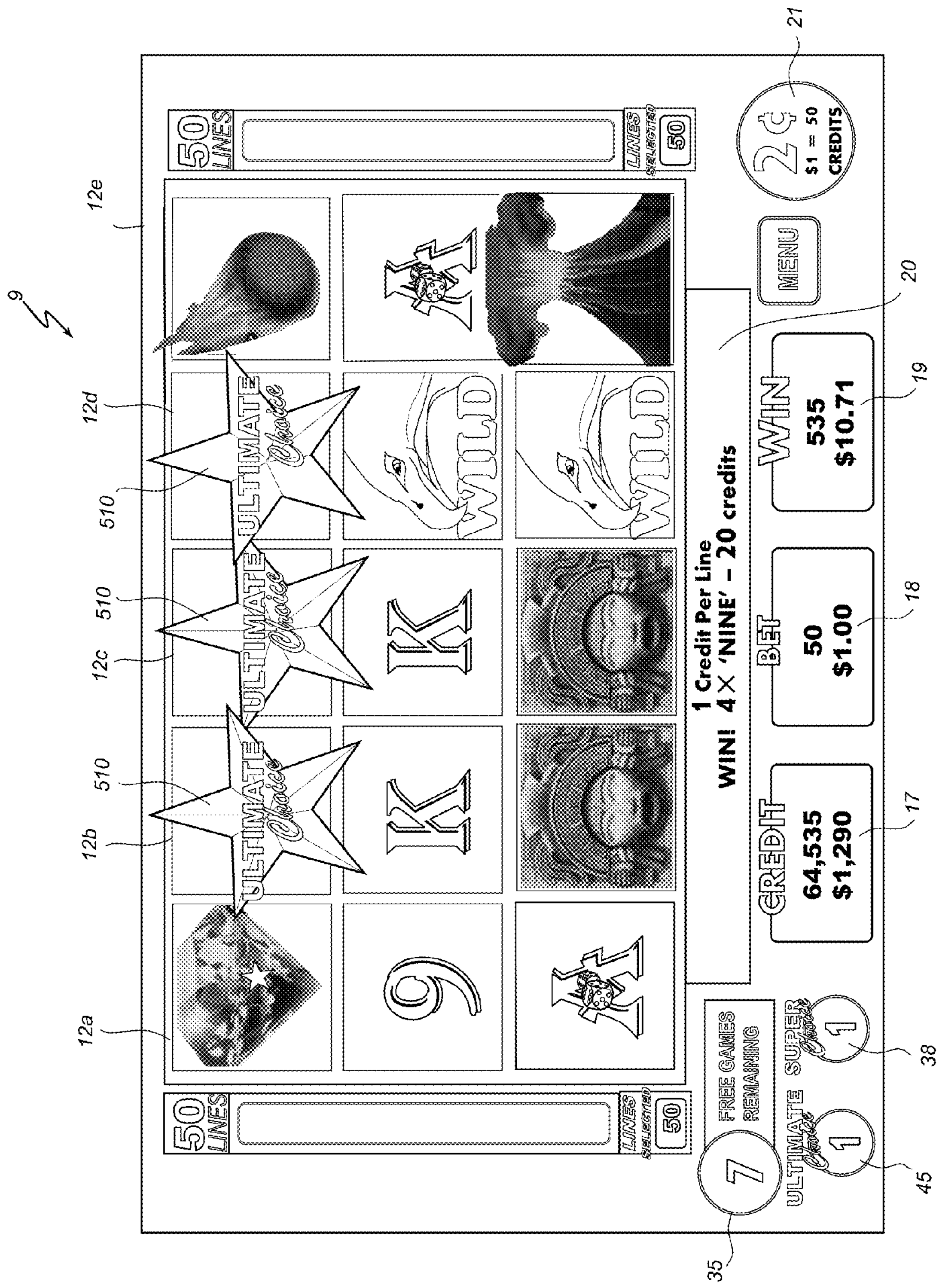
FIGS. 31 to 33 are front views of the display of the electronic gaming machine of FIG. 1 illustrating a feature game and selection screens.
Figure 32:
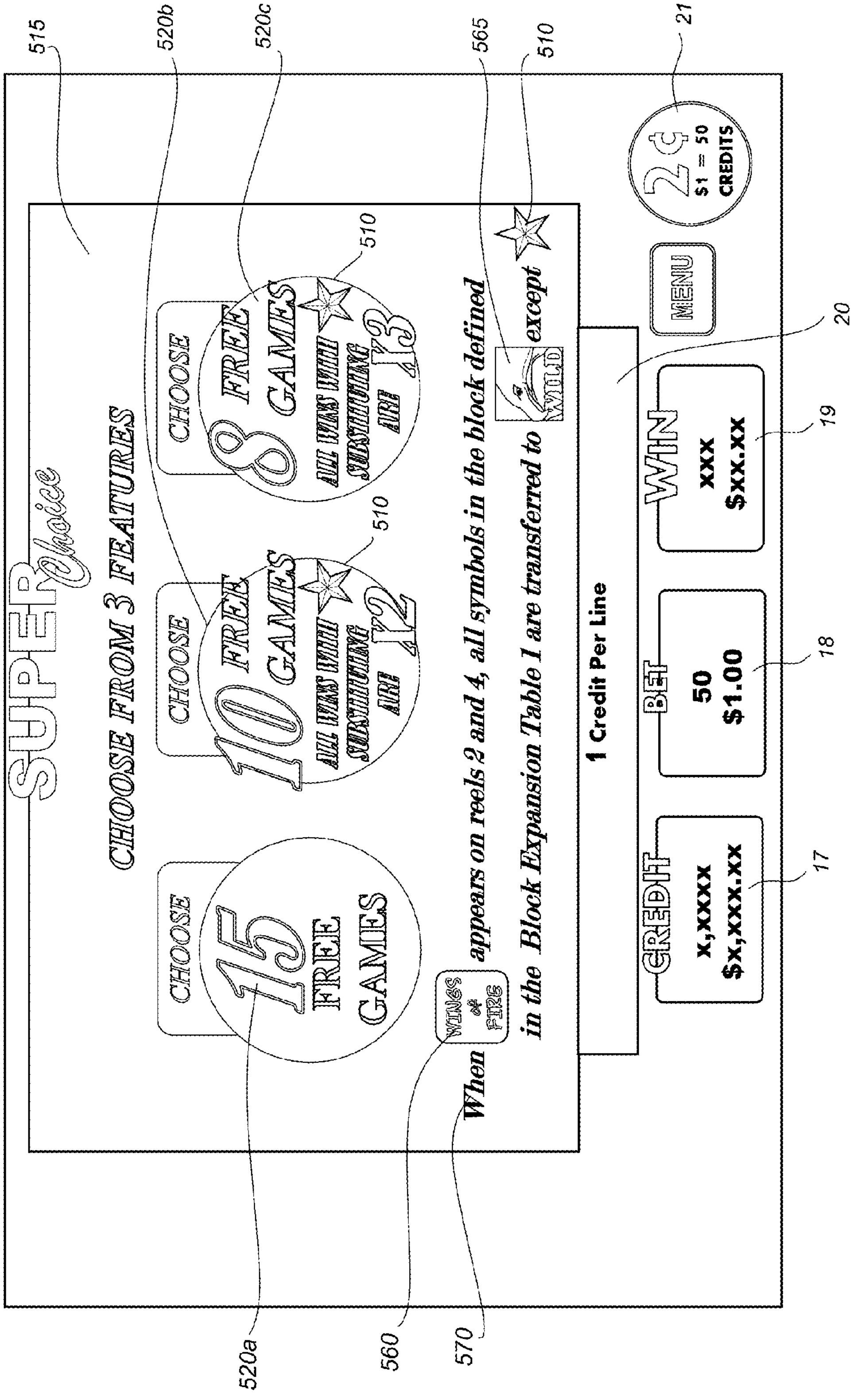
Figure 33:
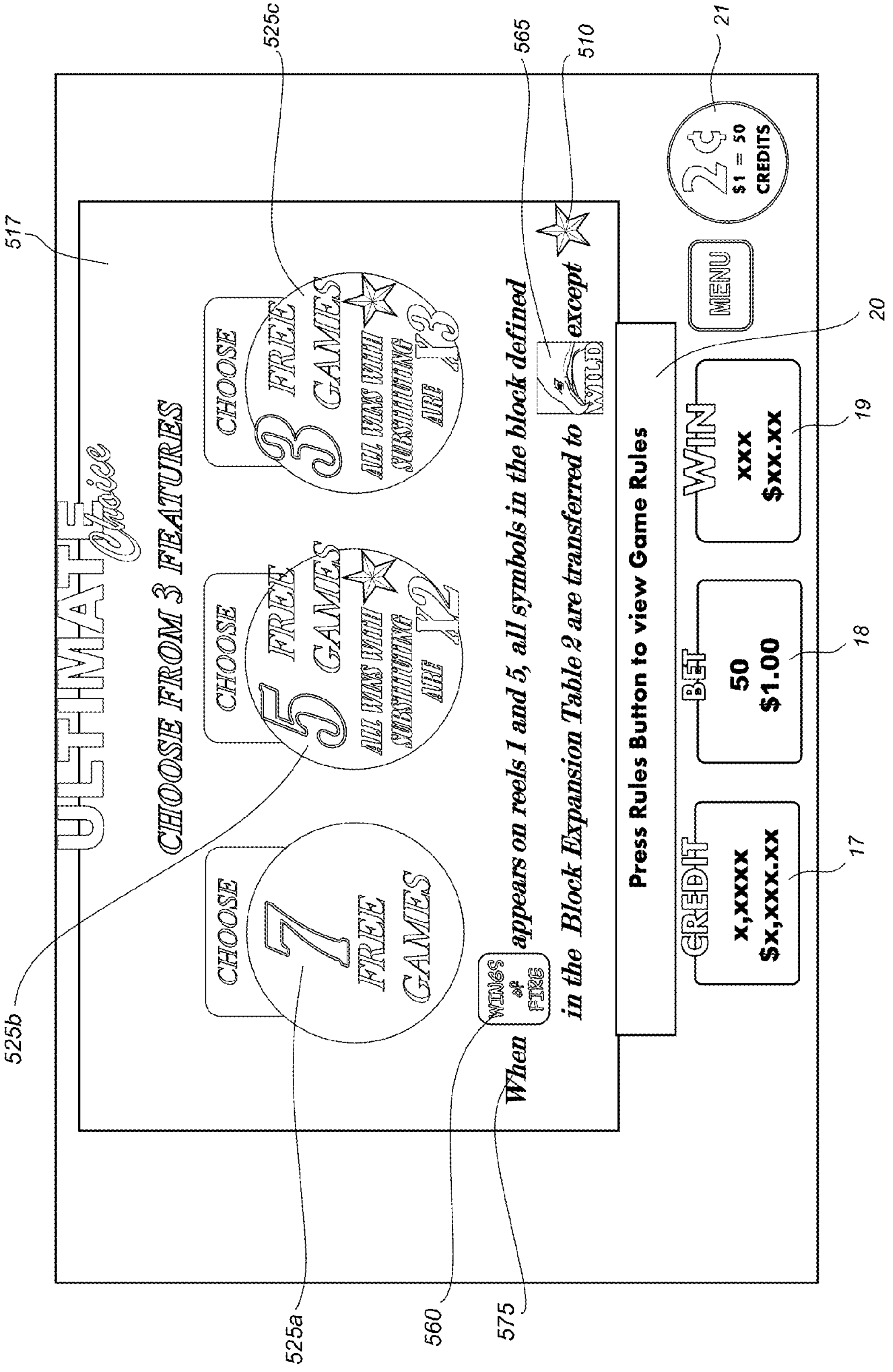

A yet further embodiment of the invention is illustrated in FIGS. 31 to 33, where corresponding features have been given the same reference numerals. This embodiment also uses three silver star symbols 500 to award Super Choice tokens and three gold star symbols to award Ultimate Choice tokens, as well as the silver star and gold star symbols 500, 510 acting as substitute or wild card symbols in the game, which is called "Wings of Fire". FIG. 31 shows three gold star symbols 510 appearing on the reels 12 to award an Ultimate Choice token. In addition the words "Ultimate Choice" appear over each gold star symbol 510. The selectable feature game options 520*a* to 520*c* and 525*a* to 525*c* for the Super Choice and Ultimate Choice tokens are shown in FIGS. 32 and 33, respectively, and set out in the table below.

| | | |
|---|---|---|
| Super Choice feature game options | (1) | 15 free spins or games |
| | (2) | 10 free spins or games with a x 2 win multiplier for any winning combinations having a gold star symbol 510 |
| | (3) | 8 free spins or games with a x 3 win multiplier for any winning combinations having a gold star symbol 510 |

-continued

| | | |
|---|---|---|
| Ultimate Choice feature game options | (1) | 7 free spins or games |
| | (2) | 5 free spins or games with a x 2 win multiplier for any winning combinations having a gold star symbol 510 |
| | (3) | 3 free spins or games with a x 3 win multiplier for any winning combinations having a gold star symbol 510 |

As best shown in FIG. 32, each selectable feature game 520*a* to 520*c* of the Super Choice feature game options also provides that when a Wings of Fire symbol 560 appears on both reels 2 and 4, then a group or block of symbol positions 13 change their displayed game symbols to a substitute symbol 565 unless the displayed symbol is a gold star symbol 510. The group of symbol positions 13 are predefined, based on a "Block Expansion Table 1". The Block Expansion table indicates which symbol positions 13 located between the Wings of Fire symbols 560 change their game symbols 10 to the substitute symbol 565. Typically, the symbol positions 13 that change their game symbols 10 may be selected from any of the symbol positions located between the symbol positions displaying the Wings of Fire symbol 560. In this case, these would be the symbol positions 13 located in reels 2, 3 and 4. This selection of groups of symbol positions 13 to change their displayed symbols 10 is described in more detail in Australian Patent Application No. 2013201654 and U.S. patent application Ser. No. 13/827,882, whose specifications are incorporated by reference herein in their respective entirety. This additional aspect of the selected feature game is indicated by message 570.

Similarly, and as shown in FIG. 33, each selectable feature game 525*a* to 525*c* of the Ultimate Choice feature game options provides that when a Wings of Fire symbol 560 appears on reels 1 and 5, then a group or block of symbol positions 13 change their displayed game symbols to a substitute symbol 565 unless the displayed symbol is a gold star symbol 510. The group of symbol positions 13 are predefined, based on a "Block Expansion Table 2", which is similar to the Block Expansion Table 1 described above except that it also includes symbol positions located in reels 1 to 5. This additional aspect of the selected feature game is indicated by message 575. Due to the location of the Wings of Fire symbol 560 on reels 1 and 5, the block in the Ultimate Choice feature game is necessarily larger than the block in the Super Choice feature game. In effect, this embodiment is an implementation of example 7. In all other respects, this embodiment works in the same way as the previously described embodiments.

Figure 34:
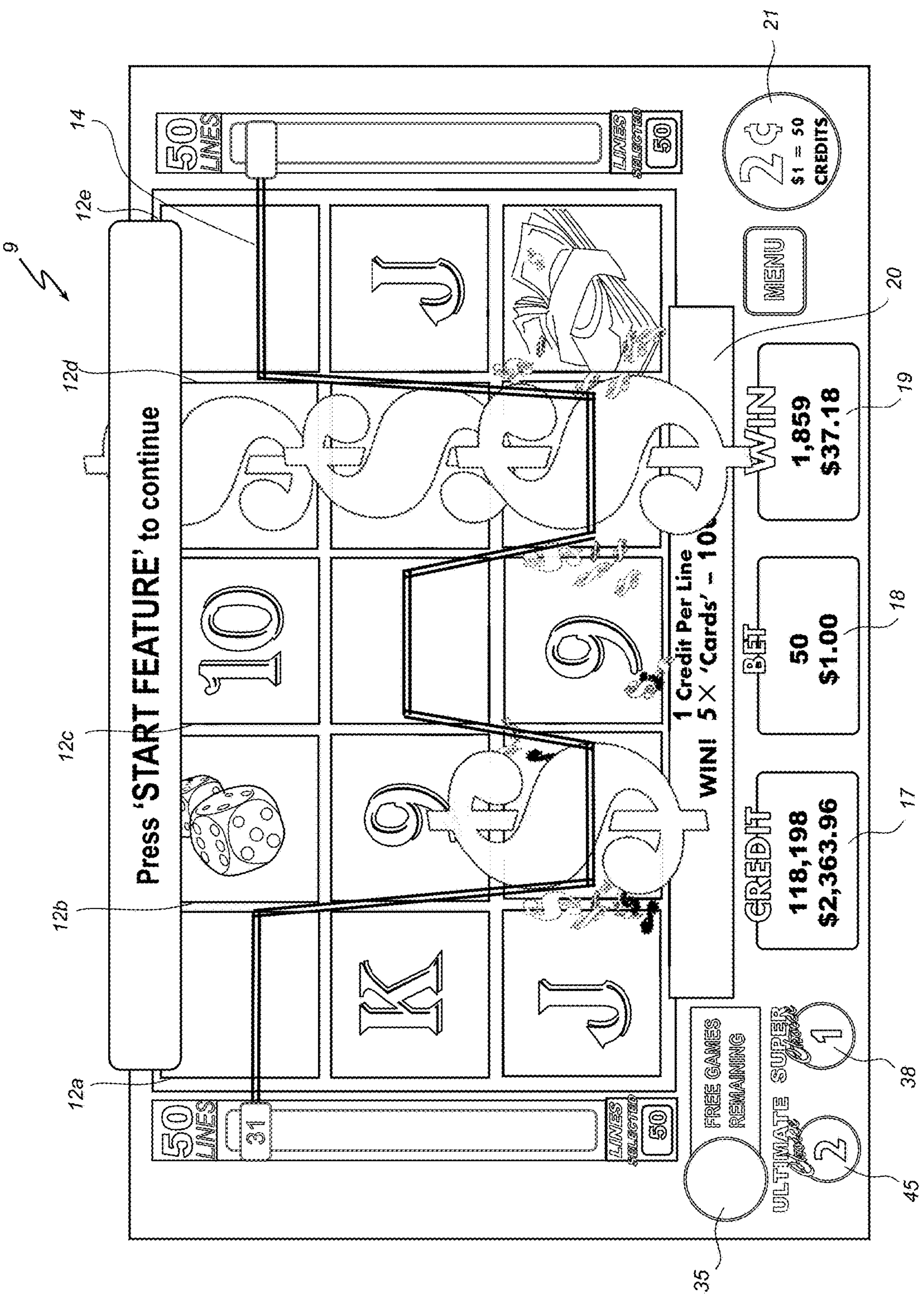
FIGS. 34 to 40 are front views of the display of the electronic gaming machine of FIG. 1 illustrating a feature game, selection screens and a selected feature game.
Figure 35:
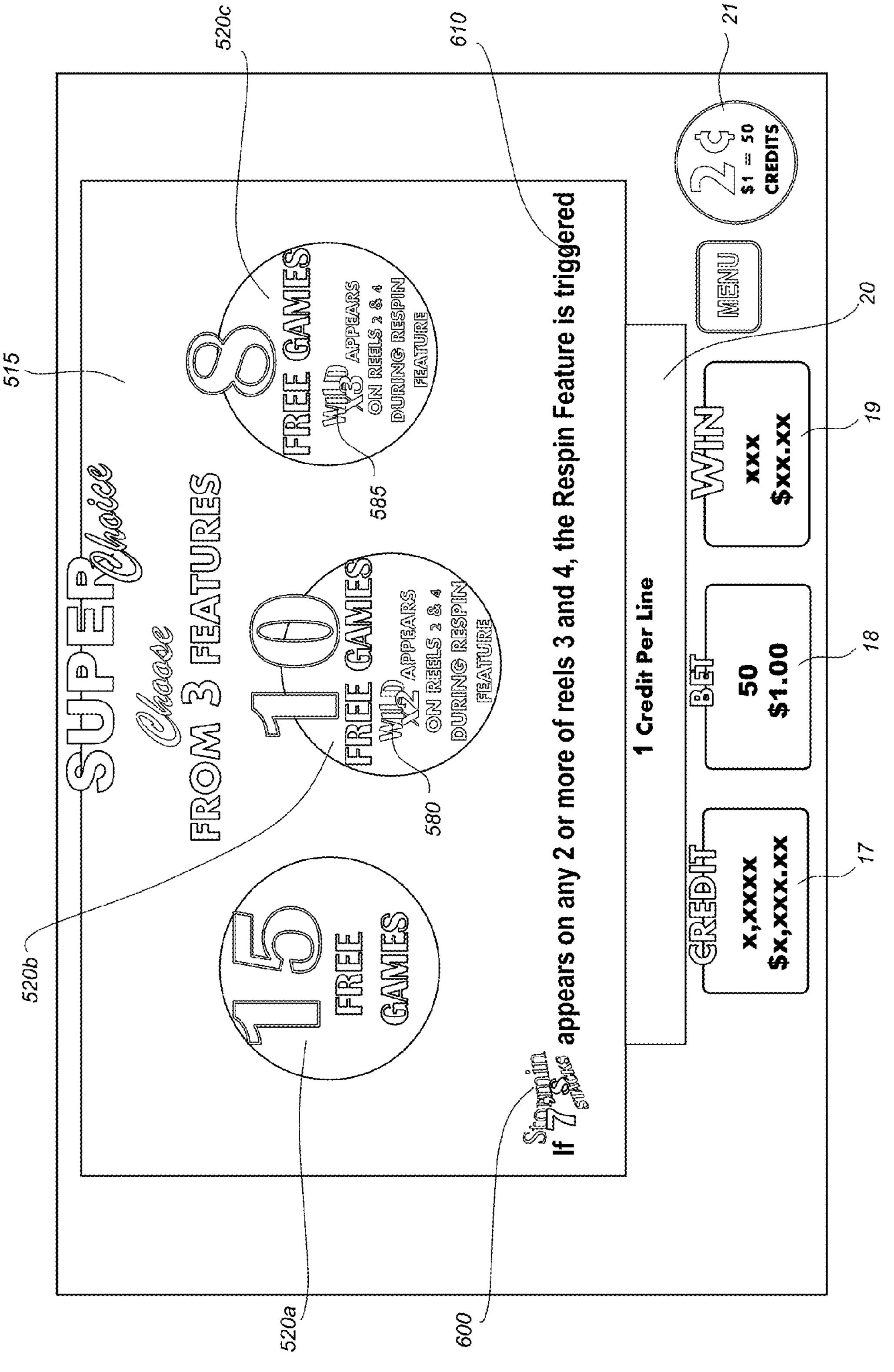
Figure 36:
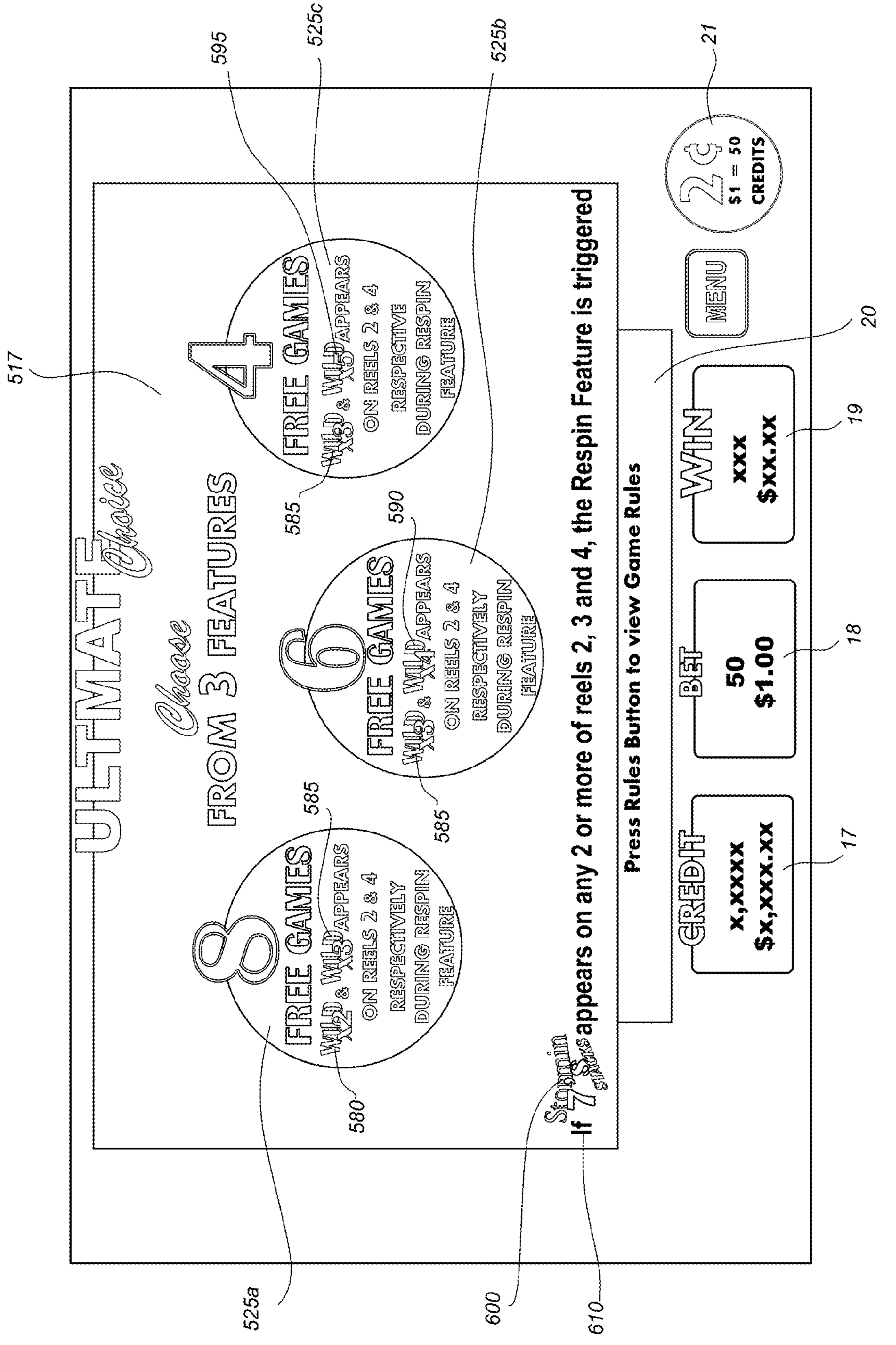

A yet further embodiment of the invention is illustrated in FIGS. 34 to 40, where corresponding features have been given the same reference numerals. This embodiment also uses three silver star symbols 500 to award Super Choice tokens and three gold star symbols to award Ultimate Choice tokens, as well as the silver star and gold star symbols 500, 510 acting as substitute or wild card symbols in the game, which is called "Stormin' 7's". FIG. 34 shows that the player has accumulated two Ultimate Choice tokens and one Super Choice token during play of the feature game 9. As discussed above, this entitles the player to choose a selectable feature game from the Super Choice feature game options and choose two selectable feature games from the Ultimate Choice feature game options. The selected feature games in the Super Choice and Ultimate Choice feature game options are played successively, with the selected Super Choice feature game being played first. The selectable feature game options 520*a* to 520*c* and 525*a* to 525*c* for the Super Choice and Ultimate Choice tokens are shown in FIGS. 35 and 36, respectively, and set out in the table below.

| | | |
|---|---|---|
| Super Choice feature game options | (1) | 15 free spins or games |
| | (2) | 10 free spins or games with a Wild x2 symbol 580 appearing on reels 2 and 4 during the respin feature |
| | (3) | 8 free spins or games with a Wild x3 symbol 585 appearing on reels 2 and 4 during the respin feature |
| Ultimate Choice feature game options | (1) | 8 free spins or games with a Wild x2 symbol 580 appearing on reel 2 and a Wild x3 symbol 585 appearing on reel 4 during the respin feature |
| | (2) | 6 free spins or games with a Wild x3 symbol 585 appearing on reel 2 and a Wild x4 symbol 590 appearing on reel 4 during the respin feature |
| | (3) | 4 free spins or games with a Wild x3 symbol 585 appearing on reel 2 and a Wild x5 symbol 595 appearing on reel 4 during the respin feature |

As best shown in FIGS. 35 and 36, each selectable feature game 520*a* to 520*c* and 525*a* to 525*c* of the Super Choice and Ultimate Choice feature game options provides that when a "Stormin' 7's stacks" symbol 600 appears on any two or more of reels 2, 3 and 4, a respin feature is triggered, in which the reels containing the Stormin' 7's stacks symbols respin before winning combinations are assessed for that free spin or game. This additional aspect of the selected feature game is indicated by message 610.

Figure 37:
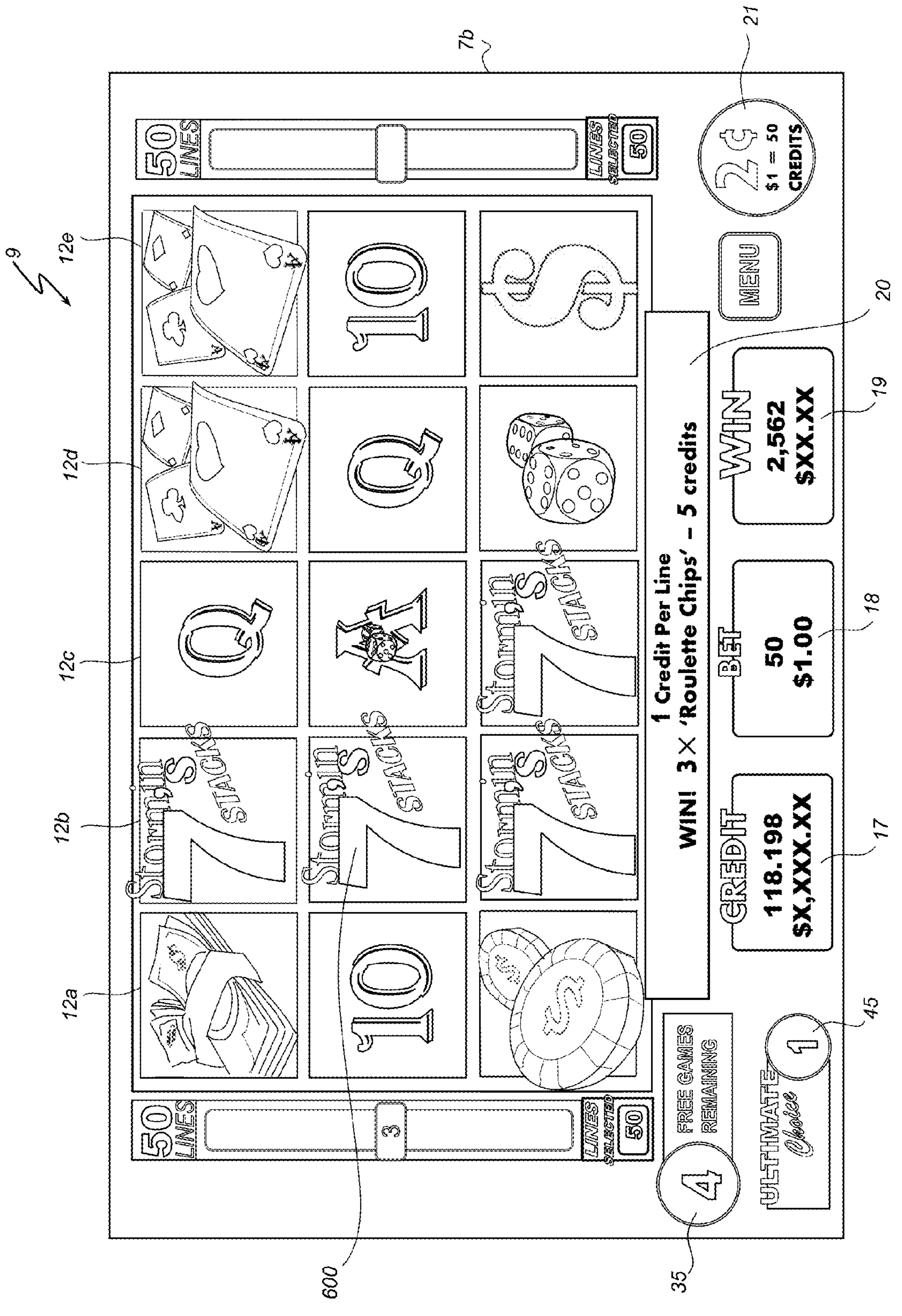
Figure 38:
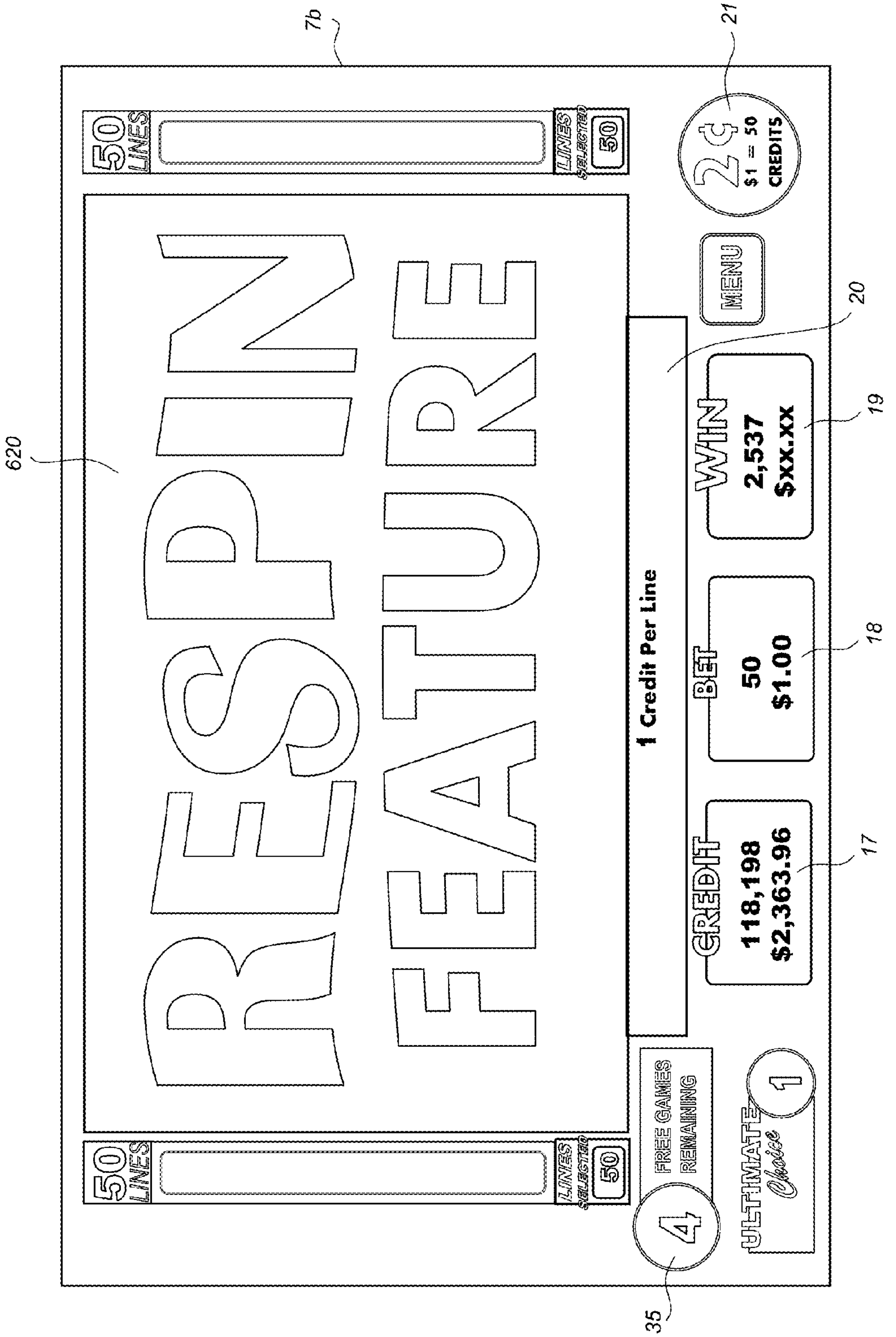
Figure 39:
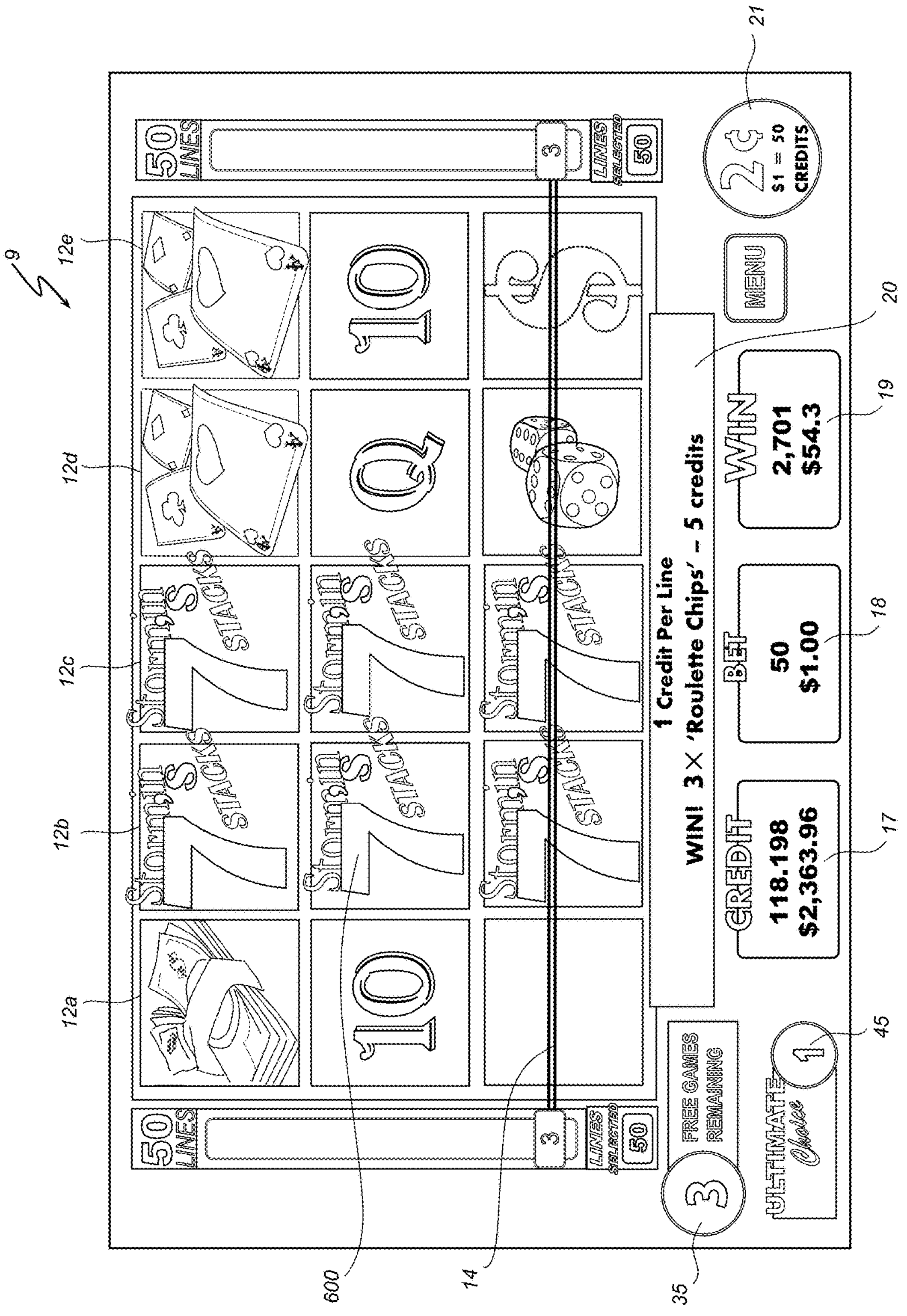
Figure 40:
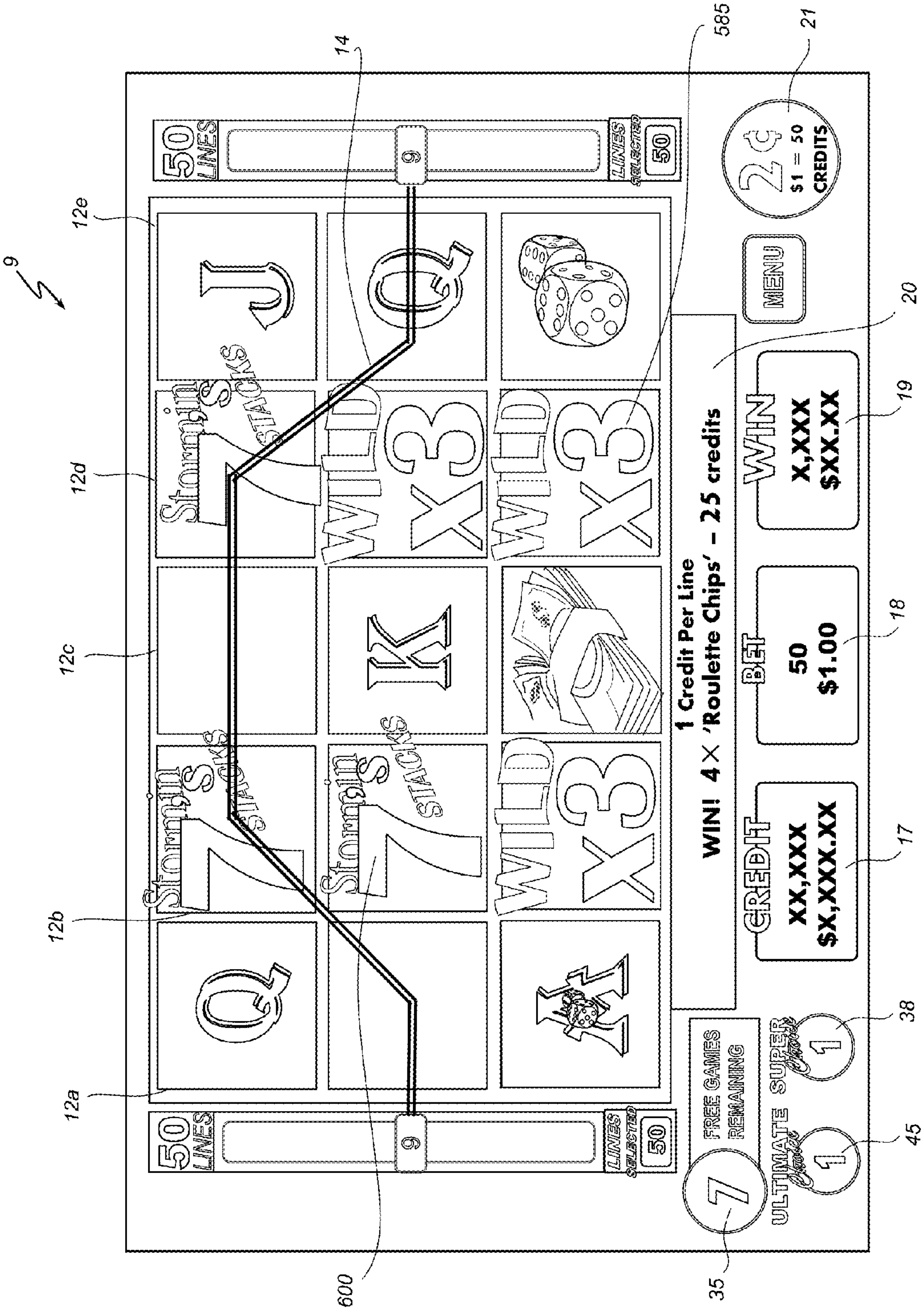

An example of how respin feature works is shown in FIGS. 37 to 40. In FIG. 37, three Stormin' 7's stacks symbols 600 in reel 2 (being reel 12*b*) and one Stormin' 7's stacks symbol 600 has appeared in reel 3 (being reel 12*c*). No Stormin' 7's stacks symbol appears in reel 4 (being reel 12*d*). This is sufficient to trigger the respin feature and the screen 7*b* advises the player accordingly via a message screen 620, as best shown in FIG. 38. Reels 2 and 3 then respin and display Stormin' 7's stacks symbols 600 in each symbol position of these reels, as best shown in FIG. 39. As the Stormin' 7's stacks symbols 600 are substitute symbols, there is an increased likelihood of obtaining winning combinations of game symbols of higher value. It should be noted that not all the symbol positions will display Stormin' 7's stacks symbols 600 upon a respin as the Wild ×2, Wild ×3, Wild ×4 and Wild ×5 symbols 580, 585, 590 and 595 can be displayed in the respun symbol positions that further increase the prize values for winning combinations, as stated in the selectable feature game options of the Super Choice and Ultimate Choice feature game options. FIG. 40 shows another respin feature that has been activated, which has resulted in two Stormin' 7's stacks symbols 600 in reel 2 (being reel 12*b*) and one Stormin' 7's stacks symbol 600 in reel 4 (being reel 12*d*). Also, a Wild ×3 multiplier symbol 585 appears in reel 2 and two Wild ×3 multiplier symbols 585 appear in reel 4 to increase the value of prizes awarded for any winning combinations of symbols that use the multiplier symbol. In effect, this embodiment is an implementation of example 6. In all other respects, this embodiment works in the same way as the previously described embodiments In other embodiments, the electronic gaming machine 1 offers one or more jackpot or bonus prizes. Generally, the display screen 7 provides jackpot information relating to available jackpots or bonus prizes in the game 8, typically by displaying the jackpot information in the upper display area 7*b*. This can ensure that the jackpot information is available to the player at all times during play of the electronic gaming machine 1.

The jackpot or bonus prizes may include progressive jackpots, fixed jackpots, mystery jackpots and symbol driven jackpots. A progressive jackpot prize takes a portion of each bet (typically a set percentage of each bet) made on the electronic gaming machine and thus the amount of the progressive jackpot incrementally increases as more bets are made on the electronic gaming machine 1. The progressive jackpot is typically awarded when a winning game combination associated with the jackpot occurs in the game played on the electronic gaming machine. In many cases, progressive jackpots are associated with the least probable winning combination and are commonly the highest paying award of the electronic gaming machine. In other cases, a separate trigger event can be used to award the progressive jackpot prize, such as a special jackpot symbol, a trigger event internally generated by the electronic game controller. Alternatively, or additionally, once a certain threshold is met, either a certain amount that has been bet on the electronic gaming machine or the incremented amount of the progressive jackpot, a trigger event is activated in the electronic gaming machine to pay out the progressive jackpot prize. Progressive jackpot prizes also tend to be shared amongst multiple electronic gaming machines so as to increase the amount of the progressive jackpot prize and hence increase player interest in playing one of the electronic gaming machines. In some electronic gaming machines, more than one jackpot or progressive jackpot is offered by the electronic gaming machine or electronic gaming machines linked together.

The jackpot or bonus prizes may also be mystery jackpots rather than symbol driven jackpots. That is, none of the symbols in the game trigger the jackpot; hence the trigger event is a "mystery". By way of comparison, a standard jackpot is typically symbol driven in that a particular combination of symbols must occur in the game to trigger the standard jackpot.

The trigger event for the mystery jackpot can be one randomly generated by the electronic game controller 4 for each play of the game 8. One way to implement the random determination of the trigger event is for the electronic game controller 4 to internally generate a random number and check if it is a predetermined number or within a predetermined range of numbers that will initiate the appearance of the trigger symbols. For example, the predetermined range of numbers could be the range of numbers between 1 and 10 and the electronic game controller 4 internally generates a random number between 1 and 100. If the generated number is any one of numbers 1 to 10, then this results in the electronic game controller 4 causing the trigger event to occur and award the progressive jackpot prize. It will be appreciated that this manner of determining the trigger event may also be used to determine whether the feature game 9 is triggered in the base game 8.

Progressive jackpots can be confined to the electronic gaming machine 1 as so called "standalone" progressive jackpots. Alternatively, the jackpot is a wide area or an in-house linked progressive jackpot prize. In other embodiments, one or more the progressive jackpot prizes are configured to be part of a wide area or in-house linked progressive jackpot prize. In other words, the progressive jackpot prizes can be awarded on a group of networked gaming machines in a specified area or a group of specified electronic gaming machines that are linked together for jackpot purposes (usually via a central jackpot controller). The jackpot prizes can also be shared with any other games offered on the same electronic gaming machine 1 (as in multi-game gaming machines).

During play of the base game 8 and/or feature games 9, 59, 69, the electronic game controller will determine whether a trigger event for any of the selected jackpots has occurred, as described above. In response to the occurrence of the jackpot trigger event(s), the electronic game controller 4 transmits a signal to the video screen 7 to cause the jackpot(s) associated with the jackpot trigger event(s) to be awarded to the player. After the jackpot(s) are awarded, their values are reset and game play of the electronic gaming machine 1 continues as before. The values of the jackpots that have been won can be reset either to a predetermined start value or simply increment upwardly from zero where the won jackpot is a progressive jackpot.

In addition, contributions of portions of the bet made to play the game are only made for the selected jackpots that are active. In this way, the player's bets do not contribute towards jackpots that the player cannot win.

In other embodiments, the electronic gaming machine 1 also offers the player the opportunity to play in community games against other players in so-called tournament games, or even in player versus player games. This is typically implemented by electronically linking several electronic gaming machines 1 in a group within a gaming venue. The player versus player or tournament game can be played simultaneously by the players or can be staggered, with some players playing at one time and some players playing at another time in the same game. In this situation, the player versus player or tournament game comprises the award of an additional bonus prize in addition to the jackpot prizes in said selected available jackpot set.

In the embodiments of the invention, the new symbols that confer game enhancing elements can comprise game enhancing symbols. One or more game enhancing symbols may appear in the selected feature games 59 and 69. The award of game enhancing elements can be done by way of a sixth reel or the appearance of game enhancing symbols in the reels 12*a* to 12*e*.

The types of game enhancing elements include fixed monetary prizes, "Held Reels", "×10 Multiplier" (applicable to the prize awarded by the base game for the five of a kind trigger combination and/or to the total amount of the bet or credits bet per pay line), "10 Free Spins/Games", progressive symbols and changing the function of a standard game symbol 10*a*, 10*b* into a substitute symbol in addition to any displayed substitute Dragon symbols 10*c*. Held columns or reels typically involve the column or reel to only display wild/substitute symbols, thus enhancing the probability of achieving a predetermined combination. Progressive symbols award a prize is awarded upon a certain number of progressive symbols are accumulated by the player over a number of games played on the gaming machine. Other examples include:

i) symbols that award a predetermined number of free plays of said game, such as 8, 10 or 15 free spins or games;
ii) win multiplier symbols that multiply the amount of any win from one of said predetermined winning combinations;
iii) "wild" symbols that cause the display of substitute symbols in randomly selected symbol positions;
iv) bonus symbols that awards a bonus prize, either as a monetary amount or as a bonus credit;
v) wild multiplier symbols that cause the display of substitute symbols on the array 11 and multiplies the amount of any win from one of said predetermined winning combinations;
vi) bonus wild symbols that cause the display of substitute symbols on the array 11 and awards a bonus prize;
vii) symbols that cause the award of additional free plays of said game;
viii) symbols that cause one or more of said symbol positions to be held static (typically one or more reels 12*a* to 12*e*) and display substitute symbols on the array 11;
ix) symbols that cause the same game symbol to be stacked in a group of symbol positions, typically the group being one or more reels 12*a* to 12*e;*
x) symbols that cause the display of new game symbols on the array 11;
xi) "reveal" symbols that cause a game symbol to reveal another game symbol;
xii) "replacement" symbols that cause one or more game symbols to be replaced by other game symbols in the array 11;
xiii) Bonus Prize of 5× bet, 10× bet or 25× bet (the total amount of the bet or credits bet per pay line);
xiv) All royal card symbols change to wilds (substitute symbols) on reels 2, 3 and 4 of the array 11;
xv) All picture symbols change to wilds on reels 2, 3 and 4 of the array 11;
xvi) All symbols on reels 2 and 4 of the array 11 change to wild symbols; and
xvii) All symbols on reels 1 and 5 of the array 11 change to wild symbols.

These game enhancing symbols do not modify the function or value of the game symbols 10 that appear on the arrays 11, but instead confer bonus prizes, free games or change existing game symbols for other game symbols (such as replacing picture, royal card or symbols belonging to a reel with wild/substitute symbols). Where the function of game symbols 10 have been changed or the game symbols 10 are replaced, then this modification can take effect with the next play of the game instead of applying to the result of the spun array 11. In another embodiment, the game enhancing symbols may indicate the duration in which its game enhancing element is applied, such as a predetermined number of spins or a predetermined time period.

In other preferred embodiments, additional game enhancing symbols include the award of points or tokens that lead to the trigger of additional prizes or game enhancing symbols, depending on the number of points or tokens that are collected. These additional prizes can include stand alone progressive jackpots, bonus prizes and super games, which are enhanced versions of free spins or games where there are greater pay outs or frequency of wins.

In another embodiment, the set of feature game options 49*a*, 49*b* and 49*c* requires a bet to be made by the player before the selected feature game 59 can be played while the set of feature game options 62*a*, 62*b* and 62*c* and the associated selected feature game 69 remain free in that no further bet is required. Of course, in a further embodiment, the arrangement is reversed with the set of feature game options 49*a*, 49*b* and 49*c* are free and the set of feature game options 62*a*, 62*b* and 62*c* requiring a bet to be made by the player to play the selected feature game 69.

In yet another embodiment, a separate trigger event in the feature game 9 results in additional free spins or plays of the feature game 9 being awarded to the player. Likewise, in a further embodiment, another separate trigger event in the selected feature game 59 results in additional free spins or plays of the feature game 9 being awarded to the player. The separate trigger events can be combinations of existing game symbols 10 or new trigger symbols exclusive to the feature game 9 and selected feature game 59. In both cases, Super Choice and Ultimate Choice tokens are accumulated and thus increase the chances of activating the sets of feature game options 49*a*, 49*b*, 49*c*, 62*a*, 62*b* and 62*c*.

In the preferred embodiment, the predetermined threshold number for the Super Choice tokens is 1, while the predetermined threshold number for the Ultimate Choice tokens is 3. However, it will be appreciated that in other embodiments, the predetermined number can vary for both sets of tokens, as desired. For example, to make triggering the Super Choice set of selectable feature game options 49*a*, 49*b* and 49*c* more difficult, the threshold number is increased to 3 or 5. Likewise, the threshold number for the Ultimate Choice tokens in other embodiments is lowered to 1 or 2 or increased to 5 to vary the difficulty in triggering the Ultimate Choice set of selectable feature game options 62*a*, 62*b* and 62*c*.

In other embodiments, the special symbols like the Dragon symbol 10*c* reappear or remain in the same symbol position 13 for subsequent spins of the feature game 9, selected feature game 59, selected feature game 69 or any combination of the feature game 9, selected feature game 59 and selected feature game 69. This may also extend to the selected feature game 59 in that the special symbols like the Dragon symbol 10*c* reappear or remain in the same symbol position 13 for subsequent spins of the feature selected feature game 59, selected feature game 69 or any combination of the selected feature game 59 and selected feature game 69.

In a further embodiment, the accumulation of Ultimate Choice tokens in the selected feature game 69 does not result in retriggering the offer of the set of feature game options 62*a*, 62*b* and 62*c*, but instead results in offering the player with selection of yet another set of feature game options. This can continue to produce a cascading effect of triggering different sets of feature game options. Moreover, a different type of token is associated with each set of feature game options.

While the preferred embodiment has been described as offering three different selectable feature game options for both Super Choice and Ultimate Choice tokens, it will be appreciated that the number of selectable feature game options can vary from only two upwards to any number of selectable games. Likewise, the number of selectable games can vary between each set of feature game options.

Further embodiments have different token values associated with the tokens. Thus, unlike the embodiment of FIGS. 3 to 11, the Super Choice token may have a token value of 2 and the Ultimate Choice token may have a token value of 3. In this case, the threshold numbers can either stay the same or vary. For example, the threshold number may be 4 for Super Choice tokens having a value of 2 (this would be the equivalent of a threshold number of 2 where the token value is 1) and the threshold number is 6 for Ultimate Choice tokens having a value of 3 (this would be the equivalent of a threshold number of 2 where the token value is 1). In another embodiment, different token values are associated with a single token. For example, Super Choice tokens may appear with token values of 1 or 2 and the threshold number is 3, thus requiring the player to either win one Super Choice token with a token value of 1 and a Super Choice token with a value of 2 or win three Super Choice tokens with a token value of 1 to reach the threshold number. In this case, different combinations of the Dragon symbol 10*c* trigger the award of tokens with different values, such as three Dragon symbols results in the award of a Super Choice token with a token value of 1 and four Dragon symbols results in the award of a Super Choice token with a token value of 2. Thus, in the embodiments of the invention, the accumulated token value for any token is determined or calculated from the token values associated with tokens awarded to the player and not necessarily the number of tokens awarded to the player.

While the preferred embodiment of the invention has been described in relation to a base game 8 and a feature game 9, those skilled in the art will appreciate that the use of providing tokens for collection or accumulation to trigger selectable feature game options can be readily applied to the base game alone.

Also, the arrangement of the games 8, 9, 59, 69 is not limited to a set of reels or columns, but could take other forms, such as non-rectangular arrays (i.e. arrays that do not comprise rows and columns). For example, where the array is circular, the predetermined game positions can take the form of pie-shaped slices or wedges.

While the same game format is essentially used across the base game 8 and feature games 9, 59, 69, it will be appreciated that the game format may vary across the base and feature games, as well as between base games where more than one game is offered by the same electronic gaming machine 1. For example, one of the games 8 may be a wheel-type game or a four reel game and another of the games may be a standard five reel game. Similarly, the games 8 may each have different game symbols, game rules and pay tables that are unique to each game.

Furthermore, the embodiments of the invention have been described as providing a standard 5×3 set of reels 12 for the base game 8. However, it will be appreciated that in other embodiments, the size and shape of the reels 12 may vary. For example, the array 11 could take any number of different shapes, such as triangular, circular, square, hexagonal, hemispherical or other polygonal shapes. Alternatively, the arrays 11 could have an uneven number of rows and/or columns. For example, the reels 12*a*, 12*b* could have three rows, but the reels 12*c* to 12*e* could have four rows.

Also, in a further preferred embodiment, the player can selectively stop spinning of the reels 12, either individually or collectively, in each of the base game 8, feature game 9 and selected feature games 59 and 69 to increase player interaction and provide the player with an opportunity to guess when an individual reel 12*a*, 12*b*, 12*c*, 12*d* or 12*e* contains a symbol that results in a desired prize or game enhancing element. Furthermore, the player can start spinning of the reels 12, either individually or collectively, to further enhance player interaction.

In other preferred embodiments, the base game 8, feature game 9 and selected feature games 59 and 69 need not be displayed only on the lower video display screen 7*a*, but can be extended to the upper video screen 7*b*. Alternatively, the base game 8, feature game 9 and selected feature games 59 and 69 may be displayed on a single screen. Also, the order can be reversed, with the playing area 7*a* appearing on an upper video screen or upper part of a single video display screen 7 and the display area 7*b* appearing on a lower video screen or lower part of a single video display screen.

In another preferred embodiment, the video screens 7*a*, 7*b* (or single display screen) are touch screens for use in addition to the player-actuatable buttons 6 so as to enable the player to select various features, such as making monetary bets for the base game, initiating play of the base and feature games played on the array 11 and responding to any messages or requests issued on the electronic gaming machine 1 by the electronic game controller 4. In this case, the player may control when the reels 12 start spinning and stop spinning, either individually or collectively, by simply touching the reels 12. Control over spinning of the reels 12 can also be implemented through the buttons 6 on the console 3. This increases player interaction and provide the player with an opportunity to guess when a particular game symbol 10 may appear in the reels 12.

It will be appreciated that while the preferred embodiments have been described in relation to an industry standard electronic gaming machine, the invention can be readily applied to other types of electronic gaming machines, including a personal computer (standing alone or connected to a communications network, LAN or WAN), mobile electronic devices (such as handheld or portable electronic devices like smart phones and tablets) and other electronic devices capable of displaying a game. In the case of a mobile electronic device, in one arrangement it may permit the player to make bets using "virtual" credits that represent a monetary value, but does not require the player to make a monetary transaction. Instead, the invention may provide a tiered access to the various features of the game so that the player can make relatively small payments to access particular features of the game or obtain additional benefits during game play. An alternative arrangement would require the player to purchase virtual credits or tokens via an interface on the mobile electronic device or an online interface accessible by the mobile electronic device. Similarly, either of the above described arrangements can be applied where the invention is implemented on a personal computer (PC) connected to the internet (wirelessly or not). In one example of the implementation, the PC would access an online casino over the internet to play the game of the invention or the game of the invention would be part of a social networking website. It is also contemplated that the player could also make regular payments to subscribe to continue playing the game on the mobile electronic device, PC or other electronic device.

In an alternative embodiment, the electronic gaming machine also provides an option for the player to play with either credits based on a monetary amount or virtual credits as discussed above. This can be implemented by way of a selection menu prior to playing the selected game or by providing a suitable menu button on screen during play of the selected game.

In another aspect, the invention includes a computer program configured to perform the invention. In this way the invention can be implemented in various ways on an electronic gaming machine. In a further aspect, the invention includes a gaming system configured comprising a central processing unit (such as a computer or computational processor) configured for communication with an electronic gaming machine to perform the invention. In a yet another aspect, the invention includes a non-transitory carrier medium carrying computer executable code that, when executed on a central processing unit configured for communication with an electronic gaming machine, causes said central processing unit to perform the invention. In this case, the non-transitory carrier medium includes an external hard drive, a memory device, including a memory card, smart card, a radio frequency identification (RFID) device, USB key, magnetic card or other electronic storage device.

It will further be appreciated that any of the features in the preferred embodiments of the invention can be combined together and are not necessarily applied in isolation from each other. For example, the feature of the player being able to selectively starting or stopping spinning of the reels 12 and the feature of providing a third type of special symbol to award a different type of token in the selected feature game can be combined into a single electronic gaming machine. Similar combinations of two or more features from the above described embodiments or preferred forms of the invention can be readily made by one skilled in the art.

By providing a set of selectable feature game options that are activated by accumulation of tokens obtained in another game, there is a greater variety of game play provided by the electronic gaming machine that is not ordinarily provided by conventional gaming machines. Moreover, the additional tiers of selectable feature game options that are opened up as the player progresses in each preceding set of games increases the player's interest in the electronic gaming machine as more and more games and game options are provided as electronic gaming machine is played. Thus, the invention retains the player's interest and so the player is likely to continue playing the same electronic gaming machine. The player's anticipation and excitement is also heightened as he or she knows that additional games that can be chosen and prizes can be won once the necessary number of tokens have been collected to reach the threshold token value. The invention also adds greater value to a player in terms of the probability of winning a prize relative to the amount bet or wagered, especially compared to a conventional electronic gaming machine that only has one set of reels and a single feature game. This value to the player is increased in the preferred embodiments of the invention by extending play of the selectable feature game options in a cascading fashion. All these advantages of the invention result in the player being more likely to retain interest in continuing to play the same electronic gaming machine due to the variation in game play on the electronic gaming machine. Furthermore, since the electronic game controller controls operation of the electronic gaming machine, the invention can be readily implemented to existing gaming machines and other gaming systems. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. An electronic gaming machine comprising:

a housing having a display for displaying game symbols for playing a game and an electronic game controller in electronic communication with said display for controlling the appearance of game symbols in said game on the display, wherein said game comprises randomly displaying said game symbols and awarding prizes to a player for predetermined winning combinations of game symbols to a player; and an input device for receiving commands from said player to operate said electronic gaming machine and initiate play of said game on said display, said input device being in electronic communication with said electronic game controller;

wherein said electronic game controller in response to a command from said player via said input device commences play of said game by randomly selecting game symbols and transmitting a signal to said display to display said randomly selected game symbols;

wherein, in response to a trigger event during play of said first game, said electronic game controller causes said display to display game symbols for playing a second game of chance, wherein the appearance of one or more special symbols causes the award of one or more tokens to said player, said tokens being associated with one or more token values;

wherein, at the end of said second game of chance, said electronic game controller determines an accumulated token value from the tokens awarded to said player, and where said accumulated token value is equal to a predetermined number, said electronic game controller causes the display of a plurality of third games of chance selectable by said player, and wherein said third games displayed depends on said accumulated token value; and in response to said player selecting a selected third game from said plurality of third games, said electronic game controller causes the display of game symbols for playing said selected third game.

2. The electronic gaming machine of claim 1, wherein said tokens are associated with two or more token values.

3. The electronic gaming machine of claim 2, wherein one of said tokens results in the award of an initial token value and another of said tokens result in the award of a different token value.

4. The electronic gaming machine of claim 1, wherein said tokens comprise two or more different types of tokens, each type of token being associated a different token value.

5. The electronic gaming machine of claim 4, wherein a first appearance of said special symbol results in the award of a first type of token and subsequent appearances of said special symbol result in the award of a second type of token, a first accumulated token value of said first type of tokens results in said electronic game controller causing the display of a first plurality of third games of chance selectable by said player, and a second accumulated token value of said second type of tokens results in said electronic game controller causing the display of a second plurality of third games of chance selectable by said player.

6. The electronic gaming machine of claim 5, wherein said second plurality of third games comprise enhanced or improved versions of said first plurality of third games.

7. The electronic gaming machine of claim 4, wherein a first appearance of said special symbol results in the award of a first type of token, a second appearance of said special symbol results in the award of a second type of token and subsequent appearances of said special symbol result in the award of a third type of token, a first accumulated token value of said first type of tokens results in said electronic game controller causing the display of a first plurality of third games of chance selectable by said player, a second accumulated token value of said second type of tokens results in said electronic game controller causing the display of a second plurality of third games of chance selectable by said player, and a third accumulated token value of said third type of tokens results in said electronic game controller causing the display of a third plurality of third games of chance selectable by said player.

8. The electronic gaming machine of claim 4, wherein said electronic game controller permits said player to make more than one selection from said plurality of third games where more than one type of token has an accumulated token value greater than said predetermined number.

9. The electronic gaming machine of claim 4, wherein there are different types of special symbols, each type of special symbol being associated with different types of said tokens.

10. The electronic gaming machine of claim 4, wherein said different types of tokens and accumulated token values are displayed on said display.

11. The electronic gaming machine of claim 10, wherein said different types of tokens and accumulated token values are displayed as meters in real time on said display.

12. The electronic gaming machine of claim 1, wherein said predetermined number is at least 1.

13. The electronic gaming machine of claim 1, wherein said tokens comprise at least one of a symbol or numerical value.

14. The electronic gaming machine of claim 1, wherein said first game of chance comprises the display of randomly selected game symbols, wherein predetermined winning combinations of said randomly selected game symbols results in the award of prizes to a player and/or one or more game enhancing elements that are applied in said first game of chance, and wherein said second game of chance comprises the display of randomly selected game symbols, wherein predetermined winning combinations of randomly selected game symbols in said second game of chance results in the award of prizes to said player and/or one or more game enhancing elements that are applied in said second game of chance, and wherein, said selected third game comprises the display of randomly selected game symbols, wherein predetermined winning combinations of randomly selected game symbols in said selected third game results in the award of prizes to said player and/or one or more game enhancing elements that are applied in said selected third game.

15. The electronic gaming machine of claim 1, wherein said player must make a bet to play said second game of chance and is awarded free plays of said selected third game.

16. The electronic gaming machine of claim 1, wherein said player is awarded free plays of said second game of chance and must make a bet to play said selected third game.

17. The electronic gaming machine of claim 1, wherein a first trigger event in said second game of chance causes said electronic game controller to award additional plays of said second game of chance.

18. The electronic gaming machine of claim 1, wherein a second trigger event in said selected third game causes said electronic game controller to award additional plays of said selected third game.

19. The electronic gaming machine of claim 1, wherein said first game of chance comprises a feature game.

20. The electronic gaming machine of claim 1, wherein said first game of chance comprises a base game.

21. The electronic gaming machine of claim 1, wherein the appearance of a special symbol in a designated symbol position in a play of said first game of chance results in said special symbol reappearing in said designated symbol position for subsequent plays of said first game of chance, said second game of chance, said third game of chance or any combination thereof.

22. The electronic gaming machine of claim 1, wherein the appearance of a special symbol in a designated symbol position in a play of said second game of chance results in said special symbol reappearing in said designated symbol position for subsequent plays of said second game of chance, said third game of chance or any combination thereof.

* * * * *